US012748121B2

(12) United States Patent
Truitt et al.

(10) Patent No.: US 12,748,121 B2
(45) Date of Patent: Sep. 29, 2026

(54) METHOD OF PIERCING SEAL FOR SAMPLE TESTING

(71) Applicant: BECTON, DICKINSON AND COMPANY, Franklin Lakes, NJ (US)

(72) Inventors: Patrick Walter Truitt, New Freedom, PA (US); Patrick Downie, Apex, NC (US); Ammon D. Lentz, York, PA (US); Alyssa Nicolaisen Shedlosky, Reisterstown, MD (US)

(73) Assignee: Augusta SpinCo Corporation, Milford, MA (US)

( * ) Notice: Subject to any disclaimer, the term of this patent is extended or adjusted under 35 U.S.C. 154(b) by 282 days.

(21) Appl. No.: 18/587,777

(22) Filed: Feb. 26, 2024

(65) Prior Publication Data

US 2024/0210435 A1 Jun. 27, 2024

Related U.S. Application Data

(63) Continuation of application No. PCT/US2022/075949, filed on Sep. 2, 2022.

(Continued)

(51) Int. Cl.
*G01N 35/10* (2006.01)
*B01L 3/00* (2006.01)

(52) U.S. Cl.
CPC ........ *G01N 35/1079* (2013.01); *B01L 3/5029* (2013.01); *B01L 2200/0689* (2013.01); *B01L 2300/042* (2013.01); *B01L 2300/0672* (2013.01)

(58) Field of Classification Search
CPC .... G01N 2001/028; G01N 1/38; G01N 21/76; G01N 21/645; G01N 35/0098;

(Continued)

(56) References Cited

U.S. PATENT DOCUMENTS 2,889,298 A 6/1959 Brown
3,946,732 A * 3/1976 Hurscham ............ A61J 1/2093 604/88

(Continued)

FOREIGN PATENT DOCUMENTS

CN 306013714 8/2020
CN 306384884 3/2021

(Continued)

OTHER PUBLICATIONS

Freepik, Premium Photo / Coronavirus (Covid-19) positive test result with SARS-COV-2 Antigen Rapid Test kits for Self testing at home; posted date unavailable. Retrieved online on Jun. 4, 2024 from https://www.freepik.com/premium-photo/coronavirus-covid-19-positive-test result-with sars-cov-2-antigen-rapid-test-kits-self-testing-home_20492423.htm in 3 pages.

(Continued)

*Primary Examiner* — Andre J Allen

(74) *Attorney, Agent, or Firm* — Knobbe, Martens, Olson & Bear, LLP

(57) ABSTRACT

Disclosed herein include methods, compositions, and kits suitable for use in sample testing. The sample testing systems can comprise a cartridge body to receive a sample, at least one reaction chamber coupled to the cartridge body, and at least one seal between the cartridge body and the at least one reaction chamber. The sample testing system can comprise a sample dispensing mechanism operable to disrupt the at least one seal to dispense a predetermined sub-volume of sample fluid from the cartridge body into the at least one reaction chamber. The sample dispensing mechanism can comprise a dispense rod comprising at least one piercing tip that disrupts the at least one seal by forming at least one opening therein. The piercing tips can comprise (Continued)

a geometry configured to generate a large opening in the at least one seal.

32 Claims, 28 Drawing Sheets

Related U.S. Application Data

(60) Provisional application No. 63/241,033, filed on Sep. 6, 2021.

(58) Field of Classification Search
CPC .... G01N 1/02; G01N 21/6428; G01N 35/026; G01N 35/1079; G01N 33/54388; G01N 1/4077; G01N 2001/4088; G01N 2035/00346; G01N 33/54366; G01N 35/0099; G01N 35/1002; G01N 2021/0325; G01N 2035/00534; G01N 2035/0436; G01N 21/763; G01N 33/48714; G01N 35/00871; G01N 1/10; G01N 2035/00158; G01N 2035/00366; G01N 2035/00881; G01N 21/03; G01N 21/0303; G01N 21/6452; G01N 21/78; G01N 35/00029; G01N 35/10; G01N 1/2035; G01N 1/28; G01N 1/34; G01N 2001/2866; G01N 2021/6432; G01N 2021/6439; G01N 2035/00108; G01N 2035/00277; G01N 2035/00495; G01N 21/0332; G01N 21/8507; G01N 2201/0221; G01N 30/6091; G01N 33/02; G01N 33/491; G01N 33/50; G01N 33/5302; G01N 33/5304; G01N 33/54326; G01N 35/00584; G01N 35/04; G01N 35/1009; G01N 1/286; G01N 1/30; G01N 1/40; G01N 15/12; G01N 15/1404; G01N 2001/386; G01N 2001/4083; G01N 2021/0321; G01N 2021/6421; G01N 2021/6441; G01N 2021/6482; G01N 2035/00148; G01N 2035/00237; G01N 2035/00306; G01N 2035/00326; G01N 2035/00564; G01N 2035/103; G01N 21/01; G01N 21/07; G01N 21/253; G01N 21/77; G01N 21/8483; G01N 21/94; G01N 2201/0415; G01N 2201/062; G01N 2333/11; G01N 2333/245; G01N 2333/295; G01N 2333/315; G01N 2469/10; G01N 2800/52; G01N 33/025; G01N 33/04; G01N 33/15; G01N 33/48778; G01N 33/5094; G01N 33/5308; G01N 33/54373; G01N 33/5438; G01N 33/56916; G01N 33/56983; G01N 33/80; G01N 33/948; G01N 33/9486; G01N 35/00; G01N 35/00693; G01N 35/00732; G01N 35/025; G01N 1/00; G01N 1/14; G01N 1/31; G01N 1/4044; G01N 1/405; G01N 13/00; G01N 15/13; G01N 2001/002; G01N 2001/005; G01N 2001/021; G01N 2001/022; G01N 2001/027; G01N 2001/1006; G01N 2001/1056; G01N 2001/383; G01N 2013/006; G01N 2015/1024; G01N 2015/1029; G01N 2021/0307; G01N 2021/0328; G01N 2021/0357; G01N 2021/0382; G01N 2021/4726; G01N 2021/6419; G01N 2021/6463; G01N 2021/6471; G01N 2021/6476; G01N 2021/7756; G01N 2021/7759; G01N 2021/7786; G01N 2021/8845; G01N 2030/8818; G01N 2030/8827; G01N 2035/00128; G01N 2035/00287; G01N 2035/00356; G01N 2035/00386; G01N 2035/00396; G01N 2035/00445; G01N 2035/00465; G01N 2035/00485; G01N 2035/00524; G01N 2035/00752; G01N 2035/0091; G01N 2035/0097; G01N 2035/0412; G01N 2035/0439; G01N 2035/0441; G01N 2035/0443; G01N 2035/0444; G01N 2035/0449; G01N 2035/0451; G01N 2035/0455; G01N 2035/0491; G01N 2035/1034; G01N 2035/1044; G01N 2035/1051; G01N 2035/1086; G01N 21/00; G01N 21/031; G01N 21/11; G01N 21/29; G01N 21/314; G01N 21/35; G01N 21/359; G01N 21/51; G01N 21/64; G01N 21/6454; G01N 21/66; G01N 21/75; G01N 2201/0227; G01N 2201/024; G01N 2201/0245; G01N 2201/0256; G01N 2201/0634; G01N 2201/0636; G01N 2201/064; G01N 2201/065; G01N 2201/0666; G01N 2201/0691; G01N 2201/12707; G01N 2333/415; G01N 2333/46; G01N 2333/805; G01N 2333/91188; G01N 2333/938; G01N 2440/00; G01N 2458/30; G01N 2469/20; G01N 2496/80; G01N 2560/00; G01N 2570/00; G01N 27/028; G01N 27/045; G01N 27/30; G01N 27/327; G01N 27/3273; G01N 27/3274; G01N 27/4146; G01N 27/447; G01N 2800/26; G01N 2800/56; G01N 2800/60; G01N 30/04; G01N 30/08; G01N 30/6095; G01N 30/7233; G01N 30/88; G01N 31/22; G01N 33/00; G01N 33/0047; G01N 33/12; G01N 33/1893; G01N 33/48; G01N 33/487; G01N 33/48707; G01N 33/48735; G01N 33/48785; G01N 33/49; G01N 33/4905; G01N 33/4915; G01N 33/5002; G01N 33/5005; G01N 33/52; G01N 33/521; G01N 33/528; G01N 33/536; G01N 33/5375; G01N 33/54313; G01N 33/54333; G01N 33/54386; G01N 33/54387; G01N 33/54393; G01N 33/544; G01N 33/551; G01N 33/552; G01N 33/554; G01N 33/569; G01N 33/56911; G01N 33/56938; G01N 33/56944; G01N 33/56972; G01N 33/56988; G01N 33/56994; G01N 33/571; G01N 33/573; G01N 33/579; G01N 33/66; G01N 33/68; G01N 33/6827; G01N 33/6848; G01N 33/70; G01N 33/721; G01N 33/726; G01N 33/86; G01N 33/9446; G01N 33/96; G01N 33/98; G01N 35/0092; G01N 35/02; G01N 35/028; B01L 2300/0672; B01L 2400/0683; B01L 3/502; B01L 2200/16; B01L 3/5029; B01L 2400/0478; B01L 2300/0832; B01L 2300/042; B01L 2300/044; B01L 7/52; B01L 2300/087; B01L 3/5082; B01L 2300/047; B01L 2200/0689; B01L 2400/0644; B01L 3/502715; B01L 2300/0867; B01L 2300/0681; B01L 2200/027; B01L 3/5023; B01L 2200/025; B01L 3/50825; B01L 2200/026; B01L 2300/0627; B01L 2400/0406; B01L 2400/0487; B01L 3/523; B01L 2300/046; B01L 2300/0816; B01L 3/50273; B01L 2200/0684; B01L 2200/10; B01L 2300/0825; B01L 2400/0481; B01L 3/5027; B01L 2200/0605; B01L 2300/0663; B01L 2300/1827; B01L 2300/0829; B01L 2300/123; B01L 2300/1822; B01L 3/502738; B01L 2200/028; B01L 2300/0861; B01L 2400/043; B01L 2300/0609; B01L 2300/0654; B01L 2400/049; B01L 2300/021; B01L 2300/049; B01L 3/527; B01L 2200/0621; B01L 2300/0645; B01L 2400/0409; B01L 2300/0848; B01L 2400/0633; B01L 2400/065; B01L 3/5021; B01L 3/508; B01L 3/50853; B01L 2200/0668; B01L 2200/147; B01L 2300/0864; B01L 2300/0887; B01L 2300/18; B01L 2300/1805; B01L 2400/0622; B01L 2400/0655; B01L 7/00; B01L 2200/0631; B01L 2200/0647; B01L 2200/141; B01L 2300/025; B01L 2300/048; B01L 2300/0636; B01L 2300/0838; B01L 2300/0851; B01L 2300/0854; B01L 2300/0858; B01L 2300/12; B01L 7/525; B01L 9/527; B01L 2200/148; B01L 2300/022; B01L 2300/023; B01L 2300/041; B01L 2300/069; B01L 2300/0883; B01L 2300/168; B01L 2300/1861; B01L 2300/1877; B01L 2400/0457; B01L 2400/0677; B01L 2400/0694; B01L 3/502723; B01L 3/50851; B01L 2200/0642; B01L 2200/12; B01L 2200/14; B01L 2300/045; B01L 2300/0819; B01L 2300/1844; B01L 2400/0475; B01L 2400/0605; B01L 2400/0638; B01L 3/502707; B01L 3/5085; B01L 3/52; B01L 2200/02; B01L 2200/04; B01L 2200/0652; B01L 2200/143; B01L 2300/043; B01L 2300/14; B01L 2300/161; B01L 2300/1894; B01L 2400/0442; B01L 2400/0611; B01L 3/0217; B01L 3/50215; B01L 3/5025; B01L 3/502761; B01L 3/50855; B01L 3/545; B01L 7/54; B01L 2200/082; B01L 2200/142; B01L 2300/02; B01L 2300/06; B01L 2300/0803; B01L 2300/0809; B01L 2300/0893; B01L 2300/105; B01L 2300/1816; B01L 2300/185; B01L 2400/086; B01L 3/021; B01L 3/022; B01L 3/0272; B01L 3/0293; B01L 3/0296; B01L 3/502746; B01L 3/502769; B01L 3/502776; B01L 3/5457; B01L 3/563; B01L 3/5635; B01L 7/5255; B01L 9/06; B01L 1/52; B01L 13/02; B01L 2200/06; B01L 2200/0626; B01L 2200/0673; B01L 2200/0678; B01L 2200/08; B01L 2200/085; B01L 2200/185; B01L 2300/0618; B01L 2300/0806; B01L 2300/0822; B01L 2300/0841; B01L 2300/0874; B01L 2300/0877; B01L 2300/165; B01L 2300/166; B01L 2300/1855; B01L 2300/1872; B01L 2300/1883; B01L 2400/0415; B01L 2400/0418; B01L 2400/0445; B01L 2400/0493; B01L 2400/06; B01L 2400/0616; B01L 2400/0688; B01L 2400/08; B01L 2400/082; B01L 2400/088; B01L 3/50; B01L 3/50255; B01L 3/502753; B01L 3/505; B01L 3/56; B01L 7/02; B01L 7/04; B01L 9/065; B01L 9/50; B01L 99/00

See application file for complete search history.

(56) References Cited

U.S. PATENT DOCUMENTS

| | | | | |
|---|---|---|---|---|
| 4,690,153 | A | 9/1987 | Losada et al. | |
| 5,024,821 | A | 6/1991 | Greenshields et al. | |
| 5,514,341 | A | 5/1996 | Urata et al. | |
| 5,658,531 | A | 8/1997 | Cope et al. | |
| D383,214 | S | 9/1997 | Brennan | |
| 5,786,182 | A | 7/1998 | Catanzariti et al. | |
| 5,827,675 | A | 10/1998 | Skiffington et al. | |
| 5,917,592 | A | 6/1999 | Skiffington | |
| 5,989,499 | A | 11/1999 | Catanzariti et al. | |
| 6,165,795 | A | 12/2000 | Mize et al. | |
| 6,176,609 | B1 | 1/2001 | Cleveland et al. | |
| D437,797 | S | 2/2001 | Bishop | |
| 6,357,907 | B1 | 3/2002 | Cleveland et al. | |
| 6,495,373 | B1 | 12/2002 | Mauchan | |
| 6,500,343 | B2 | 12/2002 | Siddiqi | |
| 6,524,530 | B1 | 2/2003 | Igarashi et al. | |
| 6,541,194 | B2 | 4/2003 | DiCesare | |
| 6,548,026 | B1 | 4/2003 | Dales et al. | |
| 6,649,378 | B1 | 11/2003 | Kozwich et al. | |
| D486,400 | S | 2/2004 | Bakic | |
| 6,684,680 | B2 | 2/2004 | Pierskalla et al. | |
| 6,764,859 | B1 | 7/2004 | Kreuwel et al. | |
| D500,856 | S | 1/2005 | Hellstrom | |
| 6,951,545 | B2 | 10/2005 | Smith et al. | |
| 6,951,762 | B2 | 10/2005 | Zuk, Jr. | |
| 7,011,508 | B2 | 3/2006 | Lum | |
| 7,030,403 | B2 | 4/2006 | Feldsine et al. | |
| 7,214,529 | B2 | 5/2007 | Kluttz et al. | |
| 7,238,520 | B2 | 7/2007 | Brown et al. | |
| 7,344,894 | B2 | 3/2008 | Greenstein et al. | |
| 7,364,350 | B2 | 4/2008 | Coville et al. | |
| 7,378,054 | B2 | 5/2008 | Karmali | |
| 7,396,515 | B2 | 7/2008 | Arndt et al. | |
| 7,399,984 | B2 * | 7/2008 | Feldsine | G01N 21/8507 250/573 |
| 7,473,399 | B2 | 1/2009 | Dehmer | |
| 7,482,116 | B2 | 1/2009 | Birnboim | |
| 7,497,997 | B2 | 3/2009 | Glezer et al. | |
| 7,517,495 | B2 | 4/2009 | Wu et al. | |
| 7,544,324 | B2 | 6/2009 | Tung et al. | |
| 7,547,516 | B2 | 6/2009 | Light, II | |
| 7,560,272 | B2 | 7/2009 | Ramsey et al. | |
| 7,572,355 | B1 | 8/2009 | Arumugam et al. | |
| 7,625,760 | B2 | 12/2009 | Kitaguchi et al. | |
| D610,014 | S | 2/2010 | Wolf | |
| 7,678,576 | B2 | 3/2010 | Sasaki et al. | |
| 7,682,824 | B2 | 3/2010 | Green et al. | |
| 7,682,835 | B2 | 3/2010 | Giordano | |
| 7,691,326 | B2 | 4/2010 | Sorenson et al. | |
| 7,771,658 | B2 | 8/2010 | Larsen | |
| 7,794,656 | B2 | 9/2010 | Liang et al. | |
| 7,837,939 | B2 | 11/2010 | Tung et al. | |
| 7,842,454 | B2 | 11/2010 | Shomi et al. | |
| 7,863,053 | B2 | 1/2011 | Lyng et al. | |
| 7,871,568 | B2 | 1/2011 | Liang et al. | |
| 7,887,764 | B2 | 2/2011 | Jernberg | |

(56) References Cited

U.S. PATENT DOCUMENTS 7,892,497 B2 2/2011 Shibata et al.
7,901,931 B2 3/2011 Cachon et al.
7,932,099 B2 4/2011 Egan et al.
7,981,054 B2 7/2011 Nguyen et al.
7,993,871 B2 8/2011 Skiffington et al.
8,008,046 B2 8/2011 Maltezos et al.
8,012,432 B2 9/2011 Berndtsson
8,017,380 B2 9/2011 Moriwaki et al.
8,028,566 B2 10/2011 Larsen
8,133,671 B2 3/2012 Williams et al.
8,173,388 B2 5/2012 Pasmore et al.
8,221,381 B2 7/2012 Muir et al.
8,298,497 B2 10/2012 Squirrell
8,327,724 B2 12/2012 Fairs et al.
8,329,119 B2 12/2012 Pearcy et al.
8,388,907 B2 3/2013 Gold et al.
8,394,626 B2 3/2013 Ramsey et al.
8,399,190 B2 3/2013 Belgrader et al.
8,414,846 B2 4/2013 Gold et al.
8,441,629 B2 5/2013 Kolesnychenko et al.
8,476,064 B2 7/2013 Salter et al.
D687,304 S 8/2013 Tanner
8,501,112 B2 8/2013 Miyamura et al.
8,574,512 B2 11/2013 Eble
8,585,279 B2 11/2013 Rida
8,609,333 B2 12/2013 Zhou et al.
8,663,918 B2 3/2014 Connolly et al.
8,734,734 B2 5/2014 Kido et al.
8,741,230 B2 6/2014 Holmes et al.
8,871,155 B2 10/2014 Wu et al.
8,906,674 B2 12/2014 Ebi et al.
8,919,605 B2 12/2014 Lipman et al.
8,973,749 B2 3/2015 Pearcy et al.
9,008,373 B2 4/2015 Markovsky et al.
9,067,014 B2 6/2015 Nelson et al.
9,145,581 B1 9/2015 Lai
9,149,807 B2 10/2015 Niggel et al.
9,162,228 B2 10/2015 Knight
9,182,395 B2 11/2015 Tajima
9,186,670 B2 11/2015 Berthier et al.
9,222,126 B2 12/2015 Bearinger et al.
9,222,623 B2 12/2015 Wright et al.
9,246,222 B2 1/2016 Fasenfest
9,260,740 B2 2/2016 Sharpin
9,283,560 B2 3/2016 Dothie
9,284,593 B2 3/2016 Rajagopal et al.
9,285,384 B2 3/2016 Broyer et al.
9,308,508 B2 4/2016 Peyvan
9,327,284 B2 5/2016 Rosman et al.
9,329,175 B2 5/2016 Miller et al.
9,352,312 B2 5/2016 Grover et al.
9,358,513 B2 6/2016 Liu et al.
9,376,704 B2 6/2016 Salter et al.
9,382,570 B2 7/2016 Rajagopal et al.
9,446,406 B2 9/2016 Gordon et al.
9,463,457 B2 10/2016 Korpela
9,475,043 B2 10/2016 Daub et al.
9,523,115 B2 12/2016 Birnboim
9,557,317 B2 1/2017 Ozbal
9,562,260 B2 2/2017 Kluttz et al.
9,562,262 B2 2/2017 Peytavi et al.
9,579,655 B2 2/2017 DeJohn et al.
9,606,067 B2 3/2017 Jasperse et al.
9,618,139 B2 4/2017 Handique
9,625,357 B2 4/2017 Bransky et al.
9,664,674 B2 5/2017 Taslim et al.
9,737,891 B2 8/2017 TerMaat et al.
9,808,802 B2 11/2017 Dothie et al.
9,850,549 B2 12/2017 Sanford et al.
9,932,629 B2 4/2018 Hopper
9,939,431 B2 4/2018 Sundvor et al.
10,016,765 B2 7/2018 Chen et al.
10,046,322 B1 8/2018 Cauley, III
10,052,629 B2 8/2018 Andreyev et al.
10,119,968 B2 11/2018 Lansing
10,307,755 B1 6/2019 Bradley et al.
10,369,572 B2 8/2019 Marion, Jr.
10,371,636 B2 8/2019 Mische et al.
10,386,278 B2 8/2019 Pierce et al.
10,427,152 B2 10/2019 Wright et al.
10,428,375 B2 10/2019 Hopper
10,456,787 B2 10/2019 Blankenstein et al.
10,463,347 B2 11/2019 Terbrueggen et al.
10,522,245 B2 12/2019 Lui et al.
10,532,352 B2 1/2020 Cooney et al.
10,569,273 B2 2/2020 Gong et al.
10,605,740 B2 3/2020 Wolter et al.
D881,410 S 4/2020 Motadel et al.
D882,111 S 4/2020 Bib et al.
10,625,263 B2 4/2020 Nobile et al.
10,646,875 B2 5/2020 Bird et al.
10,648,018 B2 5/2020 Nana et al.
10,654,039 B2 5/2020 Marcy et al.
10,683,531 B2 6/2020 Stahl et al.
10,688,497 B2 6/2020 Ou et al.
10,698,190 B2 6/2020 Abbott et al.
10,704,082 B2 7/2020 Stahl et al.
D893,744 S 8/2020 Johnsen et al.
D895,139 S 9/2020 Hong
D901,677 S 11/2020 Hong et al.
D901,696 S 11/2020 Lei et al.
D905,271 S 12/2020 Johnsen et al.
10,857,538 B2 * 12/2020 Harding .................... B01L 7/52
10,888,865 B2 1/2021 Li et al.
10,908,145 B2 2/2021 Sinn Blandy et al.
D913,521 S 3/2021 Hong et al.
D914,237 S 3/2021 Johnsen et al.
10,955,370 B2 3/2021 Kuczynski et al.
10,983,034 B2 4/2021 Crum et al.
10,994,277 B2 5/2021 Starr et al.
11,033,894 B2 6/2021 Grover et al.
11,067,487 B2 7/2021 Campton et al.
11,090,646 B2 8/2021 Ronsick et al.
11,123,736 B2 9/2021 Mitra et al.
11,125,661 B2 9/2021 Myers, III et al.
D934,079 S 10/2021 Hatton et al.
11,185,863 B2 11/2021 Irmscher et al.
11,198,122 B2 12/2021 Hopper
11,199,529 B2 12/2021 Harding et al.
11,229,909 B2 1/2022 Agah et al.
11,236,382 B2 2/2022 Connolly et al.
11,260,392 B2 3/2022 Pais et al.
D948,073 S 4/2022 Oishi
11,305,273 B2 4/2022 Walsh et al.
11,376,594 B2 7/2022 Navawongse et al.
D974,588 S 1/2023 Lei et al.
D974,589 S 1/2023 Decaluwéet al.
D989,343 S 6/2023 Gao et al.
11,680,291 B2 6/2023 Lai et al.
11,709,175 B2 7/2023 Hopper
D1,002,867 S 10/2023 Lentz et al.
D1,004,125 S 11/2023 Chen et al.
11,833,519 B2 12/2023 Prakash et al.
D1,011,917 S 1/2024 Kaiser et al.
D1,017,029 S 3/2024 Schwab et al.
D1,017,797 S 3/2024 Enemark
D1,025,781 S 5/2024 Komai et al.
D1,032,014 S 6/2024 Fang
D1,033,233 S 7/2024 Estrella et al.
D1,040,367 S 8/2024 Fang
D1,042,163 S 9/2024 Morton et al.
D1,064,874 S 3/2025 Woo
D1,069,156 S 4/2025 Truitt et al.
D1,084,390 S 7/2025 Lei et al.
D1,091,316 S 9/2025 Hayden et al.
D1,095,880 S 9/2025 Jiang et al.
2002/0160428 A1 10/2002 Sundrehagen
2003/0209653 A1 * 11/2003 Feldsine ................ G01N 21/76
250/214 R
2005/0119589 A1 6/2005 Tung et al.
2005/0202568 A1 9/2005 Tung et al.
2006/0133954 A1 6/2006 Schroeder et al.
2006/0140051 A1 6/2006 Kim et al.
2006/0160170 A1 7/2006 Giordano

(56) References Cited

U.S. PATENT DOCUMENTS

| | | | |
|---|---|---|---|
| 2006/0216196 | A1 | 9/2006 | Satoh et al. |
| 2007/0036026 | A1 | 2/2007 | Laibinis et al. |
| 2007/0128070 | A1 | 6/2007 | Wu et al. |
| 2008/0286831 | A1 | 11/2008 | Liang et al. |
| 2009/0027998 | A1 | 1/2009 | Halaka et al. |
| 2009/0215159 | A1 | 8/2009 | Kirby |
| 2010/0136670 | A1 | 6/2010 | Markovsky et al. |
| 2011/0165024 | A1 | 7/2011 | Wu et al. |
| 2011/0256531 | A1 | 10/2011 | Rajagopal et al. |
| 2012/0082977 | A1 | 4/2012 | Rajagopal et al. |
| 2012/0100531 | A1 | 4/2012 | Rajagopal et al. |
| 2012/0115211 | A1 | 5/2012 | Ajmal et al. |
| 2012/0115212 | A1 | 5/2012 | Weigl et al. |
| 2012/0164751 | A1 | 6/2012 | Liang et al. |
| 2013/0345596 | A1 | 12/2013 | Zimmon |
| 2014/0046215 | A1 | 2/2014 | Hu et al. |
| 2014/0144583 | A1 | 5/2014 | Hakansson et al. |
| 2014/0255271 | A1 | 9/2014 | Haj-Ahmad |
| 2014/0255984 | A1 | 9/2014 | Sharpin |
| 2015/0209017 | A1 | 7/2015 | Fleming et al. |
| 2015/0226735 | A1 | 8/2015 | Hodges |
| 2016/0074018 | A1 | 3/2016 | Lependorf |
| 2016/0243544 | A1 | 8/2016 | Hu et al. |
| 2016/0258849 | A1 | 9/2016 | Murayama et al. |
| 2016/0263577 | A1 | 9/2016 | Ismagilov et al. |
| 2017/0072393 | A1 | 3/2017 | Jackson et al. |
| 2017/0276690 | A1 | 9/2017 | Lam et al. |
| 2018/0242895 | A1 | 8/2018 | Li et al. |
| 2018/0242896 | A1 | 8/2018 | Li et al. |
| 2019/0030527 | A1 | 1/2019 | Walsh et al. |
| 2019/0142642 | A1 | 5/2019 | Burnet et al. |
| 2019/0168219 | A1 | 6/2019 | Caplin et al. |
| 2020/0086324 | A1 | 3/2020 | Swenson et al. |
| 2020/0122147 | A1 | 4/2020 | Joad et al. |
| 2020/0173909 | A1 | 6/2020 | Lee |
| 2020/0173995 | A1 | 6/2020 | Joyce |
| 2020/0278368 | A1 | 9/2020 | Hopper |
| 2020/0363426 | A1 | 11/2020 | Hieke |
| 2021/0096477 | A1 | 4/2021 | Miyakai et al. |
| 2021/0102876 | A1 | 4/2021 | Fruchter et al. |
| 2021/0145337 | A1 | 5/2021 | Holmes et al. |
| 2021/0291167 | A1 | 9/2021 | Donat et al. |
| 2021/0394176 | A1 | 12/2021 | Lai et al. |
| 2021/0402389 | A1 | 12/2021 | Yotoriyama et al. |
| 2022/0071604 | A1 | 3/2022 | Mide et al. |
| 2022/0146508 | A1 | 5/2022 | Roswech et al. |
| 2022/0154169 | A9 | 5/2022 | Stahl et al. |
| 2022/0250053 | A1 | 8/2022 | Ling |
| 2023/0012231 | A1* | 1/2023 | Rostom ............ G01N 33/54388 |
| 2023/0226537 | A1 | 7/2023 | Guercio |
| 2023/0248338 | A1 | 8/2023 | Springer et al. |
| 2024/0131518 | A1 | 4/2024 | Bishop et al. |
| 2024/0165606 | A1 | 5/2024 | Wu et al. |
| 2024/0188942 | A1 | 6/2024 | Johnson et al. |
| 2024/0246071 | A1 | 7/2024 | Wang et al. |
| 2024/0248111 | A1* | 7/2024 | Truitt .................... B01L 3/5029 |
| 2024/0358298 | A1 | 10/2024 | Forsythe et al. |
| 2024/0361209 | A1 | 10/2024 | Kim et al. |
| 2025/0012677 | A1 | 1/2025 | Katsikas et al. |
| 2025/0152147 | A1 | 5/2025 | Nguyen |
| 2025/0160803 | A1 | 5/2025 | Arrow et al. |
| 2025/0345046 | A1 | 11/2025 | Arrow et al. |
| 2025/0345787 | A1* | 11/2025 | Truitt ...................... B01L 3/502 |
| 2025/0353000 | A1* | 11/2025 | Truitt ...................... B01L 3/502 |
| 2025/0359855 | A1 | 11/2025 | El Din Rostom et al. |

FOREIGN PATENT DOCUMENTS

| | | | |
|---|---|---|---|
| CN | 306748058 | | 8/2021 |
| EP | 1024354 | A1 | 8/2000 |
| EP | 1167968 | A1 | 1/2002 |
| EP | 1697723 | B1 | 6/2007 |
| EP | 1711820 | B1 | 7/2008 |
| EP | 1451342 | B1 | 2/2009 |
| EP | 2280274 | A2 | 2/2011 |
| EP | 1944078 | B1 | 3/2011 |
| EP | 2094388 | B1 | 5/2011 |
| EP | 2046992 | B1 | 4/2013 |
| EP | 2255183 | B1 | 10/2013 |
| EP | 2295141 | B1 | 10/2014 |
| EP | 2431727 | B1 | 8/2015 |
| EP | 2676606 | B1 | 5/2017 |
| EP | 1891413 | B1 | 1/2018 |
| EP | 2825309 | B1 | 5/2018 |
| EP | 2944373 | B1 | 6/2018 |
| EP | 2240278 | B1 | 8/2018 |
| EP | 3102329 | B1 | 10/2018 |
| EP | 3497027 | A1 | 6/2019 |
| EP | 2925853 | B1 | 7/2019 |
| EP | 1930730 | B1 | 8/2019 |
| EP | 2864503 | B1 | 10/2019 |
| EP | 3502276 | B1 | 4/2020 |
| EP | 3151965 | B1 | 2/2021 |
| EP | 3435941 | B1 | 9/2021 |
| EP | 3976253 | A1 | 4/2022 |
| EP | 3992635 | A1 | 5/2022 |
| EP | 3995592 | A1 | 5/2022 |
| EP | 3846939 | B1 | 5/2023 |
| JP | D1392233 | S | 7/2010 |
| JP | D1529268 | S | 7/2015 |
| JP | D1589420 | | 10/2017 |
| KR | 300911366 | | 6/2017 |
| WO | WO 1997/008547 | A1 | 3/1997 |
| WO | WO 1998/027196 | A1 | 6/1998 |
| WO | WO 1999/061919 | A2 | 12/1999 |
| WO | WO 2000/076642 | A2 | 12/2000 |
| WO | WO 2008/036997 | A1 | 4/2008 |
| WO | WO 2009/108501 | A2 | 9/2009 |
| WO | WO 2009/123911 | A2 | 10/2009 |
| WO | WO 2016/046403 | A1 | 3/2016 |
| WO | WO 2016/188096 | A1 | 12/2016 |
| WO | WO 2016/197123 | A2 | 12/2016 |
| WO | WO 2017/019625 | A1 | 2/2017 |
| WO | WO 2017/041023 | A1 | 3/2017 |
| WO | WO 2017/070571 | A2 | 4/2017 |
| WO | WO 2017/078630 | | 5/2017 |
| WO | WO 2017/117553 | A1 | 7/2017 |
| WO | WO 2017/132129 | A1 | 8/2017 |
| WO | WO 2017/160836 | A1 | 9/2017 |
| WO | WO 2017/160838 | A1 | 9/2017 |
| WO | WO 2017/175003 | A1 | 10/2017 |
| WO | WO 2018/094246 | A2 | 5/2018 |
| WO | WO 2018/138471 | A2 | 8/2018 |
| WO | WO 2018/138631 | A1 | 8/2018 |
| WO | WO 2018/150199 | A1 | 8/2018 |
| WO | WO 2019/005833 | A1 | 1/2019 |
| WO | WO 2019/060950 | A1 | 4/2019 |
| WO | WO 2021/204900 | A1 | 10/2021 |
| WO | WO 2021/204901 | A1 | 10/2021 |
| WO | WO 2021/242768 | A1 | 12/2021 |
| WO | WO 2021/263003 | A1 | 12/2021 |
| WO | WO 2022/051694 | A9 | 4/2022 |
| WO | WO 2022/077065 | A1 | 4/2022 |
| WO | WO 2022/078775 | A1 | 4/2022 |
| WO | WO 2022/081623 | A1 | 4/2022 |
| WO | WO 2022/090501 | A1 | 5/2022 |
| WO | WO 2023/034975 | A1 | 3/2023 |
| WO | WO 2023/173002 | A2 | 9/2023 |
| WO | WO 2024/178053 | A1 | 8/2024 |
| WO | WO 2024/215603 | | 10/2024 |

OTHER PUBLICATIONS

Natech Plastics, Antigen Extraction Tube; posted date unavailable. Retrieved online Jun. 4, 2024 from https://natechplastics.com/antigen-extraction-tube/ in 10 pages.

Odemshop; Hecin—HC800 / HC1600 QPCR Sample Release Reagent; posted date unavailable. Retrieved online Jun. 4, 2024 from https://odemshop.com/pcr-test-kit-hecin-hc800-hc1600-sample-release-agent/ in 2 pages.

Omed-Medical, Extraction Tube; posted date unavailable. Retrieved online Jun. 4, 2024 from https://www.omed-medical.com/en/product/Extraction-Tube.html in 8 pages.

(56) References Cited

OTHER PUBLICATIONS

Yuyang Medical, Extraction Tube; posted date unavailable. Retrieved online Jun. 4, 2024 from https://yuyang-medical.com/product/plastic-sampling-extraction-tube/ in 2 pages.
International Search Report and Written Opinion dated Feb. 1, 2023 in Application No. PCT/US2022/0755976 (13 pages).
International Search Report and Written Opinion dated Dec. 9, 2022 in Application No. PCT/US2022/075949. (15 pages).
International Search Report and Written Opinion dated Feb. 1, 2023 in Application No. PCT/US2022/075918, in 13 pages.
International Preliminary Report on Patentability and Written Opinion dated Mar. 5, 2024, in Application No. PCT/US2022/075949, in 10 pages.

* cited by examiner

METHOD OF PIERCING SEAL FOR SAMPLE TESTING

CROSS-REFERENCE TO RELATED APPLICATIONS

This application is a continuation of PCT Application No. PCT/US2022/075949, filed Sep. 2, 2022, which claims priority to U.S. Provisional Application No. 63/241,033, filed Sep. 6, 2021, each of which is hereby incorporated by reference in its entirety.

BACKGROUND

Field

The present disclosure relates generally to the field of sample preparation and testing, more particularly relates to methods, compositions, systems, and apparatuses for preparing and testing biological samples to aid, for example, in environmental, agricultural, scientific, veterinary or medical diagnosis based on detection of the presence or absence of specific analytes in a sample and/or determining their quantities in the sample.

Description of the Related Art

The amplification of nucleic acids is important in many fields, including medical, biomedical, environmental, veterinary and food safety testing. Nucleic acids can be amplified by polymerase chain reaction (PCR) or isothermal amplification. After DNA amplification there will be a large number of copies of the target genetic sequences in the test solution. In a diagnostic test assay, specific markers can be designed that will link to the target sequences, and once bonded provide an optical signal or optical change that can be detected external to the test tube. This optical signal may be a change in the color and/or opacity of the sample as measured by a change in the optical absorption of the sample at specific optical wavelengths. The output signal may also be by way of direct light output from the sample, where the marker, when activated by target bonding event, triggers release of bioluminescence light output. The optical detection output may also be by a change in the fluorescence of the solution, which may be from a fluorescence marker beacon. In this case, each marker molecule can be configured with a florescence quencher in close proximity to a fluorescence atom or arrangement of atoms. This marker molecule can be configured such that when it selectively binds to a target DNA sequence in the test solution, the quencher and fluorophore are separated and a strong fluorescence signal can then be detected by the action of the fluorophore. In this arrangement, the overall florescence intensity of the target solution is indicative of the relative amount of target generic material in the test solution. This signal can then be used to form the basis of a diagnostic test to determine the presence or absence and the relative quantity of the target material in the sample under test.

Current sample testing systems and apparatuses, in particular nucleic acid amplification and detection instruments, are typically large, complex and costly, and require sample preparation steps that must be conducted independently of the instrument. These preparation steps typically require a trained technical operator, and this operator and the test preparation environment can be exposed to hazardous samples such as body fluids and infectious agents, and the process is at risk from incorrect manual operations, including spills and incorrect reagent additions. The resulting test sample must then be accurately subsampled and transferred by a manual transfer step, typically a skilled pipetting operation. This approach requires a trained technical operator and a number of separate tubes and transfer devices, all of which will be contaminated by the sample and must be correctly handled and disposed of individually. In these approaches, the test sample is not scaled from the environment during the process of sample preparation and transfer into test tubes in the test instrument. This exposure to the sample can present infection agent risks to users and others, and can also contaminate the test instrument and test area, resulting in incorrect diagnostic results in subsequent tests.

An alternative approach involves a cartridge body (e.g., sample preparation reservoir) reliably retaining sample preparation solution therein until such time as a sub-volume (e.g., a predetermined sub-volume of the sample fluid from the cartridge body) is dispensed through perforations in the otherwise scaled wall between the cartridge body and coupled reaction chambers (e.g., test tube(s)). However in order to achieve the desired performance of the chemistry, the amount of sample fluid dispensed into the reaction chambers from the cartridge body must be accurate within a small tolerance. There is a need for methods, compositions, systems, and apparatuses for improving the flow and accuracy of the dispensed sample fluid from a cartridge body into said reaction chamber(s).

SUMMARY

Disclosed herein include sample testing systems. In some embodiments, the sample testing system comprises: a cartridge body to receive a biological or environmental sample into a sample preparation fluid contained in the cartridge body for preparation of a sample fluid therefrom. In some embodiments, the sample testing system comprises: at least one reaction chamber coupled to the cartridge body. In some embodiments, the sample testing system comprises: at least one seal between the cartridge body and the at least one reaction chamber to prevent fluid movement between the cartridge body and the at least one reaction chamber. In some embodiments, the sample testing system comprises: a sample dispensing mechanism for insertion into the cartridge body (e.g., after receipt of the biological or environmental sample therein). The sample testing system can comprise at least one seal to prevent fluid movement between the cartridge body and the at least one reaction chamber. In some embodiments, the at least one seal is situated between the cartridge body and the at least one reaction chamber. In some embodiments, the at least one seal is capable of being punctured by a piercing tip to thereby enable fluid movement between the cartridge body and the at least one reaction chamber.

In some embodiments, the sample dispensing mechanism is operable to disrupt the at least one seal to allow sample fluid to enter the at least one reaction chamber from the cartridge body, and to dispense a predetermined sub-volume of the sample fluid from the cartridge body into the at least one reaction chamber for testing therein while preventing further fluid movement between the cartridge body and the at least one reaction chamber. In some embodiments, the sample dispensing mechanism comprises a dispense rod comprising at least one piercing tip that disrupts the at least one seal by forming at least one opening therein, and wherein the at least one piercing tip comprises a geometry configured to generate a large opening in the at least one seal. In some embodiments, the cartridge body initially provides an open volume free of obstructions such that a swab carrying the biological or environmental sample can be used to stir the sample preparation fluid in the cartridge body and to wash the biological or environmental sample from the swab into the sample preparation fluid.

The sample testing system can comprise: a closure to seal the cartridge body after receipt of the biological or environmental sample and the sample dispensing mechanism therein. In some embodiments, at least one of the closure and the cartridge body is configured to prevent or at least inhibit removal of the closure from the cartridge body so that the fluids remain scaled within the sample testing system. In some embodiments, the sample dispensing mechanism is attached to the closure so that an act of applying the closure to the cartridge body also effects the insertion of the sample dispensing mechanism into the cartridge body. The seal can prevent fluid movement prior to the seal puncture. In some embodiments, the shape of the cartridge body prevents rotation when screwing the cap on, and orients to a specific position the plurality of reaction chambers. In some embodiments, a single action by a user causes the sample dispensing mechanism to disrupt the at least one seal and to dispense the sample fluid from the cartridge body into the at least one reaction chamber. In some embodiments, the single action by the user is a sustained screwing action applied to the closure relative to the cartridge body, and wherein the screwing action causes operation of the sample dispensing mechanism and seals the cartridge body. In some embodiments, the closure comprises a screw thread. The sample testing system can comprise: a second closure that seals the sample preparation fluid within the cartridge body prior to use, and that is removed to allow the biological or environmental sample to be added to the sample preparation fluid contained in the cartridge body. In some embodiments, the single action by the user is a downward force applied to the closure relative to the cartridge body. In some embodiments, the downward force forms a snap fit between the closure and the cartridge body. In some embodiments, the downward force causes operation of the sample dispensing mechanism and seals the cartridge body. In some embodiments, the downward force comprises the downward force of a lever means. In some embodiments, the closure comprises a snap-fit dispense cap comprising one or more snapping members configured to form a snap fit with a distal end of the cartridge body upon the single action by the user.

In some embodiments, the sample dispensing mechanism comprises: a dispensing chamber that forms a second seal against the at least one seal to trap the predetermined sub-volume of the sample fluid within the dispensing chamber; and a plunger mechanism that forms a sliding seal with an internal surface of the dispensing chamber, wherein the sliding seal is configured to slide along the internal surface of the dispensing chamber to dispense the predetermined sub-volume of the sample fluid therefrom, through the at least one opening, and into the at least one reaction chamber. In some embodiments, the dispensing chamber comprises an outer surface having mutually spaced chamber locating features extending therefrom and configured to align the dispensing chamber centrally of the cartridge body and allow sample fluid to flow between the chamber locating features as the sample dispensing mechanism is inserted into the cartridge body.

In some embodiments, the sample dispensing mechanism is configured so that a single action performed by a user causes two stages of operation of the sample dispensing mechanism, including a first stage of operation that traps the predetermined sub-volume of the sample fluid within the dispensing chamber, and a second stage of operation wherein the sample fluid is dispensed from the dispensing chamber. In some embodiments, the sample dispensing mechanism comprises a force sequencing component that is reconfigured or broken to allow the second stage of operation. In some embodiments, the force sequencing component comprises a breakable component that is configured to break to allow operation of the sample dispensing mechanism to proceed from the first stage of operation to the second stage of operation. In some embodiments, the force sequencing component comprises a collapsible or crushable spacer that presses against and causes the dispensing chamber to seal in the first stage of operation, and in the second stage of operation is collapsed or crushed to maintain the seal, perform the perforation action, and operate the plunger to dispense the sample fluid from the dispensing chamber.

In some embodiments, the at least one piercing tip comprises a ball point tip. In some embodiments, the at least one piercing tip comprises an arrow head tip. In some embodiments, the at least one piercing tip comprises a frustoconical tip. In some embodiments, the at least one piercing tip does not comprise a sharp tip. In some embodiments, the distal portion of the at least one piercing tip comprises a flat surface. In some embodiments, the flat surface is at an angle of less than about 20°, about 15°, about 10°, about 5°, or about 1°, relative to the surface of the at least one seal.

In some embodiments, the at least one piercing tip is fluted. In some embodiments, the at least one piercing tip comprises one or more flow channels. In some embodiments, the one or more flow channels are positioned at (i) the proximal end of the at least one piercing tip, (ii) the distal end of the at least one piercing tip, or (iii) across the length of the at least one piercing tip. In some embodiments, at least a portion of the predetermined sub-volume of the sample fluid flows through the at least one opening via the one or more flow channels. In some embodiments, the fluid flow is at a higher flow rate as compared to a sample testing system wherein the least one piercing tip does not comprise one or more flow channels. In some embodiments, the one or more flow channels comprise a longitudinal groove extending along the at least one piercing tip. In some embodiments, the at least one piercing tip disrupting the at least one seal comprises the at least one piercing tip penetrating the at least one seal and moving into at least a portion of the at least one reaction chamber. In some embodiments, the at least one opening grows larger in size as the at least one piercing tip moves into at least a portion of the at least one reaction chamber. In some embodiments, the at least one opening stays substantially the same size as the at least one piercing tip moves into at least a portion of the at least one reaction chamber.

In some embodiments, the at least one reaction chamber comprises trapped gas, wherein the cartridge body comprises a gaseous head space above the sample fluid. In some embodiments, the dispense rod is configured to equalize pressure between the gaseous head space and the at least one reaction chamber after the at least one seal is disrupted. In some embodiments, the at least one piercing tip comprises at least one vent opening leading to a vent lumen extending through the dispense rod, wherein the dispense rod comprises a vent port positioned in the gaseous headspace and in fluid communication with the vent lumen of the dispense rod. In some embodiments, the sample dispensing mechanism comprises at least one hydrophobic filter. In some embodiments, any fluid passing between the at least one vent port and the at least one vent opening must pass through the hydrophobic filter. In some embodiments, the vent opening is positioned at (i) the proximal end of the at least one piercing tip, (ii) the distal end of the at least one piercing tip, or (iii) across the length of the at least one piercing tip. In some embodiments, the trapped gas displaced by the at least one piercing tip and/or the predetermined sub-volume of the sample fluid is capable of escaping via the at least one vent opening to the gaseous head space.

In some embodiments, the at least one piercing tip disrupting the at least one seal is capable of generating one or more flaps, wherein the one or more flaps comprise portion(s) of the at least one seal disrupted by the at least one piercing tip. In some embodiments, the flaps do not adhere to the at least one piercing tip and/or do not disrupt fluid flow through the opening. In some embodiments, the piercing tip comprises a geometry configured to reduce wicking of the sample fluid to the at least one piercing tip and/or the one or more flaps.

The large opening can comprise, for example, a puncture of at least about 50%, about 55%, about 60%, about 65%, about 70%, about 75%, about 80%, about 85%, about 90%, about 95%, about 98%, or about 99%, of the surface area of the at least one seal. In some embodiments, at least about 50%, about 55%, about 60%, about 65%, about 70%, about 75%, about 80%, about 85%, about 90%, about 95%, about 98%, or about 99%, of the surface area of the at least one seal comes into contact with the at least one piercing tip. In some embodiments, at least about 70%, about 75%, about 80%, about 85%, about 90%, about 95%, about 98%, or about 99%, of the predetermined sub-volume of the sample fluid enters the at least one reaction chamber. In some embodiments, less than about 30%, about 25%, about 20%, about 15%, about 10%, about 5%, or about 1%, of the predetermined sub-volume of the sample fluid remains in or on the dispensing chamber, the at least one seal, and/or the at least one piercing tip after the at least one seal is disrupted. In some embodiments, the predetermined sub-volume of the sample fluid comprises at least about 10 μL, about 15 μL, about 20 μL, about 25 μL, about 30 μL, about 35 μL, about 40 μL, about 45 μL, about 50 μL, about 60 μL, about 70 μL, about 80 μL, about 90 μL, about 100 μL, about 110 μL, about 120 μL, about 128 μL, about 130 μL, about 140 μL, about 150 μL, about 160 μL, about 170 μL, about 180 μL, about 190 μL, or about 200 μL, of the sample fluid.

In some embodiments, the sample dispensing mechanism comprises an overmolded layer disposed on the surface of at least a portion of the dispense rod and/or the dispensing chamber. In some embodiments, the overmolded layer forms a seal. In some embodiments, a cylindrical seal. In some embodiments, the overmolded layer comprises a thermoplastic elastomer (TPE) of a different durometer than at least a portion of the dispense rod and/or the dispensing chamber. In some embodiments, the overmolded layer exhibits a Shore D durometer or a Shore A durometer of about 20-30.

In some embodiments, the dispensing chamber is initially configured so that, as the sample dispensing mechanism is inserted into the cartridge body, the sample fluid is forced to flow around the outside of the dispensing chamber before it can flow into the dispensing chamber, wherein the fluid that flows around the outside of the dispensing chamber is caused to flow through a filter or porous filler material that retains and/or traps particles and debris and/or incorporates biological or chemical components that bind to or capture components of the sample fluid that may otherwise inhibit or interfere with the sample testing.

In some embodiments, the cartridge body comprises one or more magnetic particles with the sample preparation fluid, the surface of the magnetic particles being coated or functionalized to bind with and capture at least one predetermined target species of the biological or environmental sample when the magnetic particles are mixed within the sample fluid, and the sample dispensing mechanism is configured so that, as the sample dispensing mechanism is inserted into the cartridge body, the sample fluid is forced to flow through the dispensing chamber, and one or more magnets are located in close proximity to the inside surface of the dispensing chamber so that magnetic particles contained within the sample fluid and have captured target species are attracted to and held against the internal surface of the dispensing chamber, such that the plunger mechanism that forms a sliding seal with the internal surface of the dispensing chamber collects the magnetic particles held against the internal surface and dispenses them into the at least one reaction chamber to provide an increased concentration of the at least one predetermined target species in the predetermined sub-volume of the sample fluid dispensed into the at least one reaction chamber.

In some embodiments, the at least one reaction chamber is two reaction chambers, and wherein the at least one piercing tip is two piercing tips. In some embodiments, the reaction chambers comprise polymerase chain reaction (PCR) tubes. In some embodiments, the two reaction chambers comprise a mixing bead. In some embodiments, the reaction chambers comprise different reagents selected to perform respective different tests and/or to detect respective different target entities. In some embodiments, the cartridge body comprises sample preparation reagents, and wherein at least one of the reaction chambers comprises one or more reagents for a reverse transcription reaction and/or an amplification reaction. In some embodiments, the cartridge body comprises one or more alignment features configured to align and engage with one or more mating slots of a testing apparatus. In some embodiments, the one or more alignment features prevent rotation of the cartridge body when it is in place in the testing apparatus. In some embodiments, the one or more alignment features enable a user to remove the second closure and/or perform the single action in a single-handed operation.

Disclosed herein include sample testing methods. In some embodiments, sample testing method comprises the steps of: adding a biological or environmental sample into a sample preparation fluid contained in a cartridge body of a sample testing system disclosed herein for preparation of a sample fluid therein; after the adding step, inserting a sample dispensing mechanism into the cartridge body and applying a closure thereto; and operating the sample dispensing mechanism to disrupt at least one seal between the cartridge body and at least one reaction chamber to allow sample fluid to enter the at least one reaction chamber from the cartridge body, and to dispense a predetermined sub-volume of the sample fluid from the cartridge body into the at least one reaction chamber for testing therein while preventing further fluid movement between the cartridge body and the at least one reaction chamber. The method can comprise: before the adding step, placing the sample testing system into a receiving port of a testing apparatus configured to perform a test on the biological or environmental sample therein.

There are provided, in some embodiments, testing apparatuses. A testing apparatus can comprise a receiving port configured to receive a sample testing system provided herein. In some embodiments, the testing apparatus is configured to perform a test on the biological or environmental sample therein. In some embodiments, the testing apparatus further comprises a lever means configured to apply a downward force to the sample testing system placed in the receiving port. In some embodiments, the single action is a downward force applied to the closure relative to the cartridge body via the lever means. In some embodiments, the downward force forms a snap fit between the closure and the cartridge body. In some embodiments, the lever means comprises a hinged lid. In some embodiments, the hinged lid comprises a ridge configured to contact the surface of the closure. In some embodiments, the testing apparatus further comprises a sleeve for storing the lever means. In some embodiments, the hinged lid is substantially parallel to the cartridge body when stored within the sleeve. In some embodiments, at least a portion of the hinged lid is configured to slide up and out of the sleeve when lifted by a user to expose a hinge of the hinged lid. In some embodiments, upon the hinge being exposed, the hinged lid is capable of being pivoted into a horizontal position substantially perpendicular to the cartridge body. In some embodiments, the testing apparatus comprises one or more mating slots configured to align and engage with one or more alignment features of a cartridge body. In some embodiments, the one or more mating slots are situated in the receiving port. In some embodiments, the one or more alignment features prevent rotation of the cartridge body when it is in place in the testing apparatus. In some embodiments, the one or more alignment features enable a user to remove the second closure and/or perform the single action in a single-handed operation.

DETAILED DESCRIPTION

Figure 2:
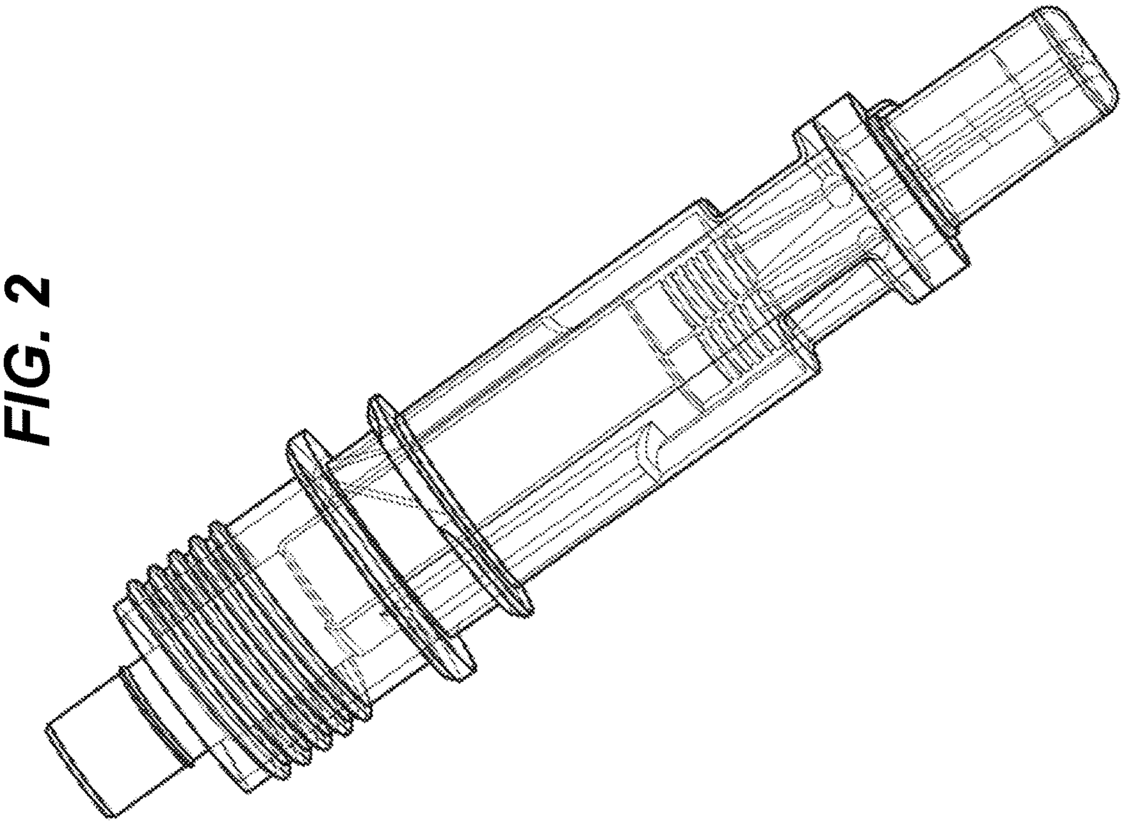
FIG. 1 and FIG. 2 depict non-limiting exemplary schematic illustrations of a dual reaction chamber cartridge wherein an inserted sample dispensing mechanism (comprising dual piercing tips) is in an initial position.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

All patents, published patent applications, other publications, and sequences from GenBank, and other databases referred to herein are incorporated by reference in their entirety with respect to the related technology.

Disclosed herein include sample testing systems. The sample testing system can comprise: a cartridge body to receive a biological or environmental sample into a sample preparation fluid contained in the cartridge body for preparation of a sample fluid therefrom. In some embodiments, the sample testing system comprises: at least one reaction chamber coupled to the cartridge body. In some embodiments, the sample testing system comprises: at least one seal between the cartridge body and the at least one reaction chamber to prevent fluid movement between the cartridge body and the at least one reaction chamber. In some embodiments, the sample testing system comprises: a sample dispensing mechanism for insertion into the cartridge body after receipt of the biological or environmental sample therein.

In some embodiments, the sample dispensing mechanism is operable to disrupt the at least one seal to allow sample fluid to enter the at least one reaction chamber from the cartridge body, and to dispense a predetermined sub-volume of the sample fluid from the cartridge body into the at least one reaction chamber for testing therein while preventing further fluid movement between the cartridge body and the at least one reaction chamber. In some embodiments, the sample dispensing mechanism comprises a dispense rod comprising at least one piercing tip that disrupts the at least one seal by forming at least one opening therein, and wherein the at least one piercing tip comprises a geometry configured to generate a large opening in the at least one seal. In some embodiments, the cartridge body initially provides an open volume free of obstructions such that a swab carrying the biological or environmental sample can be used to stir the sample preparation fluid in the cartridge body and to wash the biological or environmental sample from the swab into the sample preparation fluid.

Disclosed herein include sample testing methods. The sample testing method can comprise, for example, the steps of: adding a biological or environmental sample into a sample preparation fluid contained in a cartridge body of a sample testing system disclosed herein for preparation of a sample fluid therein; after the adding step, inserting a sample dispensing mechanism into the cartridge body and applying a closure thereto; and operating the sample dispensing mechanism to disrupt at least one seal between the cartridge body and at least one reaction chamber to allow sample fluid to enter the at least one reaction chamber from the cartridge body, and to dispense a predetermined sub-volume of the sample fluid from the cartridge body into the at least one reaction chamber for testing therein while preventing further fluid movement between the cartridge body and the at least one reaction chamber. The method can comprise: before the adding step, placing the sample testing system into a receiving port of a testing apparatus configured to perform a test on the biological or environmental sample therein.

Unless defined otherwise, technical and scientific terms used herein have the same meaning as commonly understood by one of ordinary skill in the art to which the present disclosure belongs. See, e.g. Singleton et al., Dictionary of Microbiology and Molecular Biology 2nd ed., J. Wiley & Sons (New York, NY 1994); Sambrook et al., Molecular Cloning, A Laboratory Manual, Cold Spring Harbor Press (Cold Spring Harbor, NY 1989). For purposes of the present disclosure, the following terms are defined below.

There are provided, in some embodiments, methods, compositions, systems, and apparatuses for sample testing. Disclosed herein include methods, compositions, systems, and apparatuses for piercing seals for patient sample assays and piercing sample assays. There is provided, in some embodiments, a dual rod piercing and fluid dispensing device. The device can be part of the consumable of a molecular point of care rapid test system. The consumable device can be composed of a two part system. The first part of the system can comprise the main cartridge, composed of a cap, an upper section called the cartridge body (e.g., sample preparation reservoir) filled with a diluent (e.g., sample preparation fluid), and a lower section called the dual tube which is a symmetrical pair of reaction chambers each containing dried down molecular reagents and a mixing bead, the upper and lower sections being separated by a foil seal and an elastomeric gasket. The second part of the system can comprise a dispense rod and/or cap assembly.

In some embodiments of the uses provided herein, a patient sample, typically collected with a swab, is mixed into the diluent in the cartridge. The swab can be removed, and then the dispense rod can be inserted into the cartridge. In some embodiments, screwing the cap of the dispense rod and cap assembly drives the dispense rod downward through the cartridge body, pierces the foil seal directly above each of the two reaction chambers, and drives the sample fluid through the seal and into the reaction chambers. In order to achieve the desired performance of the chemistry, the amount of fluid dispensed into the reaction chambers must be accurate within a small tolerance.

There are provided, in some embodiments, dispense rods configured to improve the flow and accuracy of the dispensed fluid. Various piercing tip geometries are provided herein that have at their central purpose creating a larger opening in the foil and creating a higher volume pathway through which to direct the liquid flow.

Currently available compositions and methods suffer from the cartridge design disadvantage that the liquid is forced into the scaled reaction chambers, compressing the gas in the chambers and creating pressure on the seals, increasing the opportunities for leaks to occur, which in turn reduces the accuracy of the dispensed volume. Embodiments provided herein contemplate various geometries to allow the gas in the reaction chamber to vent into the head space of the cartridge body, equalizing the pressure and thereby improving the reliability of the seals and the accuracy of the dispensed volume. Provided herein, in some embodiments, is a complex plastic disposable that pierces foil to push patient sample for assay and deliver dispense a predetermined sub-volume of the sample fluid (e.g., 100 μL) from the cartridge body into the at least one reaction chamber of a reagent dual tube region.

In some embodiments, the piercing tip geometry is such that a full opening is created to allow a full dispense to the reaction chambers. In some embodiments, the piercing tip geometry also is designed such to limit wicking of aliquot and/or vent trapped gas in the reagent chamber. Embodiments of the dispense rod and piercing tip geometry provided herein can be combined, e.g., adding a geometry to allow venting of trapped gas to increase accuracy of the dispensed aliquot. In some embodiments, the tip geometry provided herein allows for a greater puncture orifice for better volume dispense as well possible venting of gas trapped in an enclosed chamber.

A sharp tip can pierce a seal such as an AL seal, but can then close back round the shaft cause poor flow and adhesion of fluid. The ball point tip of the piercing tips described herein can allow a larger puncture to increase fluid flow and prevent the seal such as foil to want to grab onto the shaft of the dispensing rod. Fluted tip designs of the piercing tips described herein can also allow a larger puncture and at the same time vent and allow fluid to flow via the flutes. Arrow head designs of the piercing tips described herein can also improve fluid flow and increase accuracy of the dispensed aliquot.

Foil piercing rods with unique geometries to enhance fluid dispensing and dual piercing dispense rods for aliquoting are provided herein. There are provided, in some embodiments, PCR foil dispense rods. The methods, compositions, systems, and apparatuses provided herein, such as the dispensing rods disclosed herein, can be employed in a variety of dispensing contexts beyond PCR tubes. The compositions, systems, and methods described herein find utility in a variety of different environments where a predetermined sub-volume of the sample fluid is dispensed into a chamber (e.g., reaction chamber).

Without being bound by any particular theory, the methods, compositions, systems, and apparatuses disclosed herein yield improved performance relative to currently available methods and systems due to the improved fluid flow, reduced fluid adhesion, and/or venting of trapped gas of the embodiments provided herein.

Disclosed herein include sample testing systems. The sample testing system can comprise: a cartridge body to receive a biological or environmental sample into a sample preparation fluid contained in the cartridge body for preparation of a sample fluid therefrom. The sample testing system can comprise: at least one reaction chamber coupled to the cartridge body. The sample testing system can comprise: at least one seal between the cartridge body and the at least one reaction chamber to prevent fluid movement between the cartridge body and the at least one reaction chamber. The sample testing system can comprise: a sample dispensing mechanism for insertion into the cartridge body after receipt of the biological or environmental sample therein.

The sample dispensing mechanism can be operable to disrupt the at least one seal to allow sample fluid to enter the at least one reaction chamber from the cartridge body, and to dispense a predetermined sub-volume of the sample fluid from the cartridge body into the at least one reaction chamber for testing therein while preventing further fluid movement between the cartridge body and the at least one reaction chamber. The sample dispensing mechanism can comprise a dispense rod comprising at least one piercing tip that disrupts the at least one seal by forming at least one opening therein. The at least one piercing tip can comprise a geometry configured to generate a large opening in the at least one seal. The large opening can comprise a puncture of at least about 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 100%, or a number or a range between any two of these values, of the surface area of the at least one seal. In some embodiments, the cartridge body initially provides an open volume free of obstructions such that a swab carrying the biological or environmental sample can be used to stir the sample preparation fluid in the cartridge body and to wash the biological or environmental sample from the swab into the sample preparation fluid.

The sample dispensing mechanism can comprise: a dispensing chamber that forms a second seal against the at least one seal to trap the predetermined sub-volume of the sample fluid within the dispensing chamber. The sample dispensing mechanism can comprise: a plunger mechanism that forms a sliding seal with an internal surface of the dispensing chamber, wherein the sliding seal is configured to slide along the internal surface of the dispensing chamber to dispense the predetermined sub-volume of the sample fluid therefrom, through the at least one opening, and into the at least one reaction chamber. The dispensing chamber can comprise an outer surface having mutually spaced chamber locating features extending therefrom and configured to align the dispensing chamber centrally of the cartridge body and allow sample fluid to flow between the chamber locating features as the sample dispensing mechanism is inserted into the cartridge body.

The sample dispensing mechanism can be configured so that a single action performed by a user causes two stages of operation of the sample dispensing mechanism, including a first stage of operation that traps the predetermined sub-volume of the sample fluid within the dispensing chamber, and a second stage of operation wherein the sample fluid is dispensed from the dispensing chamber. The sample dispensing mechanism can comprise a force sequencing component that is reconfigured or broken to allow the second stage of operation. The force sequencing component can comprise a breakable component that is configured to break to allow operation of the sample dispensing mechanism to proceed from the first stage of operation to the second stage of operation. The force sequencing component can comprise a collapsible or crushable spacer that presses against and causes the dispensing chamber to seal in the first stage of operation, and in the second stage of operation is collapsed or crushed to maintain the seal, perform the perforation action, and operate the plunger to dispense the sample fluid from the dispensing chamber.

Figure 1:
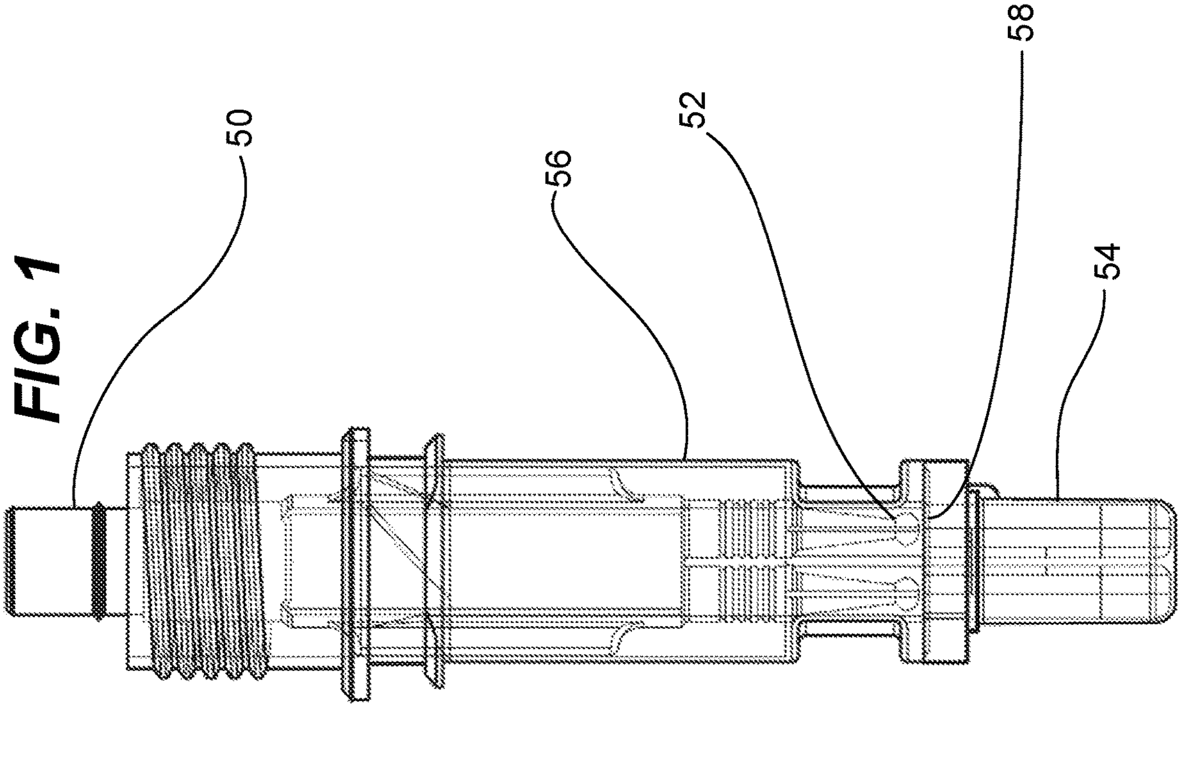
Figure 4:
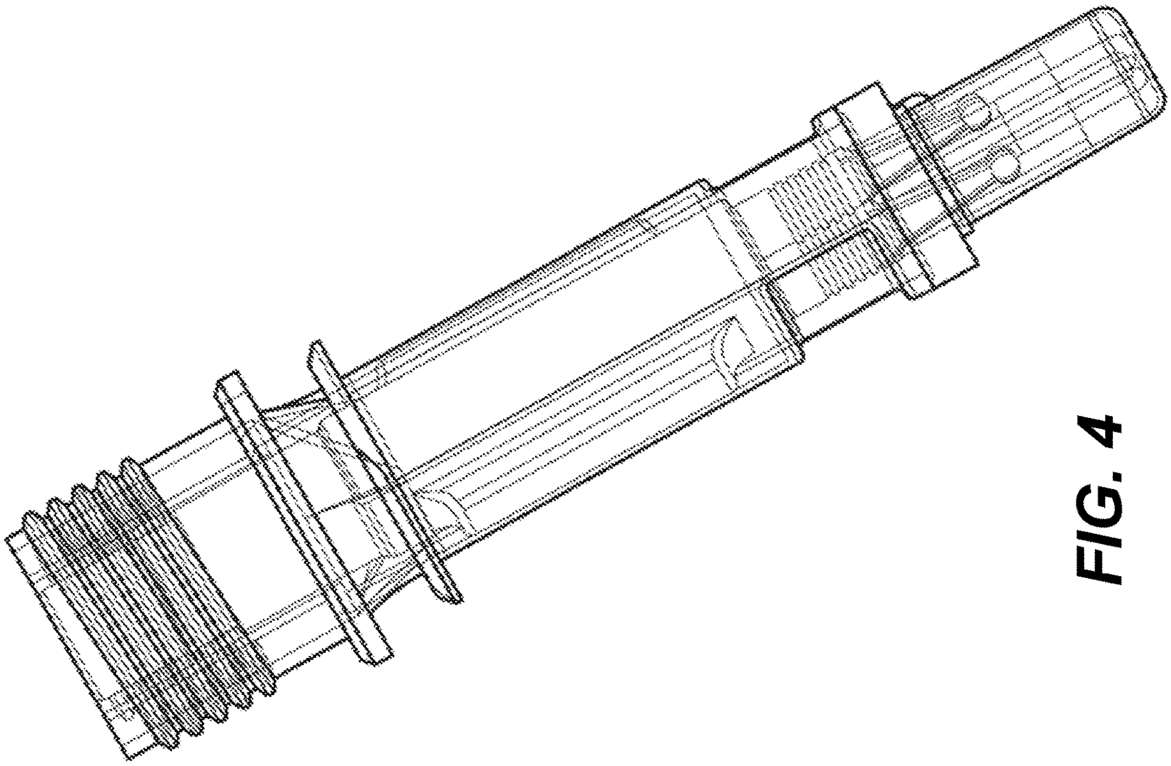
FIG. 3 and FIG. 4 depict non-limiting exemplary schematic illustrations of the cartridge shown in FIG. 1 and FIG. 2 wherein the sample dispensing mechanism is fully inserted, leading to seals being fully pierced by the piercing tips and the predetermined sub-volume of the sample fluid from the cartridge body being dispensed into the dual reaction chambers.
Figure 3:
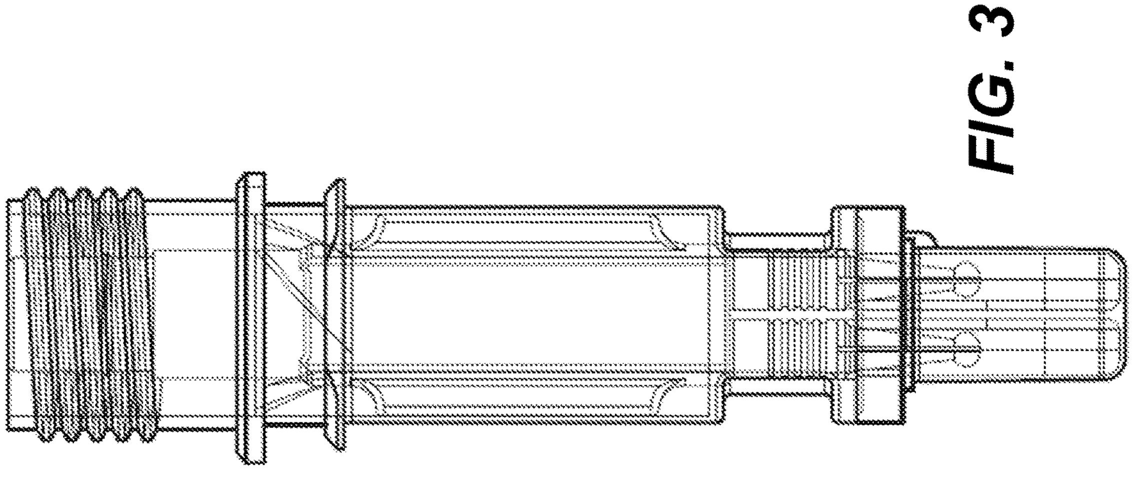

The at least one piercing tip can comprise a ball point tip. The at least one piercing tip can comprise an arrow head tip. The at least one piercing tip can comprise a frustoconical tip. FIG. 1 and FIG. 2 depict non-limiting exemplary schematic illustrations of a dual reaction chamber cartridge wherein an inserted sample dispensing mechanism 50 (comprising dual piercing tips 52) is in an initial position. The dual reaction chamber 54 can be coupled to the cartridge body 56 as provided herein. Seal(s) 58 between the cartridge body and the reaction chambers can prevent fluid movement between the cartridge body and reaction chambers. FIG. 3 and FIG. 4 depict non-limiting exemplary schematic illustrations of the cartridge shown in FIG. 1 and FIG. 2 wherein the sample dispensing mechanism is fully inserted, leading to seals 58 being fully pierced by the piercing tips and the predetermined sub-volume of the sample fluid from the cartridge body 56 being dispensed into the dual reaction chambers 54.

Figure 5:
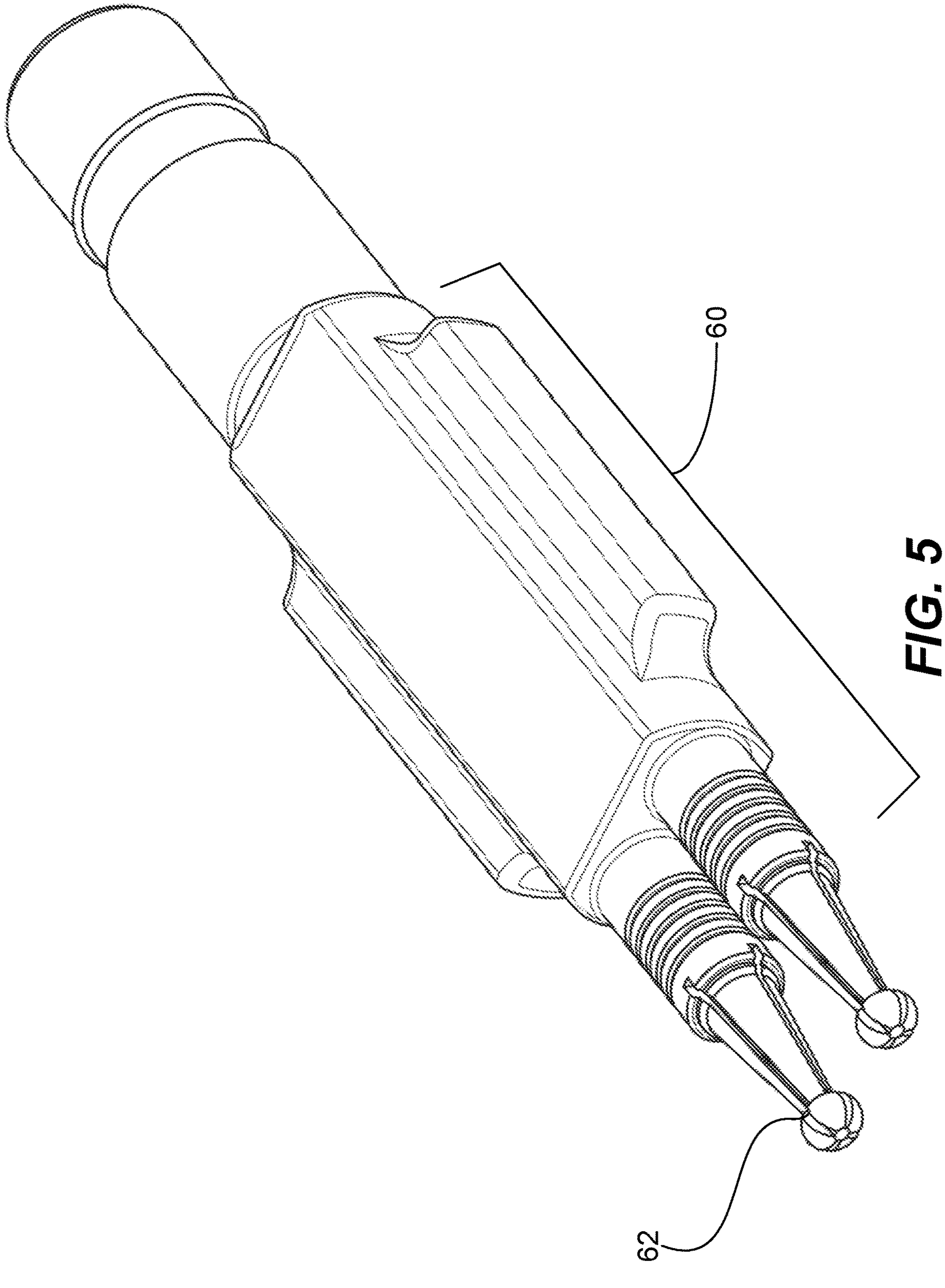
FIG. 5 depicts a non-limiting exemplary schematic illustration of a ball point flow channel embodiment of the piercing tip with an overmolded layer of the sample dispensing mechanism indicated by bracket.
Figure 6:
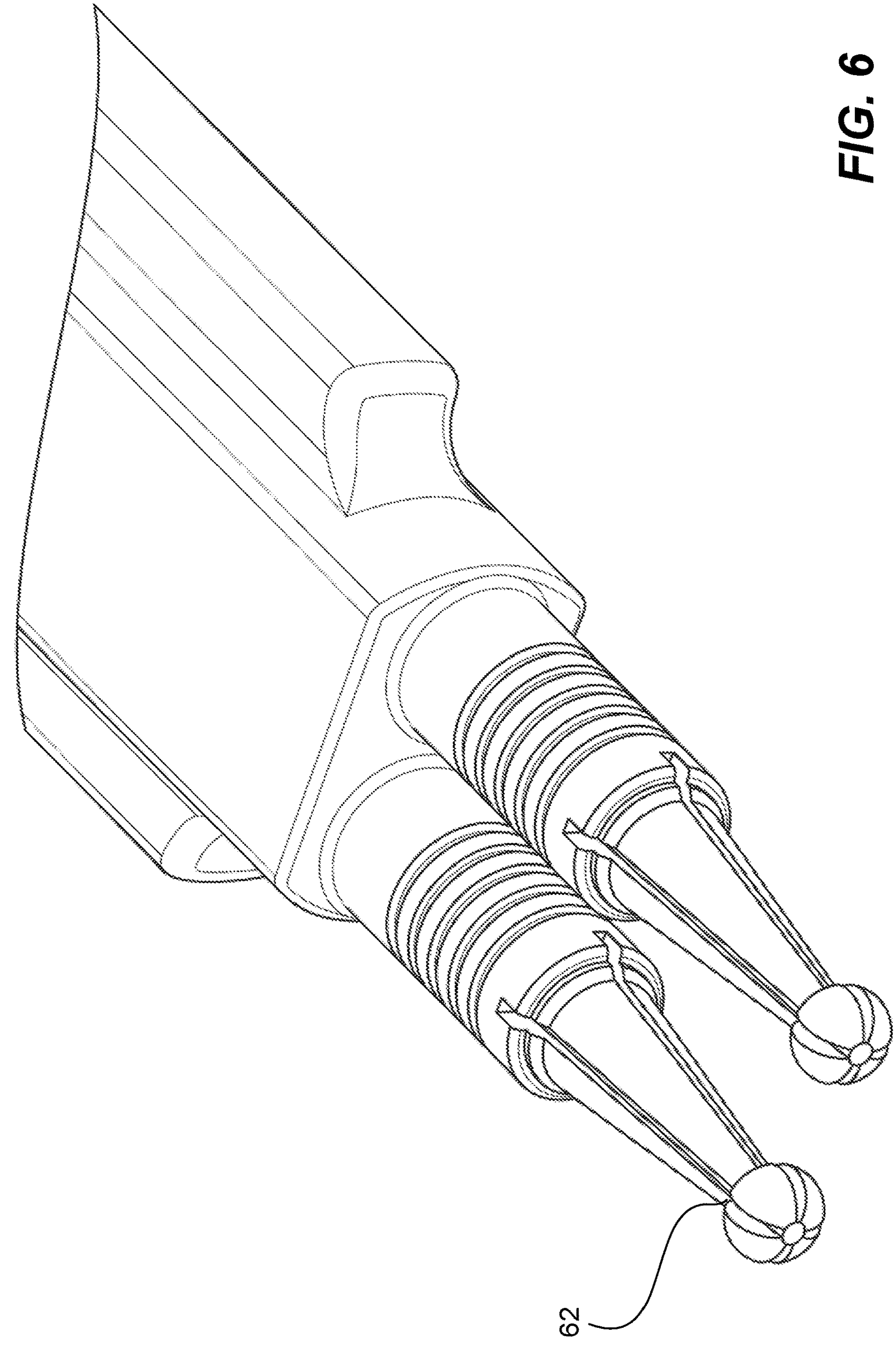
FIG. 6 depicts a non-limiting exemplary schematic illustration of a ball point flow channel embodiment of the piercing tip.
Figure 11:
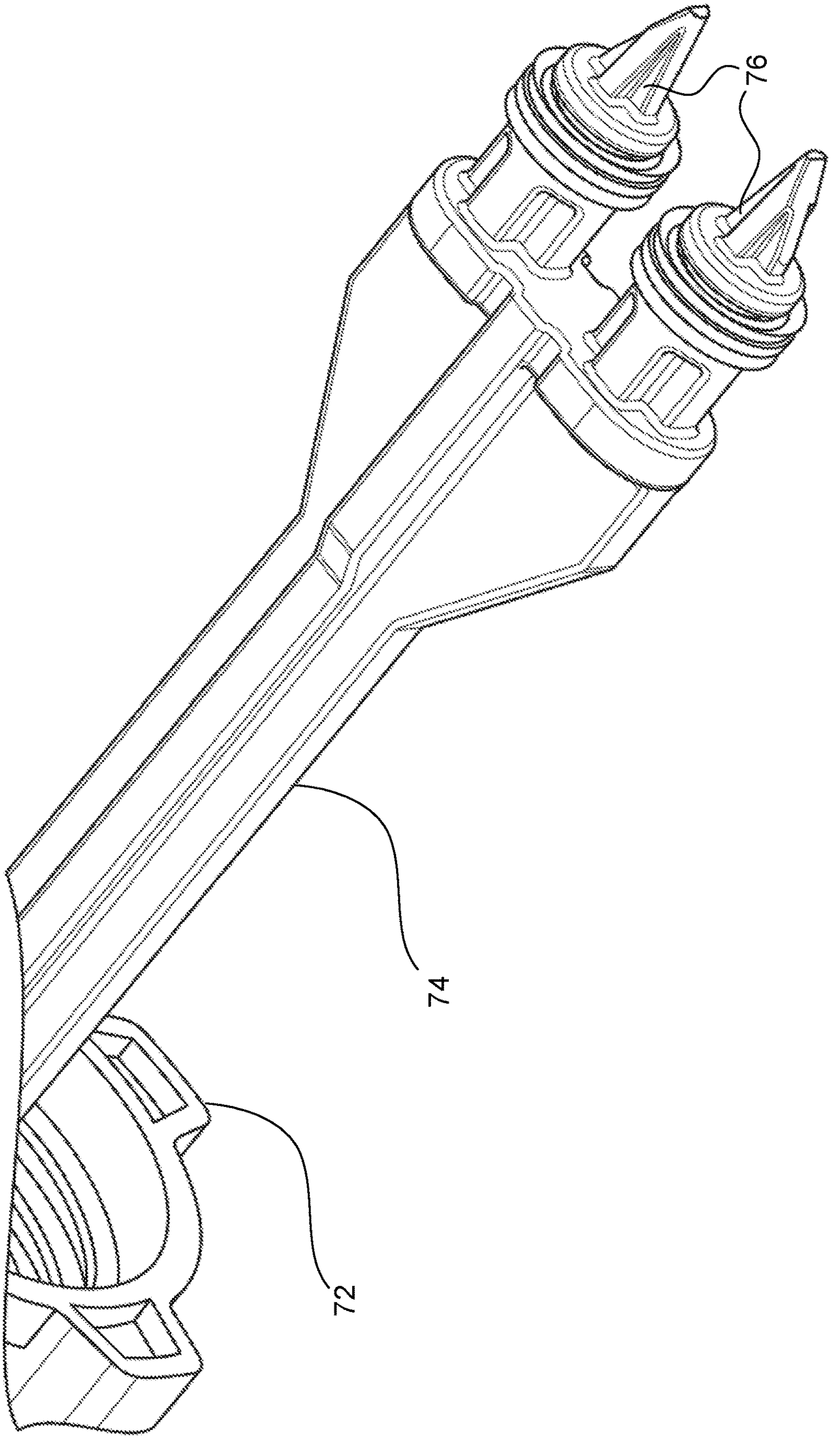
FIG. 11 depicts a non-limiting exemplary schematic illustration of a dispensing cap assembly wherein the piercing tips comprise flow channels and a transition to a larger opening.

Some embodiments of the sample testing systems provided herein comprise one or more overmolded layers. One or more components of the cartridges provided herein can comprise a thermoplastic elastomer (TPE). Cartridges are provided herein that comprise one or more overmolded layers of different durometer. The choice of TPE and the durometer thereof can vary depending on the embodiment and the nature and purpose of the overmolded layer. In some embodiments, the sample dispensing mechanism comprises an overmolded layer disposed on the surface of at least a portion of the dispense rod and/or the dispensing chamber. The overmolded layer can form a seal, such as a cylindrical seal. The overmolded layer can comprise a thermoplastic elastomer (TPE) of a different durometer than a surface which it covers, such as, for example, at least a portion of the dispense rod and/or the dispensing chamber. The durometer of the TPE can be different in different embodiments. In some embodiments, the durometer of the TPE can be, or can be about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, or a number or a range between any two of these values, on the Shore A scale or on the a Shore D scale. In some embodiments, the durometer of the TPE can be at least, or can be at most, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, on the Shore A scale or on the a Shore D scale. In some embodiments, the overmolded layer exhibits a Shore D durometer or a Shore A durometer of about 20-30. FIG. 5 depicts a non-limiting exemplary schematic illustration of a ball point flow channel embodiment of the piercing tip with an overmolded layer 60 of the sample dispensing mechanism (indicated by bracket). Flow channels 62 starting at the distal end of the piercing tip and running along its length are shown. FIG. 6 depicts another non-limiting exemplary schematic illustration of a ball point flow channel embodiment of the piercing tip. FIG. 11 depicts a non-limiting exemplary schematic illustration of a dispensing cap assembly (comprising cap 72 and dispense rod 74) wherein the piercing tips comprise flow channels 76 and a transition to a larger opening.

A dispense rod can comprise at least one piercing tip. The number of piercing tips can vary. The number of piercing tips can correspond to the number of reaction chambers in the cartridge. For example, a dual reaction chamber cartridge can comprise a dispense rod with dual action piercing tips. The number of piercing tips on a dispense rod can be different in different embodiments. In some embodiments, the number of piercing tips on a dispense rod can be, or can be about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 300, 400, 500, 600, 700, 800, 900, 1000, or a number or a range between any two of these values. In some embodiments, the number of piercing tips on a dispense rod can be at least, or can be at most, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 300, 400, 500, 600, 700, 800, 900, or 1000. The number of reaction chambers coupled to the cartridge body can be different in different embodiments. In some embodiments, the number of reaction chambers coupled to the cartridge body can be, or can be about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 300, 400, 500, 600, 700, 800, 900, 1000, or a number or a range between any two of these values. In some embodiments, the number of reaction chambers coupled to the cartridge body can be at least, or can be at most, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 300, 400, 500, 600, 700, 800, 900, or 1000. In some embodiments, the number of seals can be at least, or can be at most, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 200, 300, 400, 500, 600, 700, 800, 900, or 1000.

The volume of the predetermined sub-volume of the sample fluid can be different in different embodiments. The predetermined sub-volume of the sample fluid comprises at least about 10 μL, about 15 μL, about 20 μL, about 25 μL, about 30 μL, about 35 μL, about 40 μL, about 45 μL, about 50 μL, about 60 μL, about 70 μL, about 80 μL, about 90 μL, about 100 μL, about 110 μL, about 120 μL, about 128 μL, about 130 μL, about 140 μL, about 150 μL, about 160 μL, about 170 μL, about 180 μL, about 190 μL, or about 200 μL, or a number or a range between any two of these values.

Reaction chambers coupled to the same cartridge can comprise different reagents selected to perform respective different tests and/or to detect respective different target entities. In some embodiments, the number of different types of reagents can be at least, or be at most, 2, 3, 4, 5, 6, 7, 8, 9, 10, 20, 30, 40, 50, 60, 70, 80, 90, 100, 200, 300, 400, 500, 600, 700, 800, 900, 1000, 10000, or 100000. The reagents can, for example, be lyophilized, heat dried, freeze dried, or in a stable buffer. The test reagents contained within the cartridge prior to test can be configured for other types of testing not necessary utilizing nucleic acid amplification. For example, direct chemical reaction detection can be used in some embodiments to detect the presence of trace elements or additives within a sample. Optionally, immunoassay detection methods can be used to directly bind to and provide detection of specific proteins within the sample material that has been diluted and dispensed into one or more reaction chambers (e.g., test tubes).

The at least one piercing tip disrupting the at least one seal can be capable of generating one or more flaps. The one or more flaps can comprise portion(s) of the at least one seal disrupted by the at least one piercing tip. In some embodiments, the flaps do not adhere to the at least one piercing tip and/or do not disrupt fluid flow through the opening. The piercing tip can comprise a geometry configured to reduce wicking of the sample fluid to the at least one piercing tip and/or the one or more flaps.

In some embodiments, at least about 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 100%, or a number or a range between any two of these values, of the surface area of the at least one seal comes into contact with the at least one piercing tip. In some embodiments, at least about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 100%, or a number or a range between any two of these values, of the predetermined sub-volume of the sample fluid enters the at least one reaction chamber. In some embodiments, less than about 30%, about 25%, about 20%, about 15%, about 10%, about 5%, about 1%, or a number or a range between any two of these values, of the predetermined sub-volume of the sample fluid remains in or on the dispensing chamber, the at least one seal, and/or the at least one piercing tip after the at least one seal is disrupted.

Figure 14:
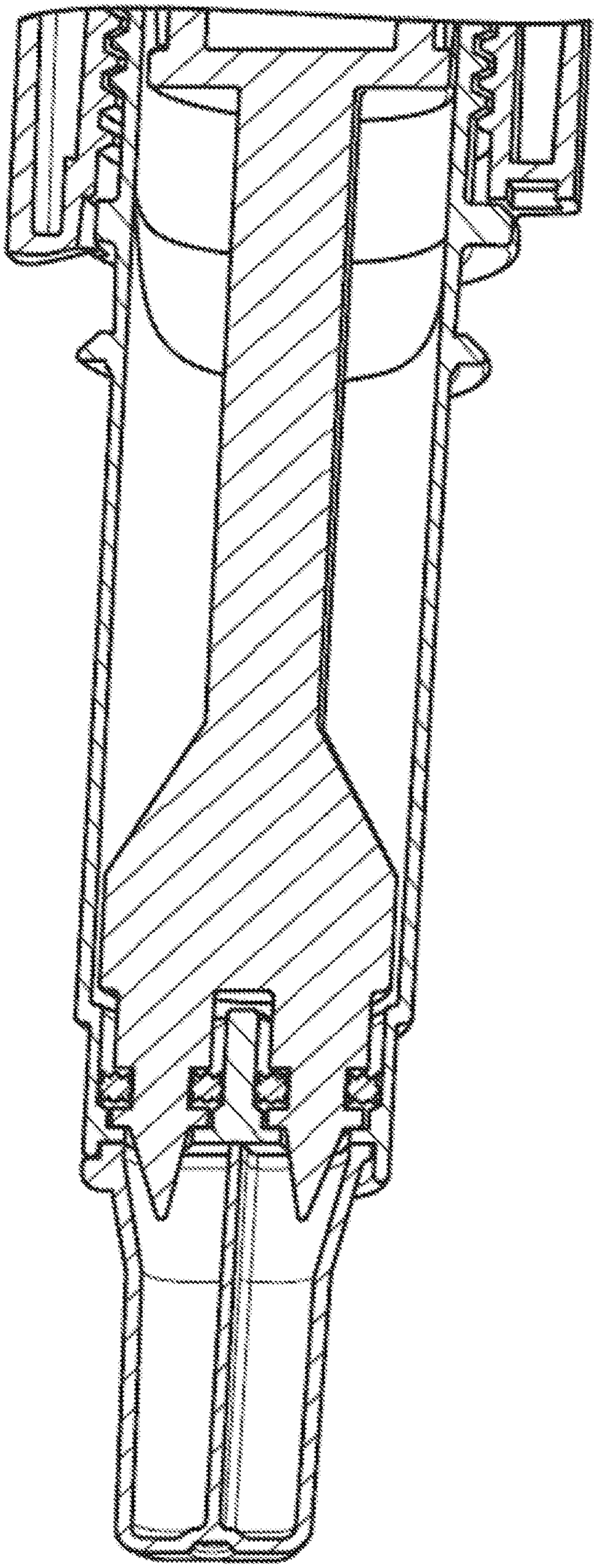
FIG. 14 depicts a non-limiting exemplary schematic illustration of a cross-sectional view of a piercing rod provided herein.
Figure 16:
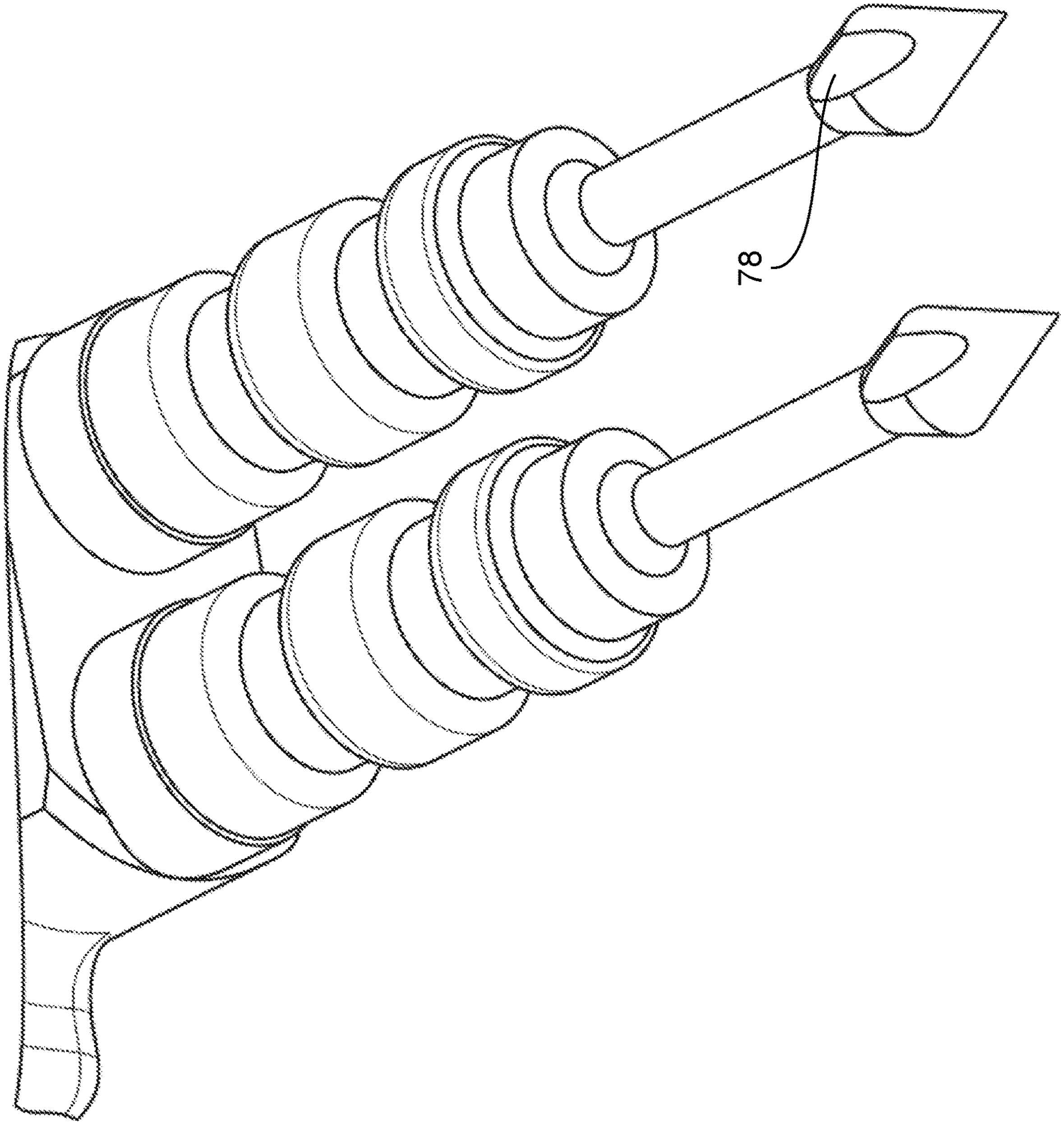
FIG. 16 depicts a non-limiting exemplary schematic illustration of a dispense rod comprising arrow-like fluted piercing tips.

FIG. 16 depicts a non-limiting exemplary schematic illustration of a dispense rod comprising arrow-like piercing tips with flutes 78. The at least one piercing tip can be fluted. The at least one piercing tip can comprise one or more flow channels. The one or more flow channels can be positioned at (i) the proximal end of the at least one piercing tip, (ii) the distal end of the at least one piercing tip, or (iii) across the length of the at least one piercing tip. In some embodiments, at least a portion of the predetermined sub-volume of the sample fluid flows through the at least one opening via the one or more flow channels. The fluid flow can be at a higher flow rate (e.g., at least about 1.5-fold higher flow rate (e.g., 1.5-fold, 3-fold, 4-fold, 5-fold, 6-fold, 7-fold, 8-fold, 9-fold, 10-fold, 20-fold, 30-fold, 40-fold, 50-fold, 60-fold, 70-fold, 80-fold, 90-fold, 100-fold, or a number or a range between any of these values)) as compared to a sample testing system wherein the least one piercing tip does not comprise one or more flow channels. The one or more flow channels can comprise a longitudinal groove extending along the at least one piercing tip. The at least one piercing tip disrupting the at least one seal can comprise the at least one piercing tip penetrating the at least one seal and moving into at least a portion of the at least one reaction chamber. The at least one opening can grow larger in size as the at least one piercing tip moves into at least a portion of the at least one reaction chamber. The at least one opening can stay substantially the same size as the at least one piercing tip moves into at least a portion of the at least one reaction chamber. FIG. 14 depicts a non-limiting exemplary schematic illustration of a cross-sectional view of a piercing rod provided herein.

Figure 15:
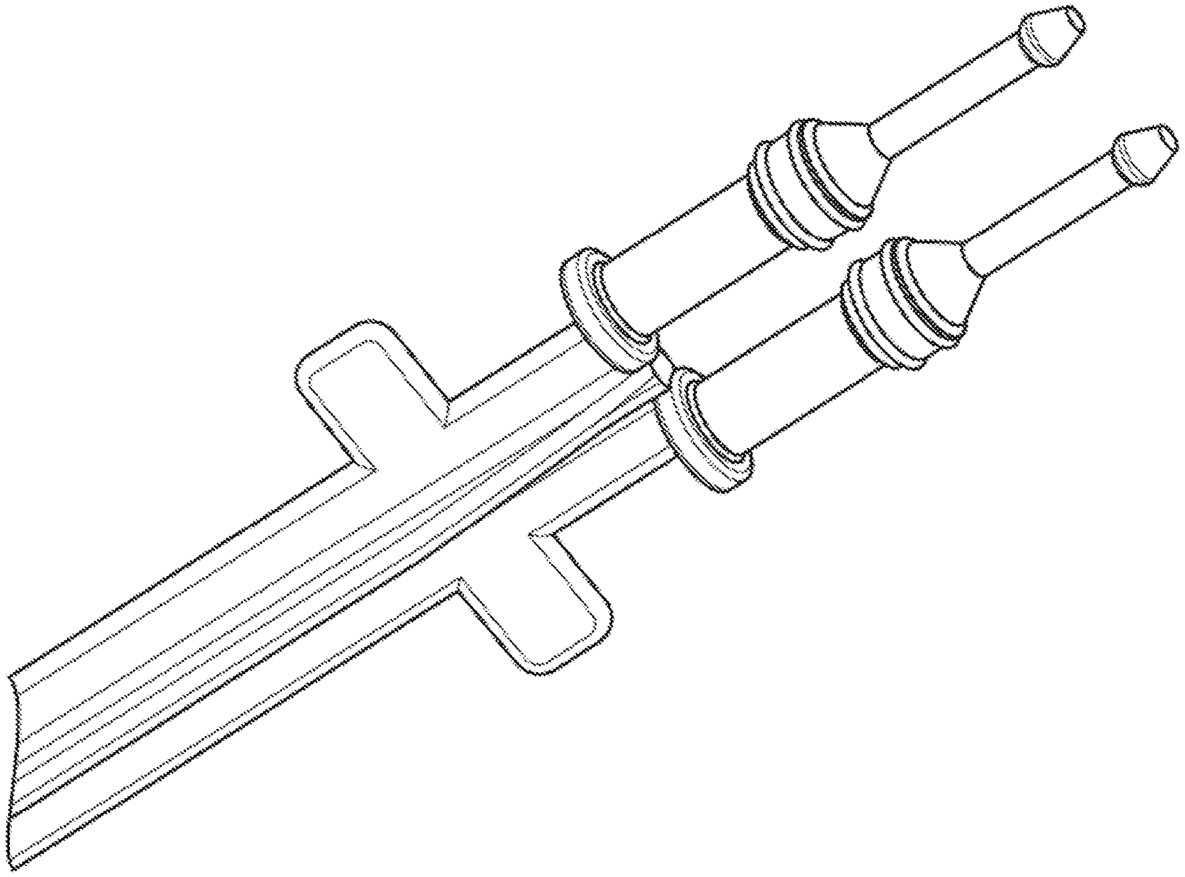
FIG. 15 depicts a non-limiting exemplary schematic illustration of a dispense rod comprising piercing tips without a sharp tip.

In some embodiments, the at least one piercing tip does not comprise a sharp tip. FIG. 15 depicts a non-limiting exemplary schematic illustration of a dispense rod comprising piercing tips without a sharp tip. The distal portion of the at least one piercing tip can comprise a flat surface. The flat surface can be at an angle of less than about 20°, about 15°, about 10°, about 5°, or about 1°, relative to the surface of the at least one seal. In some embodiments, the flat surface of the at least one piercing tip can be at an angle of about, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87°, 88°, 89°, 90°, 91°, 92°, 93°, 94°, 95°, 96°, 97°, 98°, 99°, 100°, 110°, 120°, 130°, 140°, 150°, 160°, 170°, 180°, or a number or a range between any two of these values, relative to the surface of the at least one seal. In some embodiments, the flat surface of the at least one piercing tip can be at an angle of at least, or can be at most, 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87°, 88°, 89°, 90°, 91°, 92°, 93°, 94°, 95°, 96°, 97°, 98°, 99°, 100°, 110°, 120°, 130°, 140°, 150°, 160°, 170°, or 180, relative to the surface of the at least one seal.

Figure 7:
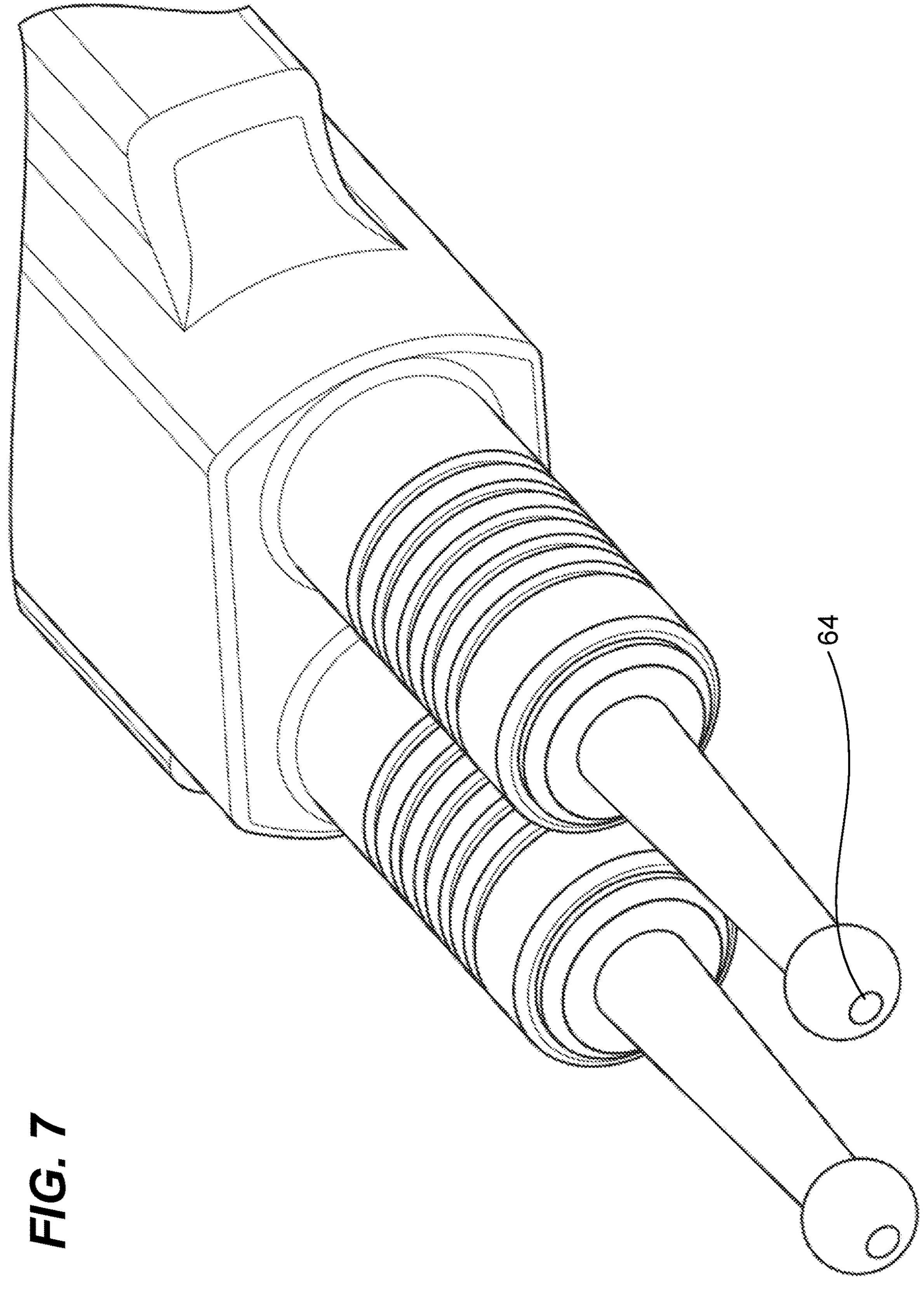
FIG. 7 depicts a non-limiting exemplary schematic illustration of a ball point embodiment of the piercing tips provided herein, wherein a vent opening is positioned at the distal end of the piercing tip.
Figure 8:
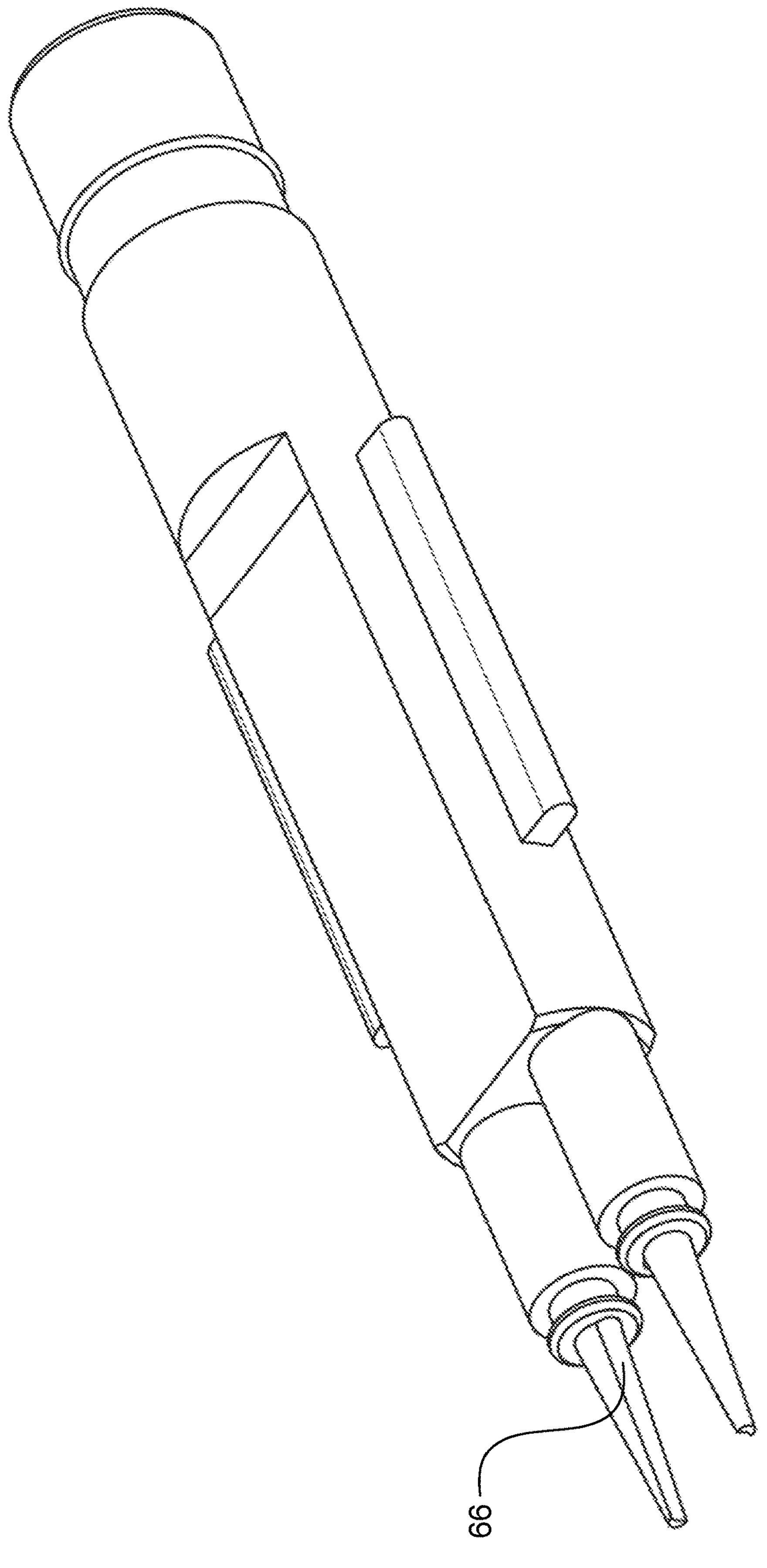
FIG. 8 depicts a non-limiting exemplary schematic illustration of a sample dispensing mechanism wherein a vent opening is positioned across the length of the piercing tip.
Figure 9:
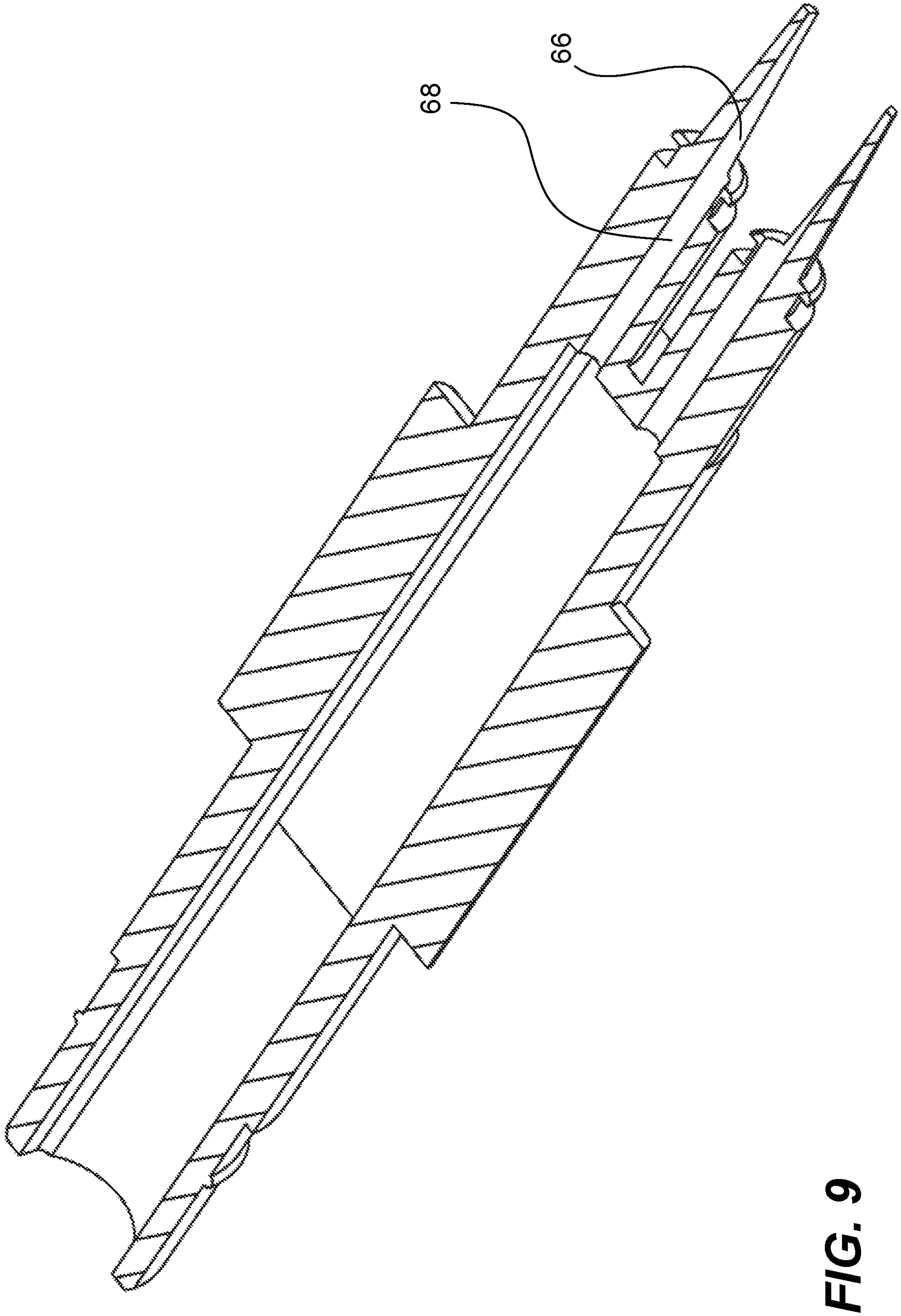
FIG. 9 depicts a non-limiting exemplary schematic illustration of a cross-sectional side view of the sample dispensing mechanism shown in FIG. 8 wherein the gas vent opening is shown leading to an internal chamber.
Figure 10:
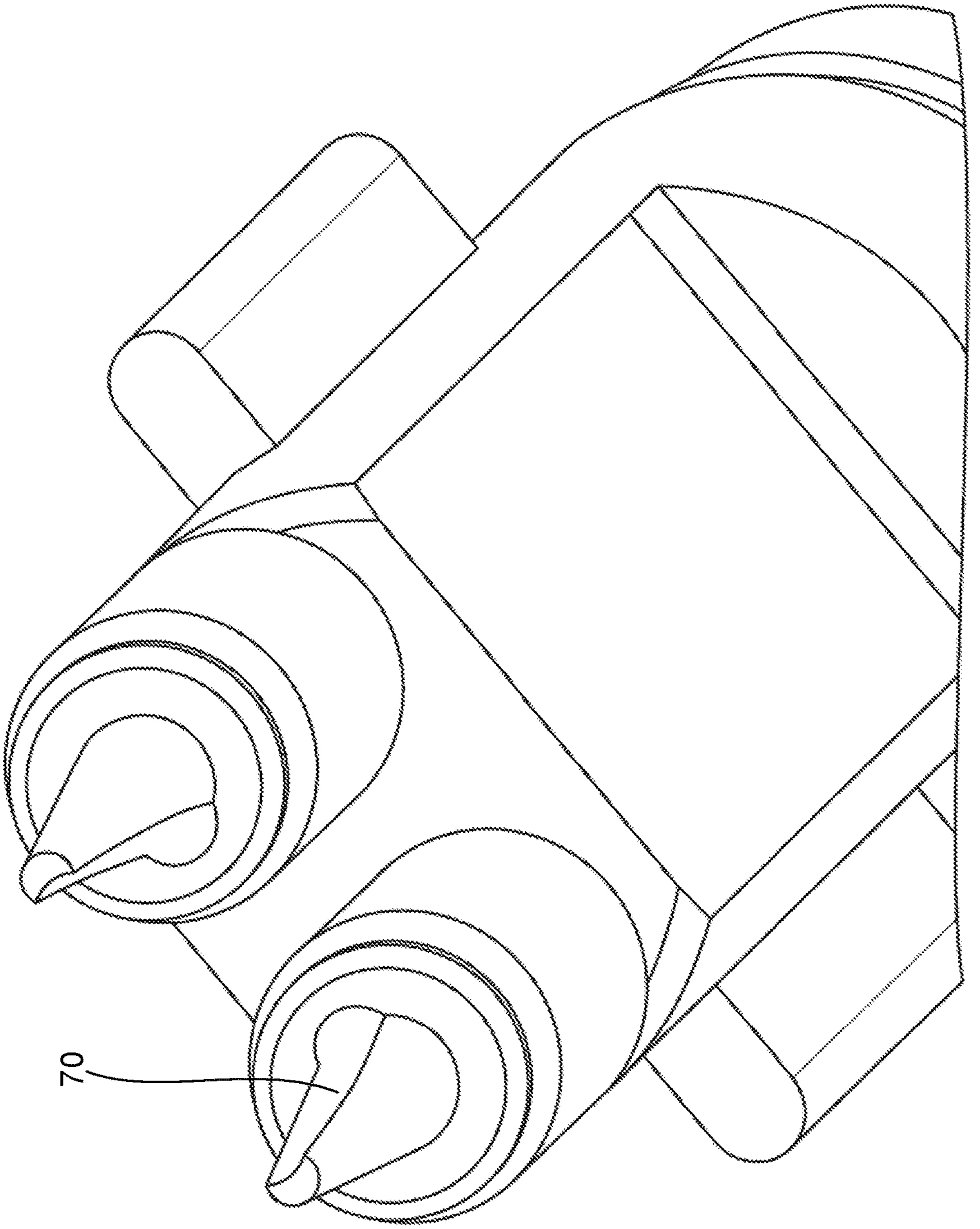
FIG. 10 depicts a non-limiting exemplary schematic illustration of piercing tips wherein a vent opening is positioned across the length of the piercing tip.
Figure 12:
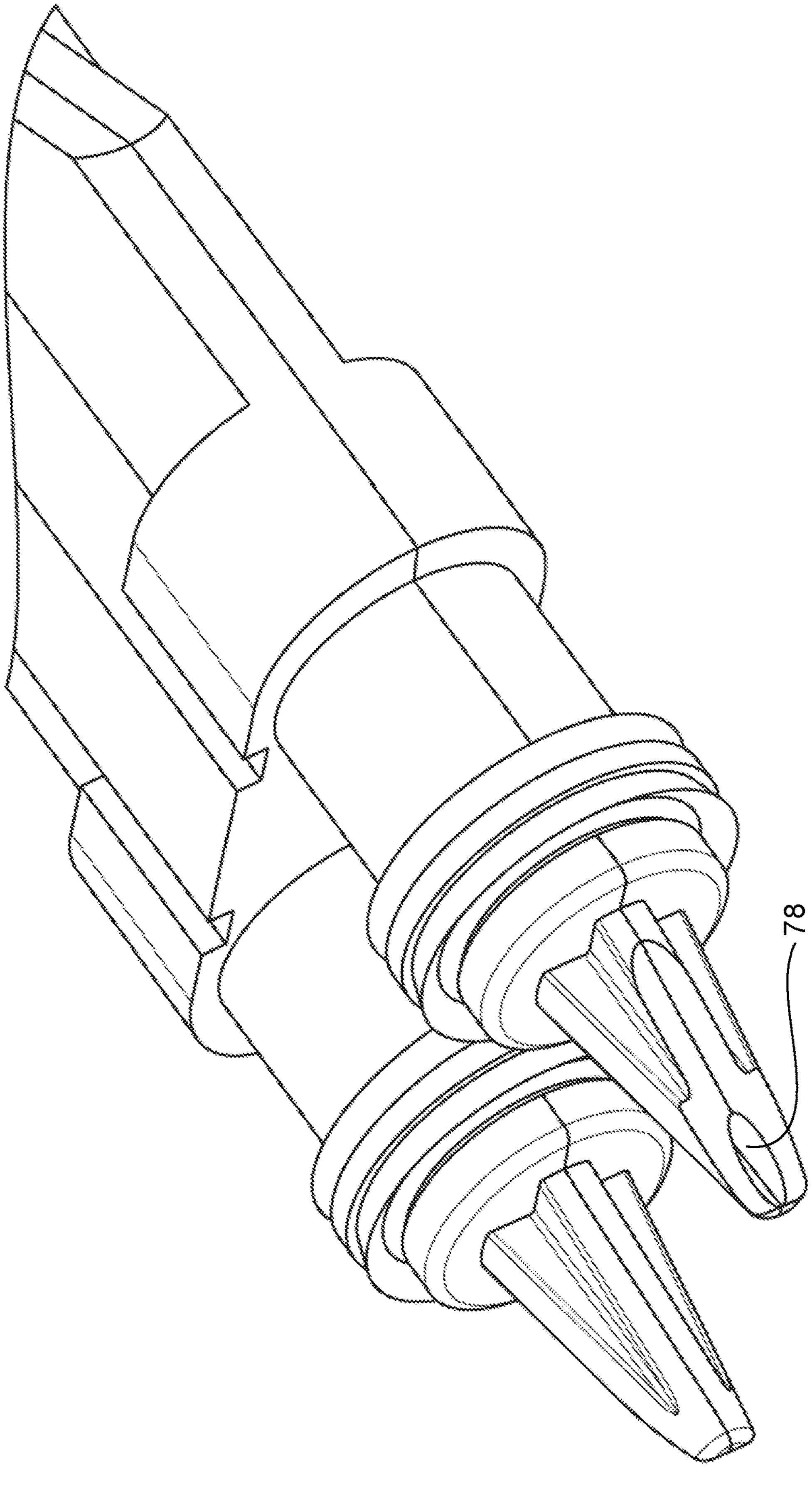
FIG. 12 depicts a non-limiting exemplary schematic illustration of a sample dispensing mechanism wherein a vent opening is positioned at the distal end of a piercing tip.
Figure 13:
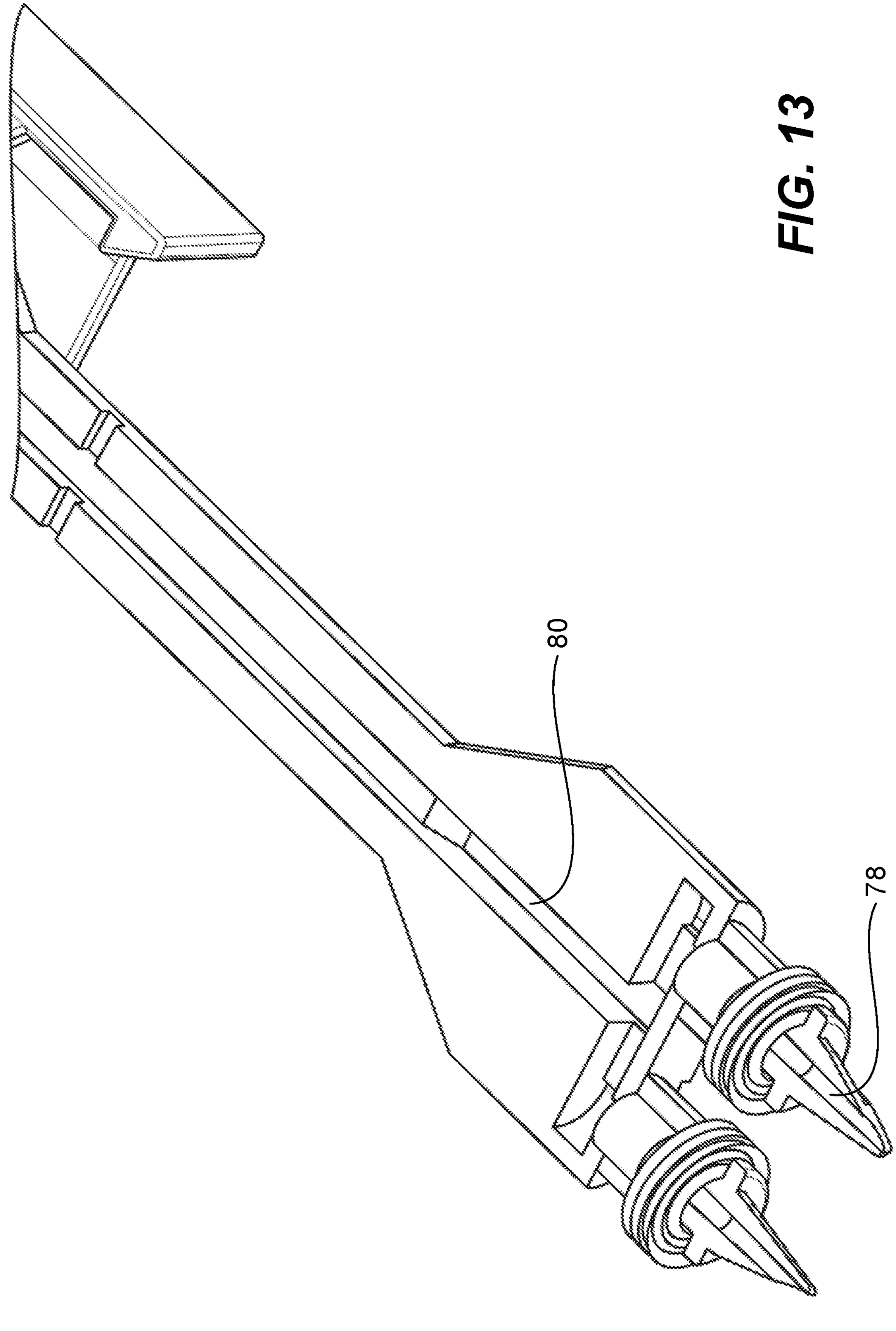
FIG. 13 depicts a non-limiting exemplary schematic illustration of a cross-sectional side view of the sample dispensing mechanism shown in FIG. 12 wherein an internal vent pathway with a hydrophobic filter is shown.

The at least one reaction chamber can comprise trapped gas. The cartridge body can comprise a gaseous head space above the sample fluid. The dispense rod can be configured to equalize pressure between the gaseous head space and the at least one reaction chamber after the at least one seal is disrupted. The at least one piercing tip can comprise at least one vent opening leading to a vent lumen extending through the dispense rod. The dispense rod can comprise a vent port positioned in the gaseous headspace and in fluid communication with the vent lumen of the dispense rod. The sample dispensing mechanism can comprise at least one hydrophobic filter. In some embodiments, any fluid passing between the at least one vent port and the at least one vent opening must pass through the hydrophobic filter. The vent opening can be positioned at (i) the proximal end of the at least one piercing tip, (ii) the distal end of the at least one piercing tip, or (iii) across the length of the at least one piercing tip. The trapped gas displaced by the at least one piercing tip and/or the predetermined sub-volume of the sample fluid can be capable of escaping via the at least one vent opening to the gaseous head space. FIG. 7 depicts a non-limiting exemplary schematic illustration of a ball point embodiment of the piercing tips provided herein, wherein a vent opening 64 is positioned at the distal end of the piercing tip. FIG. 8 depicts a non-limiting exemplary schematic illustration of a sample dispensing mechanism wherein a vent opening 66 is positioned across the length of the piercing tip. FIG. 9 depicts a non-limiting exemplary schematic illustration of a cross-sectional side view of the sample dispensing mechanism shown in FIG. 8 wherein the gas vent opening 66 is shown leading to a vent lumen extending through the dispense rod (e.g., internal chamber 68). FIG. 10 depicts a non-limiting exemplary schematic illustration of piercing tips wherein a vent opening 70 is positioned across the length of the piercing tip. FIG. 12 depicts a non-limiting exemplary schematic illustration of a sample dispensing mechanism wherein a vent opening 78 is positioned at the distal end of a piercing tip. FIG. 13 depicts a non-limiting exemplary schematic illustration of a cross-sectional side view of the sample dispensing mechanism shown in FIG. 12 wherein an internal vent pathway 80 with a hydrophobic filter is shown.

There are provided, in some embodiments, a (diagnostic) test apparatus (referred to as 'instrument'), and a sample testing system (also referred to herein for convenience of reference as a 'cartridge') for use with the test instrument to perform a test on a biological or environmental sample. The cartridge and instrument described herein can be easy for a user to operate without requiring the facilities of a general test laboratory. Sample testing systems, including diagnostic test assemblies and diagnostic test apparatuses, have been described in U.S. Patent Application Publication No. 2020/0278368, the content of which is incorporated herein by reference in its entirety.

There are provided, in some embodiments, a test cartridge with a removable closure or cap to allow addition of a test sample, where the cartridge incorporates a cartridge body containing a sample preparation fluid such as a buffer or lysis solution to assist with preparation of the sample and can include separation of target DNA material from within the sample cells. The sample preparation fluid reservoir section (e.g., cartridge body) of the cartridge can be a closed volume to reliably retain the sample preparation solution until such time as a sub-volume (e.g., a predetermined sub-volume of the sample fluid from the cartridge body) is dispensed through perforations in the otherwise scaled wall between the reservoir and the coupled reaction chamber(s). Optionally, the cartridge incorporates the chemical and biological reagents required for sample preparation and testing. In some embodiments, said reagents include those configured for nucleic acid amplification, genetic sequence binding and optical output using iso-thermal nucleic acid amplification methods. Optionally, the cartridge incorporates the chemical and biological reagents required for sample preparation and nucleic acid amplification and genetic sequence detection using polymerase chain reaction, PCR, nucleic acid amplification methods.

In some embodiments, the sample testing system is provided in the form of a disposable diagnostic test cartridge that is produced prior to a test (e.g., diagnostic test), and already incorporates all of the precursor chemical components (e.g., reagents) to run a specific set of one or more diagnostic tests. In some embodiments, the sample testing system/cartridge is configured so that it can be safely handled without contamination from the environment, or causing contamination of the user or the environment with the test materials, or causing interference with these chemical components or otherwise affecting the subsequent operations of the cartridge, which can require interactions with an diagnostic test instrument.

A user of the sample testing system wishing to conduct a test on a biological or environmental sample introduces the sample into the cartridge. With its closure removed, at this step the cartridge provides an open volume that is free of obstructions, by which is meant that a swab carrying the biological or environmental sample can easily be used to stir the sample preparation fluid in the cartridge body and to wash the biological or environmental sample from the swab into the sample preparation fluid without encountering obstructions that would impede this step. However, although this characterizes the open volume within the cartridge, it will be apparent to those skilled in the art that it is not necessary that a swab be used at all, and samples in any suitable form can be added to the sample preparation fluid by any suitable means.

The sample testing system can comprise: a closure to seal the cartridge body after receipt of the biological or environmental sample and the sample dispensing mechanism therein. The at least one of the closure and the cartridge body can be configured to prevent or at least inhibit removal of the closure from the cartridge body so that the fluids remain scaled within the sample testing system. The sample dispensing mechanism can be attached to the closure so that an act of applying the closure to the cartridge body also effects the insertion of the sample dispensing mechanism into the cartridge body. In some embodiments, a single action by a user causes the sample dispensing mechanism to disrupt the at least one seal and to dispense the sample fluid from the cartridge body into the at least one reaction chamber. The single action by the user can be a sustained screwing action applied to the closure relative to the cartridge body, and wherein the screwing action causes operation of the sample dispensing mechanism and seals the cartridge body. The closure can comprise a screw thread. The sample testing system can comprise: a second closure that seals the sample preparation fluid within the cartridge body prior to use, and that is removed to allow the biological or environmental sample to be added to the sample preparation fluid contained in the cartridge body.

In the case of biological samples, the step of adding the sample to the sample preparation fluid within the cartridge body initiates a specific biological and chemical process of sample dilution and cell lysis to prepare the sample material, including its included RNA or DNA nucleic acid, for testing. However, the system is not limited to biological tests, and can, for example, be used to detect the presence of or measure the amounts of trace elements in any type of sample. Other suitable types of diagnostic tests will be apparent to those skilled in the art in light of this disclosure.

The cartridge protects the reagents in transport and storage prior to running a test, and supports the test process while the diagnostic test is underway. In some embodiments, the test reagents, amplification genetic products and contaminants are retained within the cartridge at all times, including at the completion of the test. The scaled cartridge can be removed for disposal at the completion of a test, and, in some embodiments, an instrument is protected from fluids and contamination at all times.

After the biological sample is added to and then scaled within the cartridge, the user can be protected from the biological or chemical hazards of the sample during the subsequent test process and after the cartridge is removed for disposal.

The systems provided herein (e.g., diagnostic test cartridge) can include one or more reaction chambers also referred to herein for convenience as 'test tubes' close coupled with a separating wall to a cartridge body within the cartridge. In some embodiments, the cartridge body is fully scaled from the coupled reaction chamber(s), and is typically supplied pre-filled with a volume of sample preparation fluid and a removable closure.

In use, the test cartridge can be supported and heated within the test apparatus, and the removable closure is removed to add a sample. In some embodiments, the sample can be any biological or chemical sample for which a suitable diagnostic test and test display chemistry reagents are incorporated within the coupled test tube(s).

In some embodiments, the test cartridge is supplied with an additional cap with an attached dispensing mechanism. In some embodiments, this additional cap incorporates a dispensing mechanism and is fitted after the initial cap has been removed and the sample added. In some embodiments, as the additional cap and dispensing mechanism is inserted and the cap is closed by an action such as screwing it closed, the dispensing mechanism perforates the base of the sample chamber and dispenses a measured volume of prepared sample fluid into the one or more reaction chamber(s). This cap then closes and seals the sample within the cartridge assembly Alternatively, the first cap, once removed, can have the dispensing mechanism fitted to it, in a separate operation, to forming the additional cap with an included dispensing mechanism ready to be refitted to operate a dispense function and close the cartridge.

Optionally, after the sample is added, the dispensing mechanism itself is directly inserted and then a cap is fitted and the action of closing this cap, such as screwing the cap closed, operates the dispensing mechanism and close the cartridge.

There are provided, in some embodiments, sample testing methods. In some embodiments, sample testing method comprises the steps of: adding a biological or environmental sample into a sample preparation fluid contained in a cartridge body of a sample testing system disclosed herein for preparation of a sample fluid therein; after the adding step, inserting a sample dispensing mechanism into the cartridge body and applying a closure thereto; and operating the sample dispensing mechanism to disrupt at least one seal between the cartridge body and at least one reaction chamber to allow sample fluid to enter the at least one reaction chamber from the cartridge body, and to dispense a predetermined sub-volume of the sample fluid from the cartridge body into the at least one reaction chamber for testing therein while preventing further fluid movement between the cartridge body and the at least one reaction chamber. The method can comprise: before the adding step, placing the sample testing system into a receiving port of a testing apparatus configured to perform a test on the biological or environmental sample therein.

Multiplexing Cartridges

Within a single test well, it is possible to have several different markers present that will provide an optical output based on bonding to several different target genetic DNA sequences. In this case several different sensors are used or a sensor with more than one selective output is used. For example, in a two channel system, two different fluorescence markers may be employed, and these will be detected by two different fluorescence sensors configured to detect emissions in respective frequency ranges specific to the respective fluorescence markers to allow the channels to be discriminated.

Embodiments provided herein can be used to provide a control channel where the test assay chemistry is configured such that the control target should always be present if the test process is run correctly. In this case, the output of the control channel is used to confirm that the test process has been run correctly by the system, and to confirm that test results obtained by other channels measured by the system are valid. Embodiments provided herein can be also used to test for more than one target genetic sequence within each test well as a multiplexed test. Multiple test wells may be used, with each well running differently configured amplification chemistry and a different set of target markers. Control channels may operate in one or more wells and cover tests operated other wells in the test. By this arrangement a number of tests can be conducted on a single sample as a different approach to multiplexing.

Tests (e.g., amplification tests) within a single reaction chamber can be multiplexed in that more than one DNA or RNA target sequence and a control channel can be detected within a single reaction chamber. Where the system uses fluorescence as the detection method, the different targets can be detected with probes that emit at different florescence wavelengths, referred to in the art as detection channels. In an instrument described herein, two channels of detection can be included. Using the single tube (e.g., reaction chamber) cartridge described herein and a two channel detection instrument described herein, the system can provide detection of two different DNA or RNA targets. If additional targets are required to be multiplexed into the single diagnostic test from the same sample, additional reaction chambers can be provided in other embodiments. In this way, additional targets and control channels can be included while using the same number of detection sensors in the instrument. For example, in the case of an embodiment with two instrument sensor channels and two reaction chambers, the system is capable of 4 independent channels of DNA or RNA detection from a single sample that is prepared and dispensed from the cartridge body into the two reaction chambers. There are provided, in some embodiments, cartridges comprising one or more reaction chambers (e.g., test tubes). The number of reaction chambers per cartridge can vary, and can be about, can be at least, or can be at most, 1, 2, 3, 4, 5, 6, 7, 8, 9, 10, 20, 30, 40, 50, 60, 70, 80, 90, 100, or a number or a range between any of these values. The amplifying step can comprise multiplex amplification of two or more target nucleic acid sequences. The detecting step can comprise multiplex detection of two more nucleic acid amplification products derived from said two or more target nucleic acid sequences. The two or more target nucleic acid sequences can be specific to two or more different organisms. The at least one reaction chamber can be two reaction chambers. The at least one piercing tip can be two or more piercing tips. The reaction chambers can comprise polymerase chain reaction (PCR) tubes. The two reaction chambers can comprise one or more a mixing bead. The reaction chambers can comprise different reagents selected to perform respective different tests and/or to detect respective different target entities. The cartridge body can comprise sample preparation reagents. At least one of the reaction chambers can comprise one or more reagents for a reverse transcription reaction and/or an amplification reaction.

The reaction chamber(s) can comprise one or more reagents, such as, for example, amplification reagents and nucleic acid detection reagents. Components of an amplification reaction (e.g., the one or more amplification reagents) may include, for example, one or more primers (e.g., individual primers, primer pairs, primer sets, oligonucleotides, multiple primer sets for multiplex amplification, and the like), nucleic acid target(s) (e.g., target nucleic acid from a sample), one or more polymerases, nucleotides (e.g., dNTPs and the like), and a suitable buffer (e.g., a buffer comprising a detergent, a reducing agent, monovalent ions, and divalent ions). An amplification reaction may further include a reverse transcriptase and/or a reverse transcription primer, in some embodiments. An amplification reaction may further include one or more detection agents, such as one or more of the detection agents described herein, in some embodiments. In some embodiments, the one or more amplification reagents comprise, or consist of, primers, target nucleic acid, a polymerase, nucleotides, and a suitable buffer. In some embodiments, the one or more amplification reagents comprise, or consist of, primers, target nucleic acid, a polymerase, a reverse transcriptase, a reverse transcription primer, nucleotides, and a suitable buffer. In some embodiments, the one or more amplification reagents consist of primers, target nucleic acid, a polymerase, a detection agent, nucleotides, and a suitable buffer. In some embodiments, the one or more amplification reagents comprise, or consist of, primers, target nucleic acid, a polymerase, a reverse transcriptase, a reverse transcription primer, a detection agent, nucleotides, and a suitable buffer. In some embodiments, the one or more amplification reagents consist essentially of primers, target nucleic acid, a polymerase, nucleotides, and a suitable buffer. In some embodiments, the one or more amplification reagents consist essentially of primers, target nucleic acid, a polymerase, a reverse transcriptase, a reverse transcription primer, nucleotides, and a suitable buffer. In some embodiments, the one or more amplification reagents consist essentially of primers, target nucleic acid, a polymerase, a detection agent, nucleotides, and a suitable buffer. In some embodiments, the one or more amplification reagents consist essentially of primers, target nucleic acid, a polymerase, a reverse transcriptase, a reverse transcription primer, a detection agent, nucleotides, and a suitable buffer. When the one or more amplification reagents consist essentially of certain components, additional components or features may be included that do not have a significant effect on the amplification and/or are not necessary for generating a detectable product. For example, additional components or features may be included that do not have a significant effect on the ability of the components and conditions herein to achieve amplification under isothermal conditions and generate a detectable amplification product within about 10 minutes or less. Such additional components or features may be referred to as non-essential components and may include typical reaction components and/or common additives such as salts, buffers, detergents, ions, oils, proteins, polymers and the like. In some embodiments, amplification conditions comprise an enzymatic activity. Typically, an enzymatic activity is provided by a polymerase, and in some embodiments, an enzymatic activity is provided by a polymerase and a reverse transcriptase. In some embodiments, an enzymatic activity consists of a polymerase activity. In some embodiments, an enzymatic activity consists of a polymerase activity and a reverse transcriptase activity. Accordingly, in some embodiments, enzymatic activity does not include enzymatic activity provided by other enzymes, for example, helicases, topoisomerases, ligases, exonucleases, endonucleases, restriction enzymes, nicking enzymes, recombinases, and the like. In some embodiments, a polymerase activity and a reverse transcriptase activity are provided by separate enzymes or separate enzyme types (e.g., polymerase(s) and reverse transcriptase(s)). In some embodiments, a polymerase activity and a reverse transcriptase activity are provided by a single enzyme or enzyme type (e.g., polymerase(s)). In some embodiments, the amplification comprises one or more of the following: loop-mediated isothermal Amplification (LAMP), helicase-dependent Amplification (HDA), recombinase polymerase amplification (RPA), strand displacement amplification (SDA), nucleic acid sequence-based amplification (NASBA), transcription mediated amplification (TMA), nicking enzyme amplification reaction (NEAR), rolling circle amplification (RCA), multiple displacement amplification (MDA), Ramification (RAM), circular helicase-dependent amplification (cHDA), single primer isothermal amplification (SPIA), signal mediated amplification of RNA technology (SMART), self-sustained sequence replication (3SR), genome exponential amplification reaction (GEAR) and isothermal multiple displacement amplification (IMDA).

In some embodiments, the one or more amplification reagents may include non-enzymatic components and enzymatic components. Non-enzymatic components may include, for example, primers, nucleotides, buffers, salts, reducing agents, detergents, and ions; and generally do not include proteins (e.g., nucleic acid binding proteins), enzymes, or proteins having enzymatic activity, for example, polymerases, reverse transcriptases, helicases, topoisomerases, ligases, exonucleases, endonucleases, restriction enzymes, nicking enzymes, recombinases and the like. In some embodiments, an enzymatic component may consist of a polymerase or may consist of a polymerase and a reverse transcriptase. Accordingly, such enzymatic components would exclude other proteins (e.g., nucleic acid binding proteins and/or proteins having enzymatic activity), for example, helicases, topoisomerases, ligases, exonucleases, endonucleases, restriction enzymes, nicking enzymes, recombinases, and the like.

The test reagents described herein may further comprise reagents for detecting and/or quantifying a nucleic acid amplification product. Suitable detection and quantification reagents can be selected by one of skill in the art based on the selected detection and/or quantification method. An amplification product may be detected and/or quantified by any suitable detection and/or quantification method including, for example, any detection method or quantification method described herein. Non-limiting examples of detection and/or quantification methods include molecular beacon (e.g., real-time, endpoint), lateral flow, fluorescence resonance energy transfer (FRET), fluorescence polarization (FP), surface capture, 5' to 3' exonuclease hydrolysis probes (e.g., TAQMAN), intercalating/binding dyes, absorbance methods (e.g., colorimetric, turbidity), electrophoresis (e.g., gel electrophoresis, capillary electrophoresis), mass spectrometry, nucleic acid sequencing, digital amplification, a primer extension method (e.g., iPLEX™), Molecular Inversion Probe (MIP) technology from Affymetrix, restriction fragment length polymorphism (RFLP analysis), allele specific oligonucleotide (ASO) analysis, methylation-specific PCR (MSPCR), pyrosequencing analysis, acycloprime analysis, Reverse dot blot, GeneChip microarrays, Dynamic allele-specific hybridization (DASH), Peptide nucleic acid (PNA) and locked nucleic acids (LNA) probes, AlphaScreen, SNPstream, genetic bit analysis (GBA), Multiplex minisequencing, SNAPshot, GOOD assay, Microarray miniseq, arrayed primer extension (APEX), Microarray primer extension, Tag arrays, Coded microspheres, Template-directed incorporation (TDI), colorimetric oligonucleotide ligation assay (OLA), sequence-coded OLA, microarray ligation, ligase chain reaction, padlock probes, invader assay, hybridization using at least one probe, hybridization using at least one fluorescently labeled probe, cloning and sequencing, the use of hybridization probes and quantitative real time polymerase chain reaction (QRT-PCR), nanopore sequencing, chips and combinations thereof. In some embodiments, detecting a nucleic acid amplification product comprises use of a real-time detection method (i.e., product is detected and/or continuously monitored during an amplification process). In some embodiments, detecting a nucleic acid amplification product comprises use of an endpoint detection method (i.e., product is detected after completing or stopping an amplification process). Nucleic acid detection methods may also employ the use of labeled nucleotides incorporated directly into a target sequence or into probes containing complementary sequences to a target. Such labels may be radioactive and/or fluorescent in nature and can be resolved in any of the manners discussed herein. In some embodiments, quantification of a nucleic acid amplification product may be achieved using one or more detection methods described below. In some embodiments, the detection method can be used in conjunction with a measurement of signal intensity, and/or generation of (or reference to) a standard curve and/or look-up table for quantification of a nucleic acid amplification product.

Figure 17:
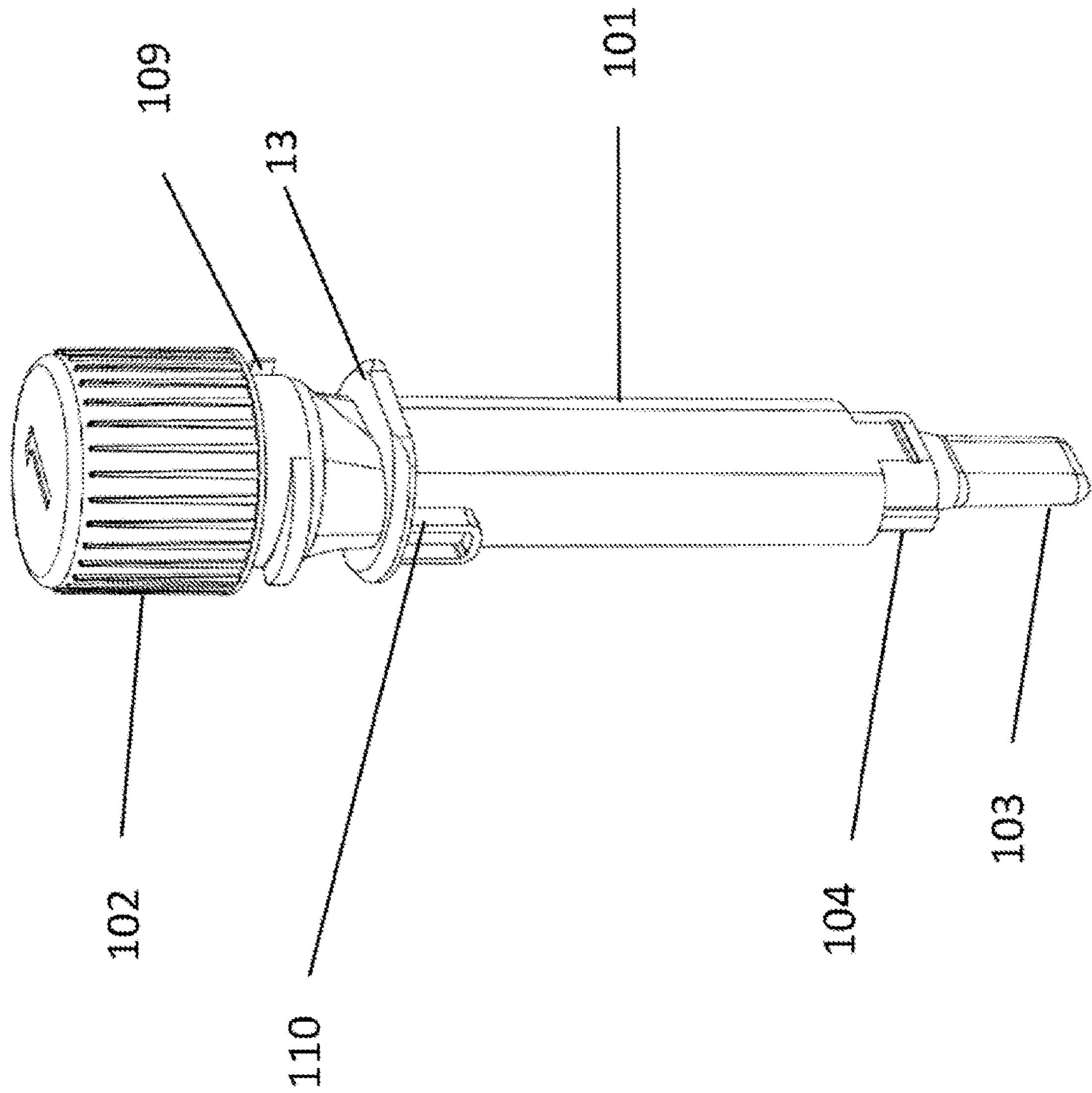
FIG. 17 is a non-limiting exemplary schematic illustration of a cartridge having two diagnostic test reservoirs (e.g., reaction chambers).

FIG. 17 shows a non-limiting exemplary two tube cartridge assembly embodiment. The reaction chambers can be separate tubes connected to the body of the cartridge; however, in the example shown in FIG. 17, a molded plastic tube component 103 incorporates two internal cavities that are equivalent to two independent reaction chambers connected to the cartridge body 101. FIG. 17 shows the cartridge in its shipping configuration prior to start of test, where the shipping cap 102 does not contact the molded latch features 109 and the cap 102 can be removed by the user at the start of a test.

The sample prep reagent can be in a liquid form, and can provide the aqueous solution to dilute and expose the test sample DNA or RNA into solution and provide the fluid to dissolve or re-suspend the lyophilized or dried reagents once some of the sample reagent fluid is added to the reaction chamber. The testing reagents (e.g., amplification reagents) may be dried or lyophilized or in a gel or liquid format to best suit preparation, loading, storage and transport.

In some embodiments, the sample preparation fluid and the testing reagents (e.g., amplification and detection reagents) can be loaded and scaled within the cartridge at the time of manufacture prior to use.

In the shipping configuration prior to use, the cap can have a shorter length such that its lower edge does not contact the molded latching cams on the body of the cartridge. This configuration of the shipping cap can allow it to seal the sample preparation liquid reagents within the cartridge body, but for the cap to be removable by the user to start a test.

In some embodiments, the cartridge body has alignment features 110 that align and engage with mating slots in the instrument to prevent rotation of the cartridge when it is in place in the instrument. This anti-rotation feature allows the user to easily remove the shipping cap and later fit a test cap, all in single handed operation.

The cartridge body can contain the sample preparation fluid as it includes a seal on its base at location, such that with the cap fitted, it forms a scaled container or reservoir with no fluid communication to the reaction chamber(s).

In some embodiments, the reaction chamber(s) is supplied in separated packaging and is only clipped or screwed into place onto the cartridge body just prior to starting the test.

A diagnostic test assembly or ‘cartridge’ can include a sample reservoir or chamber, at least one test reservoir or reaction chamber (also referred to herein as the amplification reservoir or chamber), and at least one seal between the sample preparation reservoir and the at least one diagnostic test reservoir to prevent fluid movement between the sample preparation reservoir and the at least one diagnostic test reservoir. In some embodiments, the sample reservoir or chamber is in the form of a cylindrical cartridge body, and the amplification reservoir or chamber is in the form of an amplification tube coupled to the cartridge body by a securing ring or clip and an elastomer seal. The elastomer component can provide a seal between the amplification tube and the molded body of the cartridge such that the contents of the amplification tube will not be influenced by environmental contamination prior to use, and cannot escape during and after use. Other coupling and sealing arrangements and configurations will be apparent to those of skill in the art in light of this disclosure, and may be used in other embodiments. In some embodiments, its shipping configuration prior to use, the sample reservoir or chamber is scaled with a transport cap, and is partially filled with a sample preparation or reagent fluid, and the reaction chamber is partially filled with testing reagents (e.g., nucleic acid amplification and associated detection probe reagents). These reagents can be in liquid, gel, dried or lyophilized form. It can be advantageous in some embodiments for the sample reagent in a liquid form to provide the aqueous solution to dilute and expose the test sample DNA or RNA into solution and provide the fluid to dissolve or re-suspend the lyophilized or dried reagents once some of the sample reagent fluid is added to the amplification tube. The amplification reagents can be dried or lyophilized or in a gel or liquid format to best suit preparation, loading, storage and transport.

Figure 18:
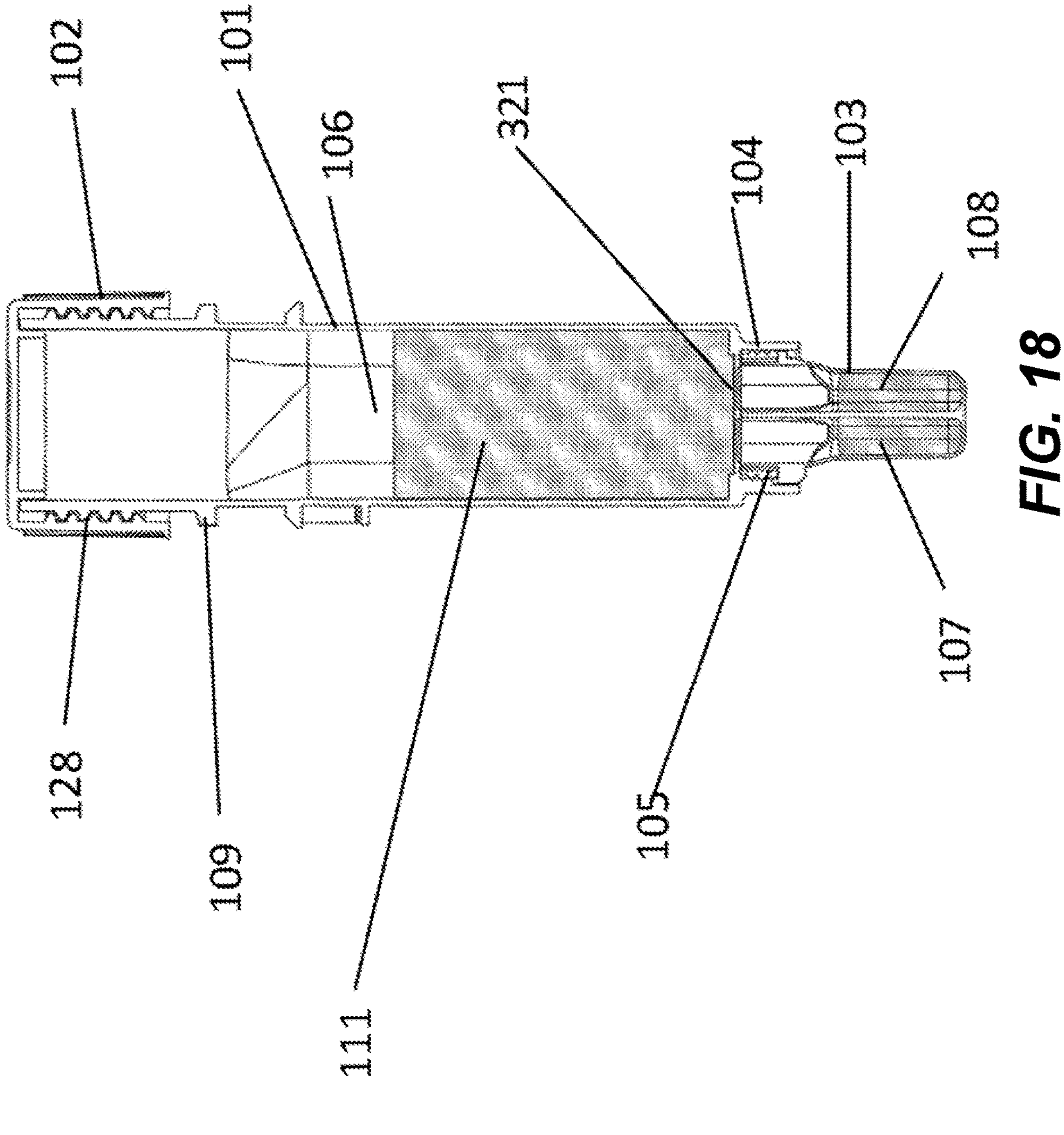
FIG. 18 is a non-limiting exemplary cross-sectional side view of the dual reaction chamber cartridge of FIG. 17.

FIG. 18 shows the same cartridge depicted in FIG. 18 in cross section, where the tube component 103 incorporates two internal reaction chambers 107 and 108. These tubes can carry the required precursor reagents for the DNA or RNA amplification and detection probes, typically in dried or lyophilized form. The reagents incorporated within each tube 107, 108 may be different for conducting different tests from the same sample, or maybe identical reagents to provide a replicated, addition test confirmation. The tube component 103 can clipped into place within a mating recess feature 104 in the base of the cartridge body 101. An elastomer seal 105 is trapped between the base of the moulded cartridge body and the tube assembly and forms a seal to prevent leakage between the reaction chambers 107, 108 and the environment. Internal threads 128, at least one seal 321, cartridge sample volume 106, molded latching cams 109 are also shown.

The cartridge body contains a sample preparation reagent 111, typically in a liquid form, and typically added during manufacture. It is an option to supply the sample reagent 111 in separate containers of one or more parts, and add these to the cartridge prior to the test when the cap is removed. The cartridge can operate in a similar manner to that for a single reaction chamber embodiment, where the sample preparation liquid 111 forms an aqueous solution to expose and carry the DNA or RNA from the sample once it is added, and to resuspend or dissolve the testing reagents (e.g., amplification reagents) in the tubes 107, 108 at the base of the cartridge once a sub-volume (e.g., a predetermined sub-volume) of the sample dilution fluid is added by the dispense action into these tubes 107, 108.

To conduct a test, the cartridge can be inserted into an instrument port to support and start heating the sample reagent fluids 111. This heating can assist, speed up or enable the sample preparation process, including cell lysis. In some embodiments, the cartridge is supported and operated within the instrument, but for the purposes of illustration, the instrument components are not shown in the drawings of the cartridge shown in FIGS. 17, 18, 19, 20, 21, 22, 23, 24 and 25.

Figure 19:
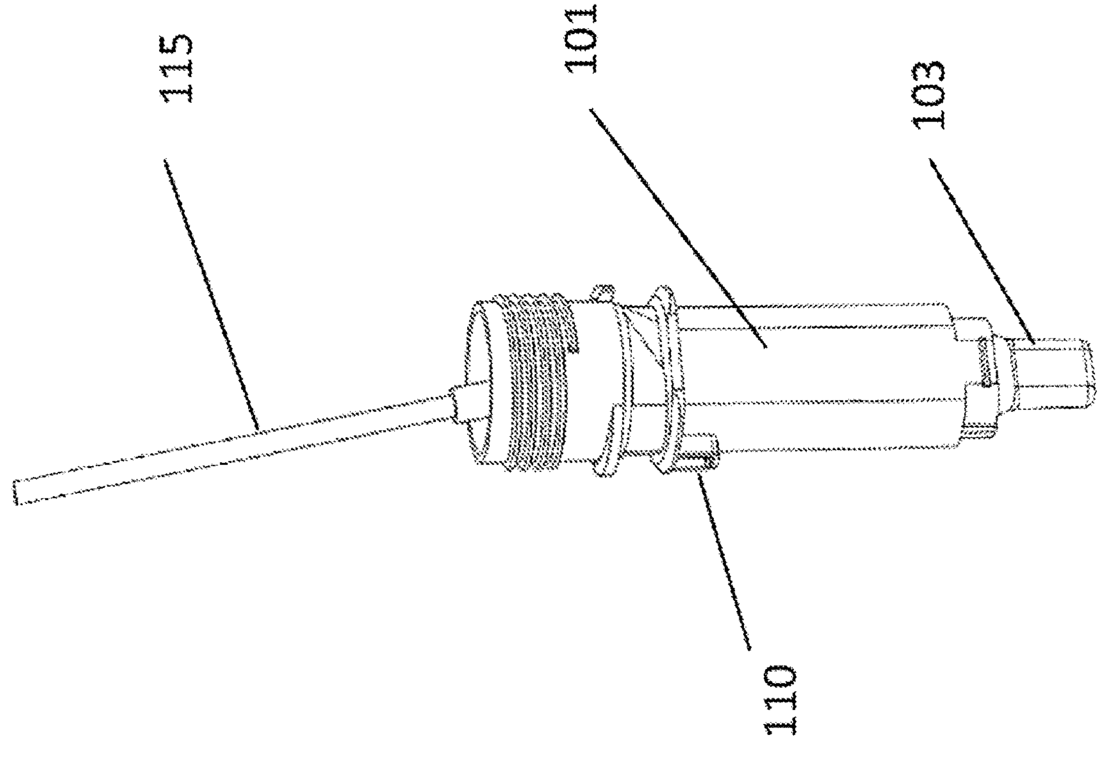
FIG. 19 is a non-limiting exemplary schematic illustration of the cartridge of FIGS. 17 and 18 with its shipping cap removed, and a swab being inserted into the open volume of a cartridge body of the dual reaction chamber cartridge to deposit sample material therein.

FIG. 19 shows the two tube cartridge at the start of test with the cap removed and with a swab 115, being used to add sample material by washing the swab 115, in the sample reagent fluid 111 contained within the cartridge body 101.

The sample can be one of many types, and may be included into the sample preparation fluid by any suitable method, such as, for example, pipette addition or droplet addition of a fluid sample, addition of a small tissue sample or a body fluid or environmental, veterinary, food or agricultural sample. In some embodiments, the test uses nucleic acid amplification, which can be very sensitive, and thus only a small amount of sample material is required to be effective in testing. A sample or test sample can be any specimen that is isolated or obtained from a subject or part thereof. Non-limiting examples of specimens include fluid or tissue from a subject, including, without limitation, blood or a blood product (e.g., serum, plasma, or the like), umbilical cord blood, bone marrow, chorionic villi, amniotic fluid, cerebrospinal fluid, spinal fluid, lavage fluid (e.g., bronchoalveolar, gastric, peritoneal, ductal, car, arthroscopic), biopsy sample, celocentesis sample, cells (e.g., blood cells) or parts thereof (e.g., mitochondrial, nucleus, extracts, or the like), washings of female reproductive tract, urine, feces, sputum, saliva, nasal mucous, prostate fluid, lavage, semen, lymphatic fluid, bile, tears, sweat, breast milk, breast fluid, hard tissues (e.g., liver, spleen, kidney, lung, or ovary), the like or combinations thereof. The term blood encompasses whole blood, blood product or any fraction of blood, such as serum, plasma, buffy coat, or the like as conventionally defined. Blood plasma refers to the fraction of whole blood resulting from centrifugation of blood treated with anticoagulants. Blood serum refers to the watery portion of fluid remaining after a blood sample has coagulated. Fluid or tissue samples often are collected in accordance with standard protocols hospitals or clinics generally follow. For blood, an appropriate amount of peripheral blood (e.g., between 3-40 milliliters) often is collected and can be stored according to standard procedures prior to or after preparation.

Suitable samples include but are not limited to saliva, blood, serum, plasma, urine, aspirate, and biopsy samples. Thus, the term "sample" with respect to a patient encompasses blood and other liquid samples of biological origin, solid tissue samples such as a biopsy specimen or tissue cultures or cells derived therefrom and the progeny thereof. The definition also includes samples that have been manipulated in any way after their procurement, such as by treatment with reagents; washed; or enrichment for certain cell populations, such as cancer cells. The definition also includes sample that have been enriched for particular types of molecules, e.g., RNAs. The term "sample" encompasses biological samples such as a clinical sample such as blood, plasma, serum, aspirate, cerebral spinal fluid (CSF), and also includes tissue obtained by surgical resection, tissue obtained by biopsy, cells in culture, cell supernatants, cell lysates, tissue samples, organs, bone marrow, and the like. A "biological sample" includes biological fluids derived therefrom (e.g., cancerous cell, infected cell, etc.), e.g., a sample comprising RNAs that is obtained from such cells (e.g., a cell lysate or other cell extract comprising RNAs).

In some embodiments, the source of the sample is a (or is suspected of being a diseased cell, fluid, tissue, or organ. In some embodiments, the source of the sample is a normal (non-diseased) cell, fluid, tissue, or organ. In some embodiments, the source of the sample is a (or is suspected of being a pathogen-infected cell, tissue, or organ. For example, the source of a sample can be an individual who may or may not be infected—and the sample could be any biological sample (e.g., blood, saliva, biopsy, plasma, serum, bronchoalveolar lavage, sputum, a fecal sample, cerebrospinal fluid, a fine needle aspirate, a swab sample (e.g., a buccal swab, a cervical swab, a nasal swab), interstitial fluid, synovial fluid, nasal discharge, tears, buffy coat, a mucous membrane sample, an epithelial cell sample (e.g., epithelial cell scraping), etc.) collected from the individual. In some embodiments, the sample is a cell-free liquid sample. In some embodiments, the sample is a liquid sample that can comprise cells. Pathogens include viruses, fungi, helminths, protozoa, malarial parasites, *Plasmodium* parasites, *Toxoplasma* parasites, *Schistosoma* parasites, and the like. "Helminths" include roundworms, heartworms, and phytophagous nematodes (Nematoda), flukes (Tematoda), Acanthocephala, and tapeworms (Cestoda). Protozoan infections include infections from Giardia spp., *Trichomonas* spp., African trypanosomiasis, amoebic dysentery, babesiosis, balantidial dysentery, Chaga's disease, coccidiosis, malaria and toxoplasmosis. Examples of pathogens such as parasitic/protozoan pathogens include, but are not limited to: *Plasmodium falciparum, Plasmodium vivax, Trypanosoma cruzi* and *Toxoplasma gondii*. Fungal pathogens include, but are not limited to: *Cryptococcus neoformans, Histoplasma capsulatum, Coccidioides immitis, Blastomyces dermatitidis, Chlamydia trachomatis*, and *Candida albicans*. Pathogenic viruses include, e.g, immunodeficiency virus (e.g., HIV); influenza virus; dengue; West Nile virus; herpes virus; yellow fever virus; Hepatitis Virus C; Hepatitis Virus A; Hepatitis Virus B; papillomavirus; and the like. Pathogenic viruses can include DNA viruses such as: a papovavirus (e.g., human papillomavirus (HPV), polyomavirus); a hepadnavirus (e.g., Hepatitis B Virus (HBV)); a herpesvirus (e.g., herpes simplex virus (HSV), varicella zoster virus (VZV), epstein-barr virus (EBV), cytomegalovirus (CMV), herpes lymphotropic virus, *Pityriasis Rosea*, kaposi's sarcoma-associated herpesvirus); an adenovirus (e.g., atadenovirus, aviadenovirus, ichtadenovirus, mastadenovirus, siadenovirus); a poxvirus (e.g., smallpox, vaccinia virus, cowpox virus, monkeypox virus, orf virus, pseudocowpox, bovine papular stomatitis virus; tanapox virus, yaba monkey tumor virus; molluscum contagiosum virus (MCV)); a parvovirus (e.g., adeno-associated virus (AAV), Parvovirus B19, human bocavirus, bufavirus, human parv4 G1); Geminiviridae; Nanoviridae; Phycodnaviridae; and the like. Pathogens can include, e.g., DNAviruses [e.g.: a papovavirus (e.g., human papillomavirus (HPV), polyomavirus); a hepadnavirus (e.g., Hepatitis B Virus (HBV)); a herpesvirus (e.g., herpes simplex virus (HSV), varicella zoster virus (VZV), epstein-barr virus (EBV), cytomegalovirus (CMV), herpes lymphotropic virus, *Pityriasis Rosea*, kaposi's sarcoma-associated herpesvirus); an adenovirus (e.g., atadenovirus, aviadenovirus, ichtadenovirus, mastadenovirus, siadenovirus); a poxvirus (e.g., smallpox, vaccinia virus, cowpox virus, monkeypox virus, orf virus, pseudocowpox, bovine papular stomatitis virus; tanapox virus, yaba monkey tumor virus; molluscum contagiosum virus (MCV)); a parvovirus (e.g., adeno-associated virus (AAV), Parvovirus B19, human bocavirus, bufavirus, human parv4 G1); Geminiviridae; Nanoviridae; Phycodnaviridae; and the like], *Mycobacterium tuberculosis, Streptococcus agalactiae*, methicillin-resistant *Staphylococcus aureus, Legionella pneumophila, Streptococcus pyogenes, Escherichia coli, Neisseria gonorrhoeae, Neisseria meningitidis*, Pneumococcus, *Cryptococcus neoformans, Histoplasma capsulatum, Hemophilus influenzae* B, *Treponema pallidum*, Lyme disease spirochetes, *Pseudomonas aeruginosa, Mycobacterium leprae, Brucella abortus*, rabies virus, influenza virus, cytomegalovirus, herpes simplex virus I, herpes simplex virus II, human serum parvo-like virus, respiratory syncytial virus, varicella-zoster virus, hepatitis B virus, hepatitis C virus, measles virus, adenovirus, human T-cell leukemia viruses, Epstein-Barr virus, murine leukemia virus, mumps virus, vesicular stomatitis virus, Sindbis virus, lymphocytic choriomeningitis virus, wart virus, blue tongue virus, Sendai virus, feline leukemia virus, Reovirus, polio virus, simian virus 40, mouse mammary tumor virus, dengue virus, rubella virus, West Nile virus, *Plasmodium falciparum, Plasmodium vivax, Toxoplasma gondii, Trypanosoma rangeli, Trypanosoma cruzi, Trypanosoma rhodesiense, Trypanosoma brucei, Schistosoma mansoni, Schistosoma japonicum, Babesia bovis, Eimeria tenella, Onchocerca volvulus, Leishmania tropica, Mycobacterium tuberculosis, Trichinella spiralis, Theileria parva, Taenia hydatigena, Taenia ovis, Taenia saginata, Echinococcus granulosus, Mesocestoides corti, Mycoplasma arthritidis, M. hyorhinis, M. orale, M. arginini, Acholeplasma laidlawii, M. salivarium* and *M. pneumoniae*. Pathogens can comprise one or more of SARS-COV-2, Influenza A, Influenza B, and/or Influenza C.

In some embodiments, a sample collection swab is introduced into the open cartridge. In the case of a sample collection swab being used, it is introduced into the sample chamber by a user and washed in the sample preparation fluid. The sample preparation fluid can be configured to wash the sample material from the swab, and may contain salts, dilution fluid or detergents that separate cells and cause the lysis of cell walls to, for example, expose nucleic acid components of the sample material, including DNA or RNA target material, into the sample chamber solution so that it will be suitable for subsequent nucleic acid amplification.

Other sample collection methods or sample types can be applied to the test cartridge as alternatives to a swab. These sample collection and sample addition methods may include but are not limited to: (i) use of pipette and add a sample fluid; (ii) use of a whole blood droplet directly from a finger prick; and (iii) use of an absorbent pad or membrane to collect a fluid sample such as whole blood and add it to the sample conditioning wash fluid.

Following addition of the sample, an instrument display, under control of the instrument software, can prompt the user to wait for a period of time to allow the sample preparation and cell lysis process to have sufficient time to be effective. Cell lysis procedures and reagents are known in the art and may generally be performed by chemical (e.g., detergent, hypotonic solutions, enzymatic procedures, and the like, or combination thereof), physical (e.g., French press, sonication, and the like), or electrolytic lysis methods. Any suitable lysis procedure can be utilized. For example, chemical methods generally employ lysing agents to disrupt cells and extract nucleic acids from the cells, followed by treatment with chaotropic salts. In some embodiments, cell lysis comprises use of detergents (e.g., ionic, nonionic, anionic, zwitterionic). In some embodiments, cell lysis comprises use of ionic detergents (e.g., sodium dodecyl sulfate (SDS), sodium lauryl sulfate (SLS), deoxycholate, cholate, sarkosyl).

Figure 20:
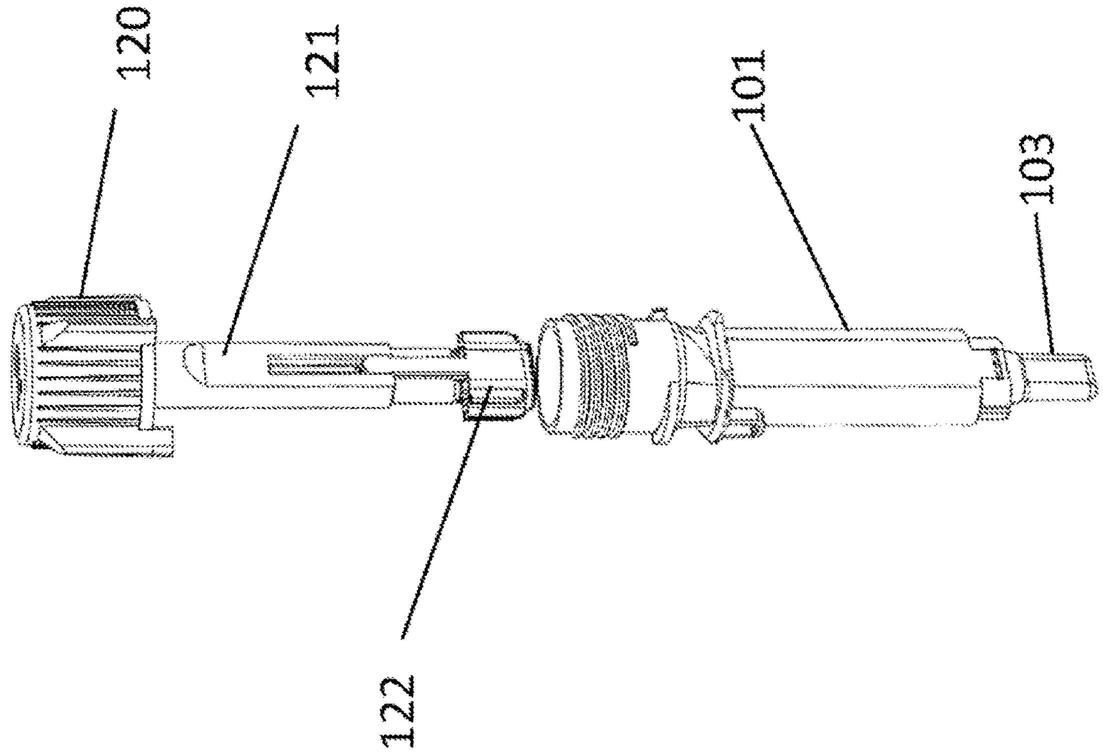
FIG. 20 is a non-limiting exemplary schematic illustration of a cap assembly including a cap and an embodiment of a dual reaction chamber dispensing mechanism about to be inserted into the cartridge body of the dual reaction chamber cartridge.

Once the sample preparation time period has completed, the user can insert the dispensing cap assembly. FIG. 20 shows the cap 120 and the dispense mechanism in position to be inserted by the user into the cartridge body 101 according to some embodiments provided herein. The sample testing system (e.g., dispense cap assembly) in this view is made up of the following visible components: the dispense cap 120, the dispense rod 121 and the dispensing chamber (e.g., dispense insert) 122.

Figure 21:
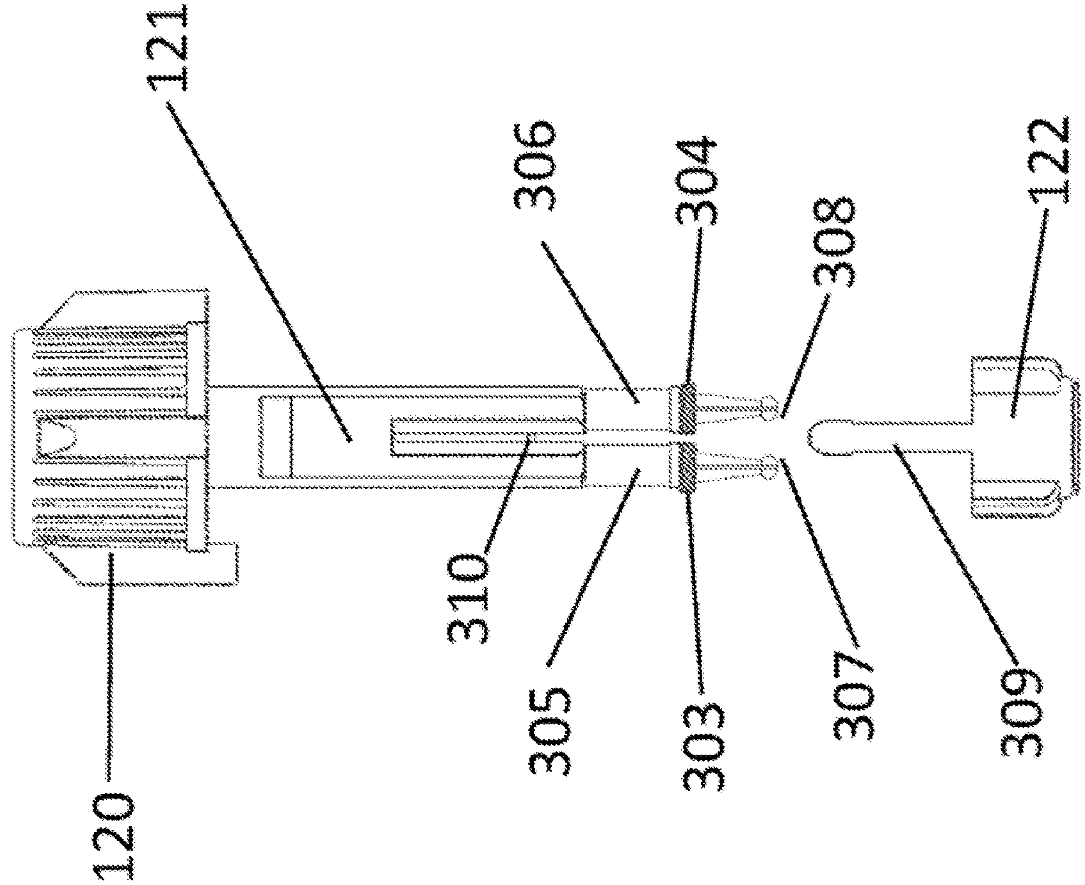
FIG. 21 is a non-limiting exemplary schematic illustration of the dual reaction chamber dispensing mechanism with its dispensing chamber (e.g., dispense insert) separated from its dispense rod.

FIG. 21 shows the dispense assembly in a disassembled view. At its top section, the two-tube cartridge is circular in cross section to allow the screw cap to fit; however in its lower section, the cartridge has flattened sides. In some embodiments, the dispensing chamber 122 is a loose fit in the upper circular cross section of the cartridge, but is a close slide fit in the flattened cross section portion of the cartridge. In some embodiments, this close slide fit is used to guide the dispensing chamber 122 into place such that it aligns with the mating feature at the base of the cartridge, and the two cylindrical bores align with the perforation points that allow the sample fluid to exit the cartridge body 101 into the two reaction chambers 103. In some embodiments, the circular to flattened cross section transition is gradual with a twist in its form such that it naturally rotates and guides the dispensing chamber 122 into alignment as the dispense assembly is inserted. This circular to flattened transition in the form of the cartridge body 101 is shown in FIG. 17 in the body section between the lid location feature 13 and the cap locking feature 109.

A non-limiting exemplary dispense assembly is shown in an exploded assembly view in FIG. 21. In some embodiments, the dispense rod 121 is clipped into the cap 120 so that it can freely rotate to assist alignment of the dispense assembly 122 with its entry into the flattened cross section of the cartridge as the assembly is inserted. In some embodiments, the dispense rod 121 has two projections 305 and 306. In some embodiments, for each of these projections 305, 306, its lower section forms a corresponding piston with a corresponding O-ring seal 303, 304, and below each piston forms a corresponding piercing tip 307, 308.

The piercing tips 307, 308 can comprise a geometry configured to assist fluid flow past the points 307, 308 during perforation. In the described embodiments, the piercing tips 307, 308 can comprise a geometry configured to generate a large opening in the at least one seal. The large opening can comprise a puncture of at least about 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 100%, or a number or a range between any two of these values, of the surface area of the at least one seal.

When the dispensing chamber 122 is assembled onto the dispense rod 121, the piercing tips 307, 308 of the dispense rod projections 305, 306 project into the cylindrical bores of the dispensing chamber 122 but do not fill its volume. These bores are shown in cross section in FIG. 22. In some embodiments, the dispensing chamber section has a slide 309, as shown in FIGS. 20 and 21, that fits closely and slides onto and between the projections 305, 306 of the dispense rod 121. When fitted, the dispensing chamber 122 can slide up to contact with the small bridge 310 on the dispense rod. The contact with the small bridge 310 can prevent further travel in normal handling prior to use, and the slide fit of the insert 122 onto the dispense rod 121 retains and can align the dispensing chamber 122 in a controlled manner and is a firm fit such that it will not come off with normal handling.

Figure 22:
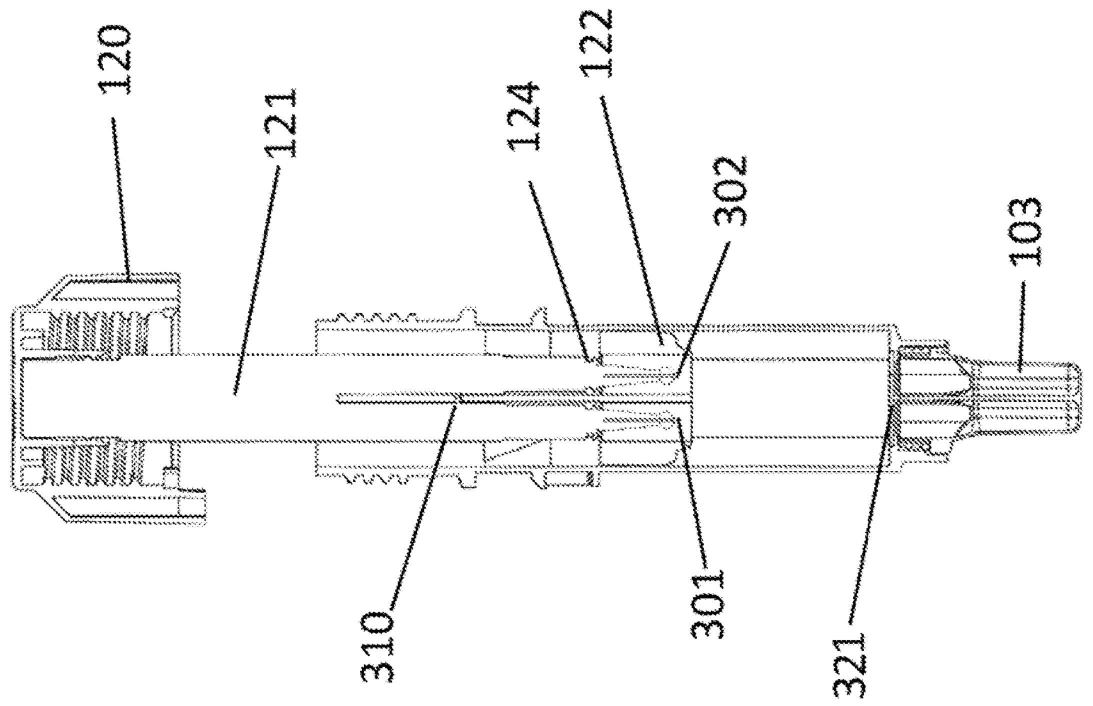

FIG. 22 shows in cross section a non-limiting exemplary the two reaction chamber (e.g., two-tube) dispensing chamber 122 partially pressed into the cartridge assembly. In some embodiments, the dispensing chamber 122 is a slide fit onto the rod 121 and is blocked from further travel by the small bridge 310. In some embodiments, the dispensing chamber 122 incorporates the two open ended cylindrical bores 301, 302. The dispense rod can includes a sealing "0" ring 124.

Figure 23:
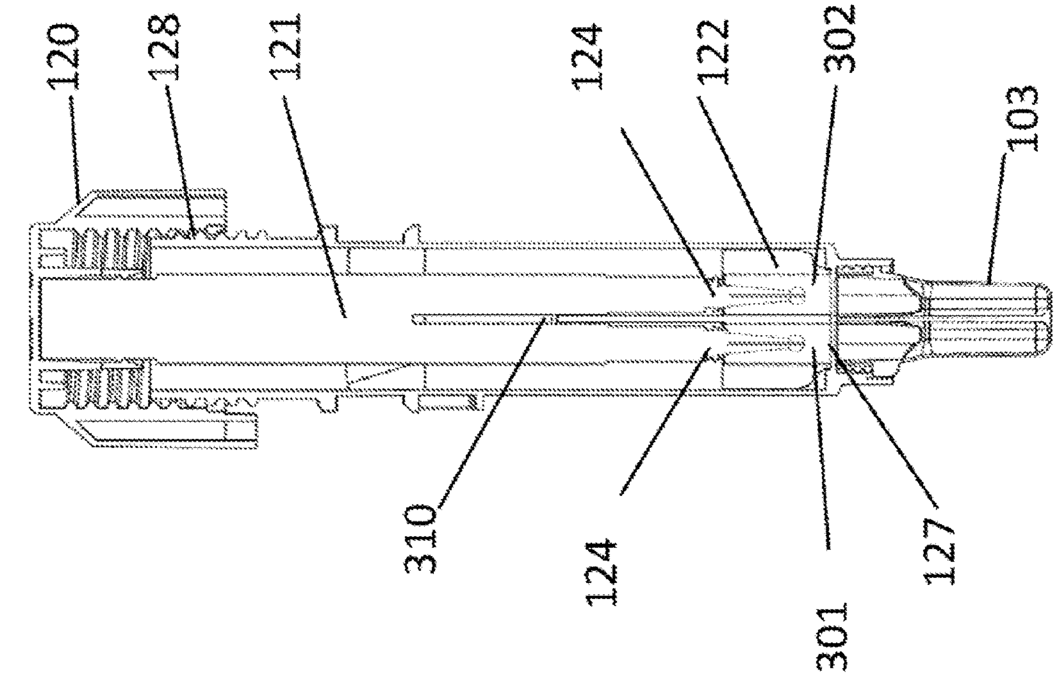
FIG. 22, FIG. 23, and FIG. 24 are non-limiting exemplary schematic illustrations of cross-sectional side views of the dual reaction chamber cartridge with its dispense mechanism respectively: (i) partially inserted, (ii) further inserted so that its dispensing chamber has seated against the base of the cartridge but prior to perforation and dispensing, and (iii) fully inserted so that the perforation and dispense actions have completed.

FIG. 23 shows in cross section the internal threads of the screw cap 120 engaged with the threads on the cartridge body and the dispense mechanism has progressed into the cartridge to the point where the base of the dispensing chamber 122 is just making contact with the thin material section at the base of the cartridge body 127. In some embodiments, the base of the dispensing chamber 122 has features that mate and form a press fit with the base of the cartridge body, forming a fluid seal around the base of each of the cylindrical bores 301, 302. In some embodiments, the bridge 310 on the dispense rod 121 has allowed the rod to apply sufficient force on the dispensing chamber to seat it firmly into the sealing feature at the base of the cartridge body. In some embodiments, once this part is seated, further progression of the cap threads caused by continued rotation of the cap 120 by the user, breaks away the small plastic bridge 310 to allow the dispense projections 305, 306 to progress further into the dispensing chamber 122.

In some embodiments, at this point, the piercing tips 307, 308 start to perforate the thin material section at the base of the cartridge body, and the piston or syringe features 303, 304 with "O"-ring seals progress to seal the tops of the two cylindrical bores 301, 302.

In some embodiments, with further travel, as the screw cap 120 is further closed by the user, the projection 310 deflects or breaks away to allow the O-rings 303 and 304 on the projections 305 and 306 to seal the tops of the dispense barrels, forming closed volumes of fluid within the respective dispense bores 301, 302. In some embodiments, as the user completes the cap closing action, the O-ring scaled pistons are forced by the action of the engaged threaded cap 120 and the dispensing chamber 122 being pressed into the cartridge body 101 to travel the full distance through the two dispensing insert bores 301, 302 to dispense the trapped sample fluid into each of the two amplification or test reservoirs 103.

In some embodiments, the cartridge body 101 will have around 1 to 3 milliliters of sample and sample dilution fluid 111 present, and the dispense action will dispense a small amount of this fluid, in the order of around 50 to 100 microliters, into each of the reaction chambers 103. Without change to the form of this embodiment, the scale of the parts used can be varied to vary the both the sample dilution volume and the volumes dispensed into each of the reaction chambers 103.

Figure 24:
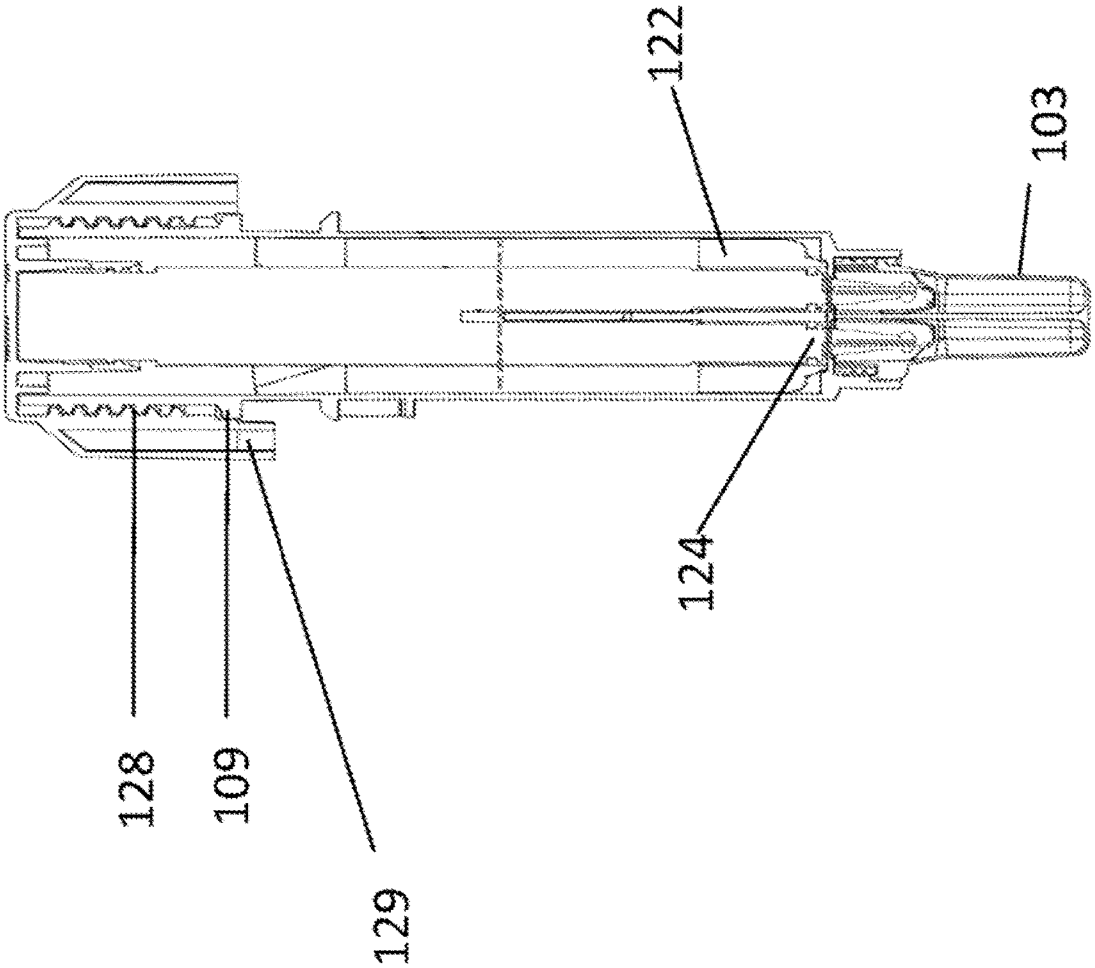

FIG. 24 shows the cartridge in a non-limiting exemplary cross section view of the fully dispensed configuration. In some embodiments, the dispense cap 120 is longer than the shipping cap, and its lower edge has alignment or anti-rotation features 129 that have latched over the molded cam features 109 on the cartridge body 101. In some embodiments, this prevents the cap 120 from being easily removed, and ensures that the test sample is fully scaled within the cartridge after it has been added and the dispense cap is fitted. In some embodiments, this locking function has significant advantages for operator safety and test reliability, and protects against contamination of users and the test system during use and in subsequent removal, handling and disposal of the used cartridge assembly.

Figure 25:
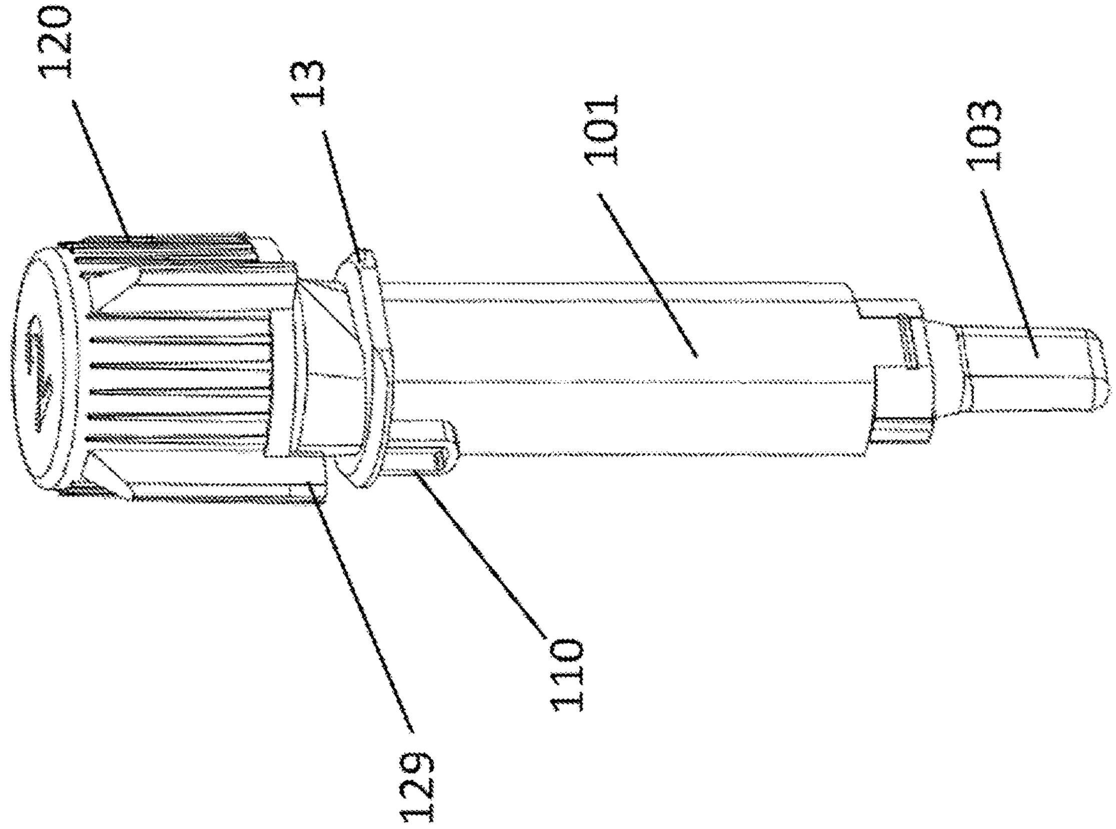
FIG. 25 is a non-limiting exemplary schematic illustration of an external view of the dual reaction chamber cartridge after fully engaging its cap assembly as per FIG. 24.

FIG. 25 shows a non-limiting exemplary full external view of the cartridge in the fully dispensed configuration with the dispense cap 120 fully located and locked onto the cartridge body 101. In some embodiments, the dispense assembly cap 120 has features in its form to assist rotation and handling, but it also includes a unique moulded feature 129 that projects further out and/or further down than any other features of the cap 120. In some embodiments, an instrument disclosed herein can incorporate a sensor that detects the position or proximity of this feature. In some embodiments, this sensor output can be used by the instrument controller and its controlling software to confirm that the cap 120 is fully closed and rotated around to the fully closed position. In a typical instrument application workflow, the user is prompted to fit and close the dispense assembly cap 120 until such time as the cap fully closed feature 129 is detected as described above. The diagnostic test then only proceeds to amplification, detection and generation of a test result after this detection. If after an extended time the cap 120 is not detected, this can optionally be considered by the instrument to constitute a fault or misuse, and an error message displayed on the instrument LCD display or communicated to one or more of the data interfaces. This arrangement has the advantage that the test will only proceed to generate a diagnostic result if the cartridge is confirmed to be used correctly within a reasonable time and the dispense function fully completed. This confirmation can provide self-checking by the instrument and improves confidence in the final test result.

There is provided, in some embodiments, a dispense assembly with push-on cap (e.g., snap-fit cap). In some embodiments, the dispense cap is pushed on (e.g., a user applies force down) and snaps into place (on the cartridge body). FIGS. 30A-30D depict non-limiting exemplary schematic illustrations of a snap-fit dispense cap assembly and a dual reaction chamber cartridge in an initial position before a snap fit is formed therebetween. The dispensing cap assembly can be a snap-fit dispense cap assembly 324. The snap-fit dispense cap assembly can comprise a snap-fit dispense cap 326, a dispense rod 328 and a dispensing chamber (e.g., dispense insert) 330. The cartridge body (e.g, dual reaction chamber cartridge 332) can comprise a distal end 334 (e.g., opening). Distal end 334 can comprise one or more recesses or protrusions (e.g., a shelf 336). The snap-fit dispense cap 326 can comprise one or more snapping members 338. A snapping member 338 can comprise protrusion(s) or a tab(s) 340 and can be inward facing. The snap-fit dispense cap 326 can configured to be connected to the distal end 334 (e.g., opening) of the cartridge body via a snap fit. The snap-fit dispense cap 326 can be formed from a softer and/or more pliable material than the distal end 334 of the cartridge body, such as from soft rubber or pliable plastic. The snap-fit dispense cap 326 can be formed by injection molding or by another suitable molding process, as is known in the art. In some embodiments, the snap-fit dispense cap 326 includes one or more snapping members 338 configured to engage the distal end 334 of the cartridge. The snapping member(s) 338 can be configured to form a snap-fit engagement with the distal end 334. The snapping member(s) 338 can comprise one or more projections (e.g., protrusions or tabs 340) extending radially inward, the distal end 334 can have one or more recesses or protrusions (e.g., shelf 336), and the one or more projections can engage the one or more recesses or protrusions of the to form the snap fit. In some embodiments, the snapping member(s) 338 include one or more protrusions or tabs 340 configured to engage a portion of the distal end 334 of the cartridge body to supplement the snap-fit engagement therebetween. In some embodiments, the distal end 334 include one or more recesses or protrusions 336 positioned to engage the protrusions or tabs 340. For example, the distal end 334 can include shelf 336 configured to contact the tabs 340 to from a suitable connection therewith. The inwardly extending tabs 340 of the snap-fit dispense cap 326 can be configured to grasp (e.g., form a snap-fit engagement with) the shelf 336. FIGS. 31A-31D depict non-limiting exemplary schematic illustrations of the snap-fit dispense cap assembly and dual reaction chamber cartridge shown in FIGS. 30A-30D after fully engaging the snap fit dispense cap assembly to form the snap fit. In some embodiments, the snap-fit dispense cap comprises an annular ring extending radially inward, the distal end of the cartridge defines one or more recesses or protrusions, and the annular ring of the snap-fit dispense cap engages the one or more recesses or protrusions to form the snap fit. In some embodiments, the snap-fit dispense cap comprises one or more projections extending radially inward, and distal end of the cartridge defines one or more recesses or protrusions, and the one or more projections of the snap-fit dispense cap engage the one or more recesses or protrusions of the distal end of the cartridge to form the snap fit. In some embodiments, the closure that is snapped onto the cartridge body by the user directly, or by a lever coupled to the test instrument. The single action by the user can be a downward force applied to the closure relative to the cartridge body. The downward force can form a snap fit between the closure and the cartridge body. In some embodiments, the downward force causes operation of the sample dispensing mechanism and seals the cartridge body. The downward force can comprise the downward force of a lever means. The closure can comprise a snap-fit dispense cap comprising one or more snapping members configured to form a snap fit with a distal end of the cartridge body upon the single action by the user.

In some embodiments, the dispensing cap assembly is supplied fully assembled in a protective packet, and is removed and inserted by the user, but this need not be the case in other embodiments. For example, in some embodiments the sample dispensing mechanism can be attached to the removed transport cap by the user in order to form the cap assembly, and in some other embodiments the dispensing mechanism can be disposed within the sample preparation reservoir, and a cap (either the removed transport cap or a different cap) coupled to the dispensing mechanism by the act of applying the cap to the sample preparation reservoir. In some embodiments, the sample dispensing mechanism is operable to rupture or otherwise disrupt or open the at least one seal to allow sample fluid to enter the at least one diagnostic test reservoir from the sample preparation reservoir, and to dispense a predetermined sub-volume of the sample fluid from the sample preparation reservoir into the at least one diagnostic test reservoir for diagnostic testing and detection therein while preventing further fluid movement between the sample preparation reservoir and the at least one diagnostic test reservoir (e.g., reaction chamber).

In some embodiments, the dispense insert (e.g., dispensing chamber) is mounted to one end of the dispense rod. In some embodiments, the dispense rod incorporates a flange that constitutes a plunger or piston once it is inserted into a cylindrical bore or ‘cylinder’ of the dispense insert. In some embodiments, the piston forms a sliding seal by close fit with the cylindrical bore, but in other embodiments incorporates an elastomer seal to improve the seal. In some embodiments, an “0” ring is used to improve the seal for the piston as it slides within the cylindrical bore of the dispense insert.

In some embodiments, the dispense insert (e.g., dispensing chamber) incorporates openings in the form of slots in its upper section. In some embodiments, these slots are arranged such that, in the initial configuration of the dispense rod piston as the assembly is inserted into the cartridge, the internal o-ring is positioned above the base of the slots, and the slots extend out to the outer diameter of the insert such that fluid can flow both past the outside of the cylindrical bore of the insert and also through its cylindrical bore as the insert is pressed further into the sample preparation reservoir. In some embodiments, this configuration prevents pressure build up, and assists mixing of the sample fluid during insertion. Other suitable forms of the openings and configurations will be apparent to those skilled in the art, such as holes or grooves, for example, to achieve this function, where the insert does not form a seal with the internal wall of the sample preparation reservoir, and thus it can easily be moved through the sample fluid retained within the sample preparation reservoir. In some embodiments, the outer diameter and form of the dispense insert allows it to be positioned and aligned centrally within the sample preparation reservoir as it is pressed in, also to easily move down into the sample preparation reservoir as it is inserted (e.g., without significant resistance from the sample fluid). In some embodiments, this allows the base of the dispense insert to be accurately aligned with a mating recess in the base of the sample preparation reservoir.

In some embodiments, the dispense rod includes a piston flange with a sealing “O” ring and also piercing tip(s) at the end of the dispense rod. In some embodiments, once the dispense assembly is sufficiently inserted, the internal threads in the cap engage with the external thread on the body of the cartridge. In some embodiments, once these threads have mutually engaged, the user is prompted to and can progressively screw the cap closed. In some embodiments, the action of screwing the cap closed provides a mechanical advantage that facilitates the travel of the dispense assembly through the sample preparation reservoir to engage the internal components, perforate the seals at the base of the sample preparation reservoir, and dispense a sub-sample volume of sample fluid from the sample preparation reservoir into the diagnostic test reservoir.

In some embodiments, the dispense insert (e.g., dispensing chamber), after it has made contact with the base of the cartridge body, is retained on the dispense rod in such a way that some additional force is required before the dispense rod can move further into the bore of the dispense insert. In some embodiments, this additional force allows the base of the dispense insert to be pressed under friction or snapped into place into a mating or surface feature in the recess at the base of the sample preparation reservoir, forming a fluid seal therewith. In some embodiments, a small elastomer seal is included either on the dispense insert or the sample tube to assist the formation of this seal. However, in some embodiments, the injection molded form of the base of the dispense insert and the mating feature in the sample preparation reservoir are sufficient to form a fluid seal under the compression force applied as these parts come into mutual contact. In some embodiments, there is a detent formed by a circular groove in the dispense rod and a corresponding annular ring on the dispense insert. In some embodiments, this detent provides the initial break-away force to lock and seal the dispense insert into place in the base of the sample preparation reservoir prior to the completion of the dispense operation once the detent resistance is overcome and the dispense rod starts to travel through the dispense insert under the continued rotational action of the screw cap. Other arrangements for providing the dispense insert sealing force are available, and will be apparent to those of skill in the art in light of this disclosure.

In some embodiments, insert is fitted onto the dispense rod with a collapsible or crushable spacer component captured between both the dispense insert and an engagement feature extending from the dispense rod. In some embodiments, as the dispensing cap assembly is pressed into the cartridge by the screw cap action, the dispense insert makes contact with the base of the cartridge sample chamber. In some embodiments, the collapsible spacer allows the screw action to apply a force to engage the sealing action wherein the base of the cylindrical bore of the dispense insert is pressed into the mating feature in the base of the cartridge. In some embodiments, as the cap screw action applies additional force and travel, the spacer is configured to collapse in a controlled manner to press the dispense insert into place and then allow the "0" ring plunger on the dispense rod to enter the tubular bore section of the dispense mechanism. In some embodiments, after the dispense insert is held or locked in place, the "0" ring plunger on the dispense rod is caused to enter the tubular section of the dispense mechanism and form a piston and cylinder or syringe. In some embodiments, as the "0" ring plunger traps a fluid volume into the dispense tube, the piercing tip of the dispensing rod perforates the plastic section in the cartridge at the base of the tube in the dispense insert. In some embodiments, this perforation action punches a hole through the plastic section and also through the foil or plastic membrane over the top of the amplification tube. In some embodiments, continued travel of the plunger then dispenses the trapped fluid volume into the amplification tube. In some embodiments, the fluid trapped in this cylindrical section is a fixed and predetermined volume of the sample fluid that is dispensed through the perforation in the base of the sample chamber into the amplification tube mounted below.

Optional Dispensing Chamber Fluid Functions

Figure 27:
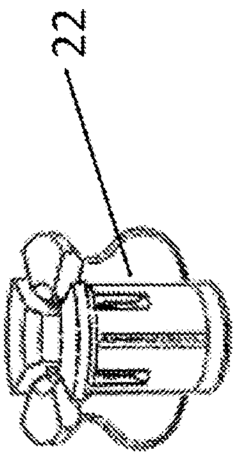
FIG. 27 is a non-limiting exemplary schematic illustration of the dispensing chamber in isolation.
Figure 26:
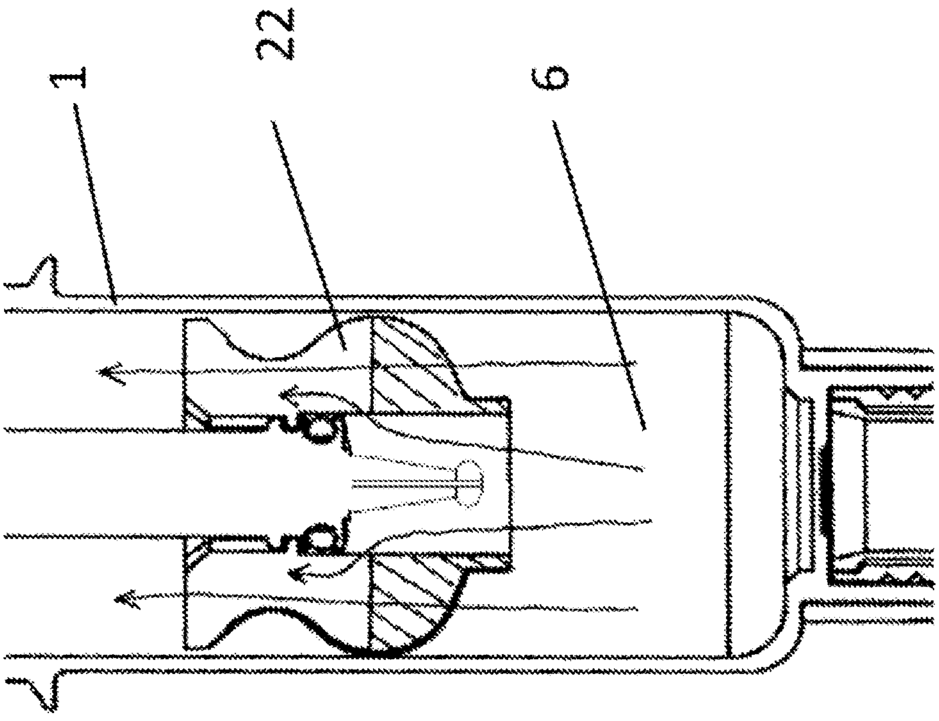
FIG. 26 is a non-limiting exemplary schematic illustration of fluid flow through and around a dispenser insert, inducing mixing as the dispensing mechanism is pressed into the cartridge.

In some embodiments, as the dispensing chamber (e.g., dispense insert) is inserted into the cartridge body 1, the sample fluid flows around it and through the open ended cylindrical dispensing bore, as shown in FIG. 26. FIG. 27 shows a dispensing chamber in an isometric view. In some embodiments, the dispensing chamber 22 has fins with fluid paths past the outside of the cylindrical bore and also slots down only a portion of its length. Consequently, sample fluid that has entered the cylindrical bore can exit through the slots when the sealing plunger is not fully pressed into the solid or 'un-slotted' portion of the dispensing chamber 22. FIG. 26 shows typical fluid flow lines. This description can apply equally to case of the dispensing chamber in multiple reaction chamber cartridges such as the two tube insert 122 shown in FIG. 21.

Filter Components

In some embodiments, the dispensing chamber is initially configured so that, as the sample dispensing mechanism is inserted into the cartridge body, the sample fluid is forced to flow around the outside of the dispensing chamber before it can flow into the dispensing chamber, wherein the fluid that flows around the outside of the dispensing chamber is caused to flow through a filter or porous filler material that retains and/or traps particles and debris and/or incorporates biological or chemical components that bind to or capture components of the sample fluid that may otherwise inhibit or interfere with the sample testing.

Figure 28:
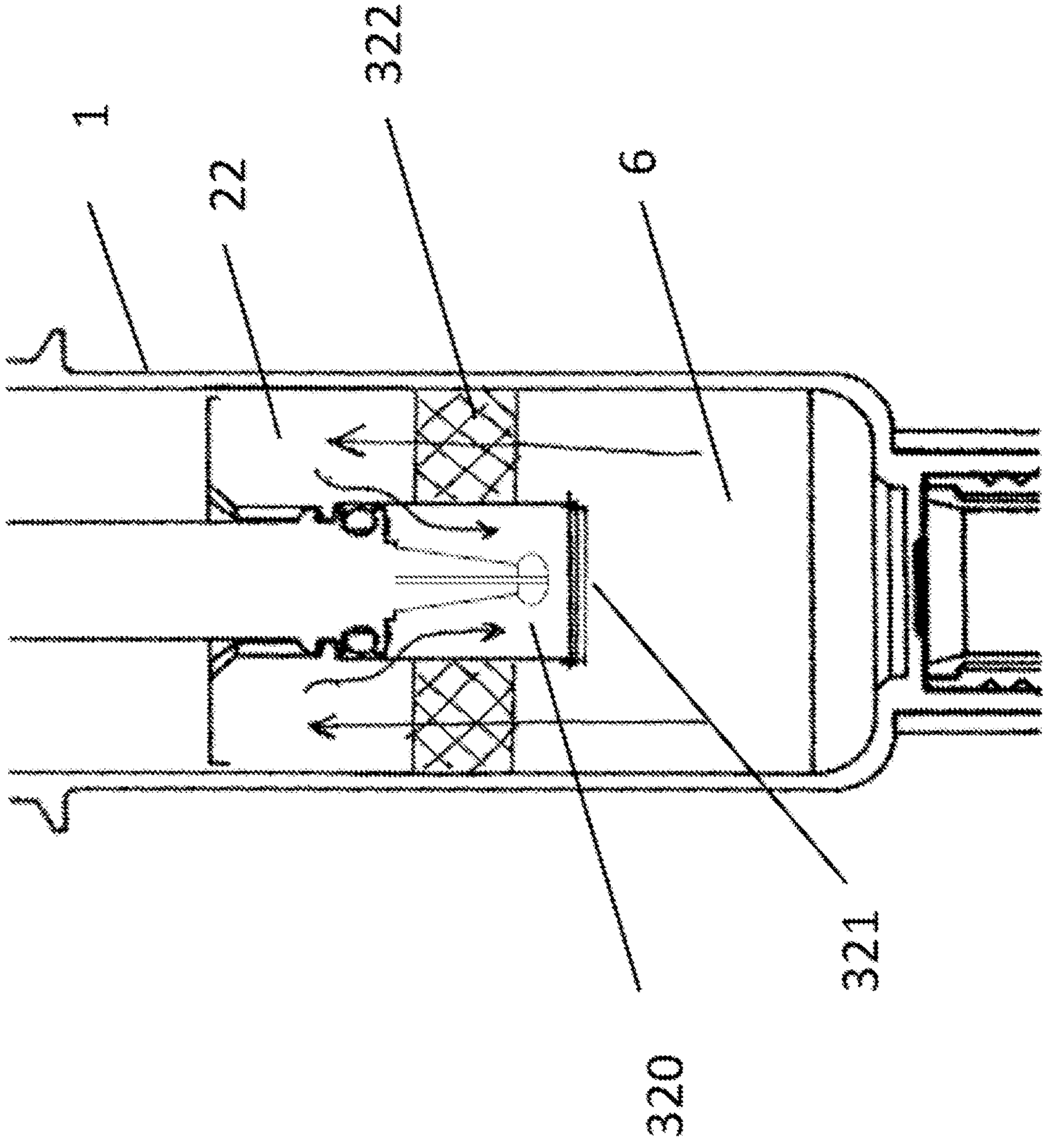
FIG. 28 is a non-limiting exemplary schematic illustration of a cross-sectional side view illustrating an alternative embodiment of a dispensing chamber wherein the base of the insert bore is scaled, and the sample and sample reagent fluid can only flow through an outer bypass region of the insert as it is pressed into the cartridge, and then flows back into the top of the insert bore; the bypass region can include a filter or a porous material or fillers to remove or trap any particles within the sample fluid and prevent these from entering the test reservoirs(s).

FIG. 28 shows an alternative embodiment of the dispensing chamber (e.g., dispense insert) 22 that allows a filter 322 to be included so that particles or inclusions in the sample fluid can be removed from the sample fluid that enters the dispense chamber and is subsequently dispensed into the coupled reaction chamber or tube. In this embodiment, the dispensing chamber 22 has its underside entry to the cylindrical bore 320 closed by a seal (e.g., membrane) 321. As the dispensing chamber 22 is pressed into the cartridge assembly after the sample has been added, all of the displaced sample fluid flows around the outside of the closed cylindrical bore 320 through the provided fluid paths. Within these fluid paths, one or more filter components 322 can be included, as shown by crosshatching in FIG. 28. These filters 322 can be a fibre type material such as compressed glass fibre or a porous foam or porous plastic material. The one or more filter components 322 can be a single annular disk of material, or a number of smaller parts placed into each of the available fluid paths.

In some embodiments, the filter components 322 physically capture and contain particles or material that would otherwise contaminate the sample fluid to be dispensed into the test reservoir. The filter components 322 can also incorporate biological or chemical components that bind to or capture components of the sample fluid that may otherwise inhibit or interfere with the test or amplification process. In some embodiments, fluid that has passed the filter components 322 will then fill the central cylindrical dispensing bore 320 from the top through the disperser slots as the part is submerged in the sample fluid. This filtered sample fluid can then be available within the dispenser bore 320 for subsequent sealing and dispensing through perforations into the attached test tube.

Magnetic Bead-Based Nucleic Acid Concentration

In some embodiments, the cartridge body comprises one or more magnetic particles with the sample preparation fluid, the surface of the magnetic particles being coated or functionalized to bind with and capture at least one predetermined target species of the biological or environmental sample when the magnetic particles are mixed within the sample fluid, and the sample dispensing mechanism is configured so that, as the sample dispensing mechanism is inserted into the cartridge body, the sample fluid is forced to flow through the dispensing chamber, and one or more magnets are located in close proximity to the inside surface of the dispensing chamber so that magnetic particles contained within the sample fluid and have captured target species are attracted to and held against the internal surface of the dispensing chamber, such that the plunger mechanism that forms a sliding seal with the internal surface of the dispensing chamber collects the magnetic particles held against the internal surface and dispenses them into the at least one reaction chamber to provide an increased concentration of the at least one predetermined target species in the predetermined sub-volume of the sample fluid dispensed into the at least one reaction chamber.

Figure 29:
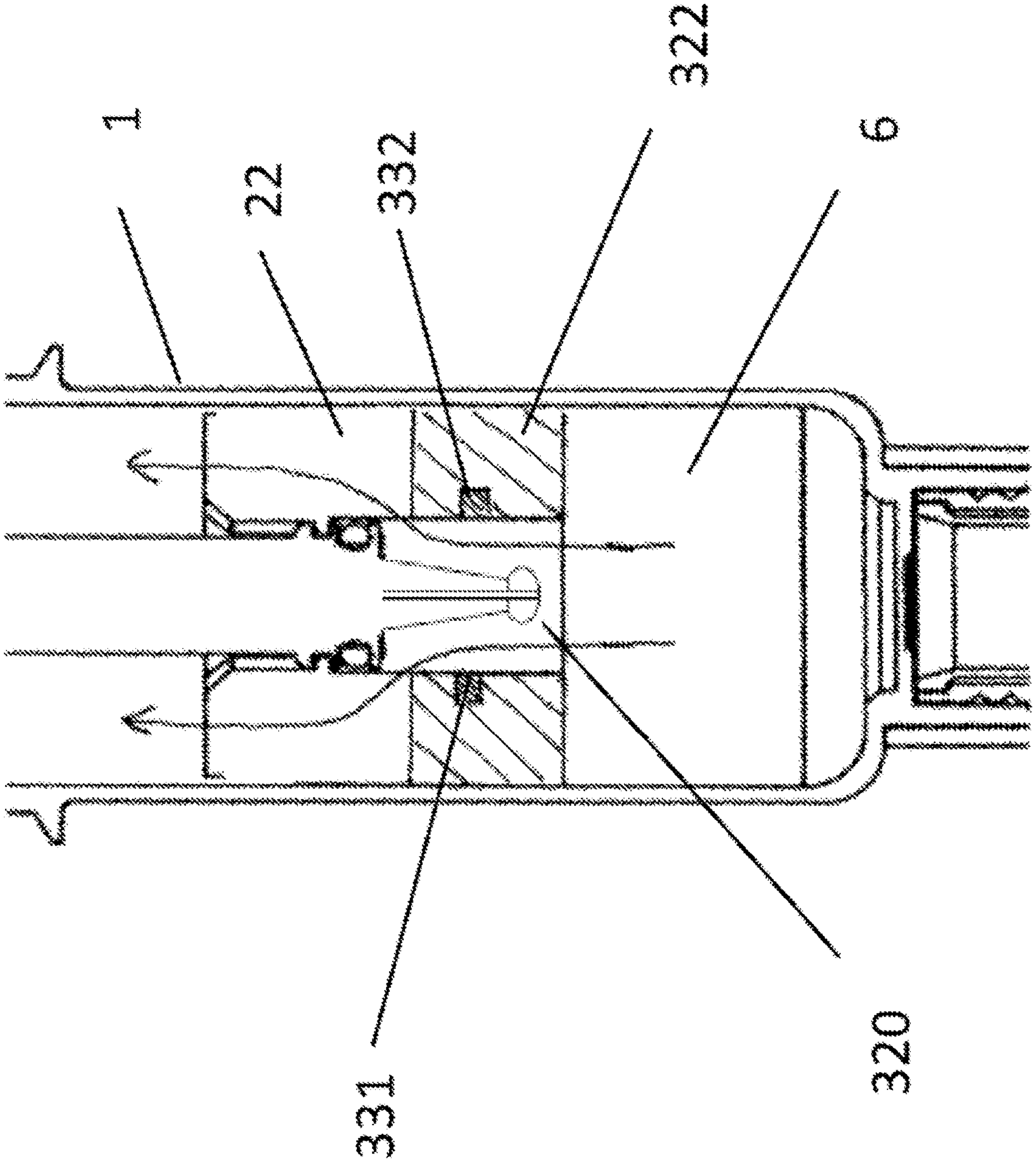
FIG. 29 is a non-limiting exemplary schematic illustration of a cross-sectional side view illustrating a further alternative embodiment of a dispensing chamber wherein the sample fluid can only flow through an internal bore of the insert as the assembly is pressed into the cartridge; the sample fluid cannot bypass the insert barrel as this region is blocked, and the insert includes a magnet around the bore to collect and concentrate DNA and RNA captured on the surface of magnetic beads.
Figure 30A:
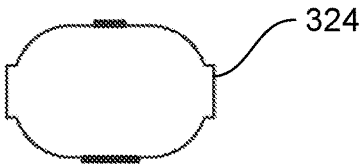
FIGS. 30A-30D depict non-limiting exemplary schematic illustrations of a snap-fit dispense cap assembly and a dual reaction chamber cartridge in an initial position before a snap fit is formed therebetween, from a top view (FIG. 30A), from a perspective view (FIG. 30B), and from side views (FIGS. 30C-30D). Arrow indicates downward force applied by a user to engage the snap fit.
Figure 30B:
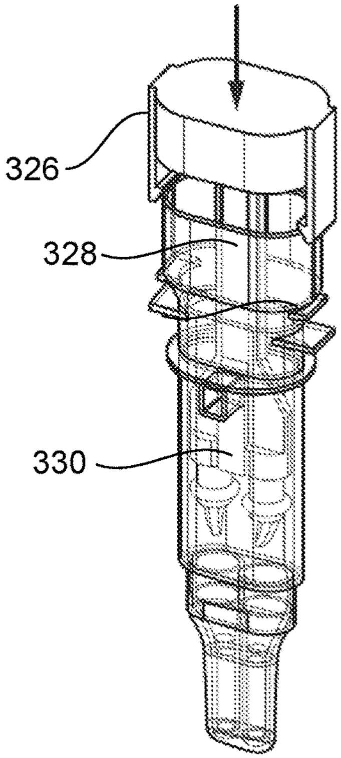
Figure 30C:
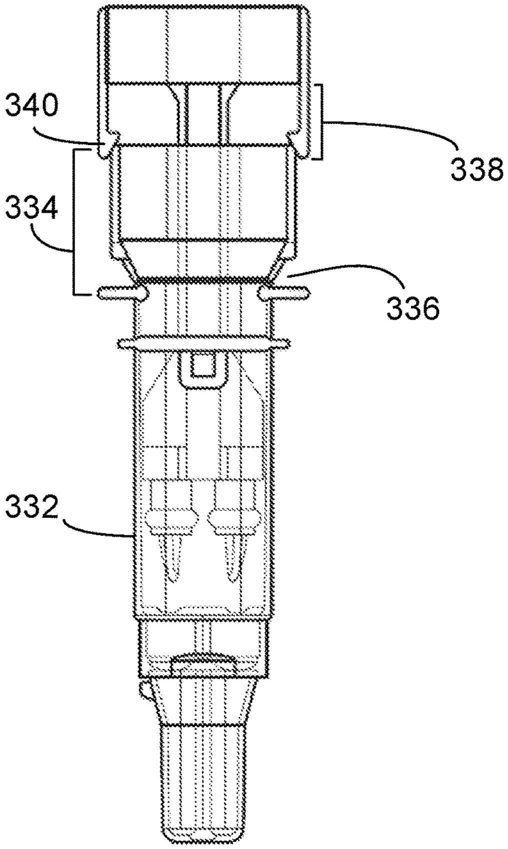
Figure 30D:
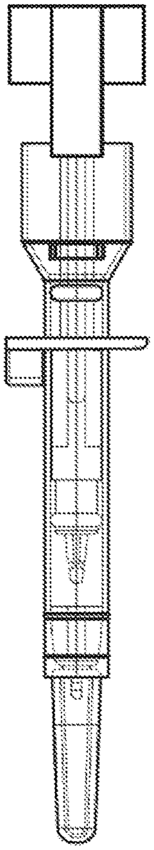
Figure 31A:
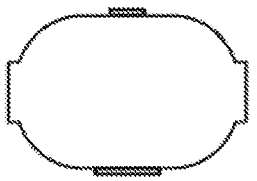
FIGS. 31A-31D depict non-limiting exemplary schematic illustrations of the snap-fit dispense cap assembly and dual reaction chamber cartridge shown in FIGS. 30A-30D after fully engaging the snap fit dispense cap assembly to form the snap fit, from a top view (FIG. 31A), from a perspective view (FIG. 31B), and from side views (FIGS. 31C-31D). Arrows indicate snap fit.
Figure 31B:
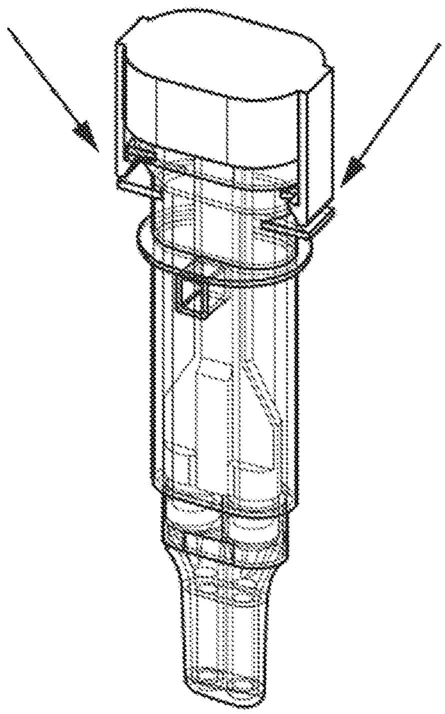
Figure 31C:
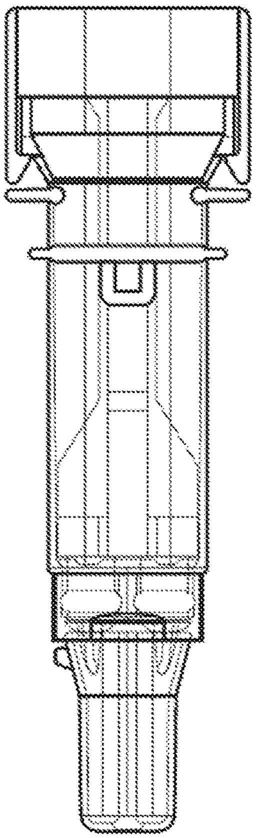
Figure 31D:
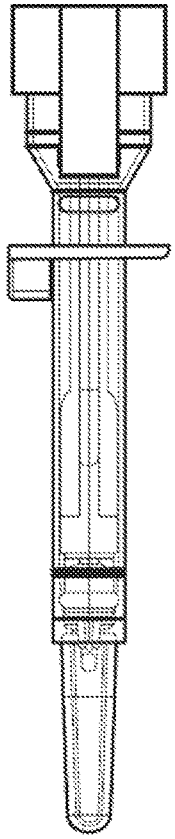

FIG. 29 shows an alternative configuration of the dispensing chamber (e.g., dispense insert) 22 that allows a magnetic bead concentration function to be effected within the cartridge assembly. In this embodiment, the dispensing chamber 22 does not have any fluid path past the outside of the cylindrical bore 320, and all of the displaced sample fluid it is made to flow through the cylindrical bore 320 as the dispensing chamber 22 is inserted into the cartridge. In this embodiment, the sample preparation fluid contains magnetic particles, or these particles can be added as a test process step. In some embodiments, the surface of the particles are coated or functionalized to bind with and capture at least one target species of interest in the sample material mixed into or in solution within the sample fluid. For example, a typical application is to bind nucleic acid, DNA or RNA material onto the functionalized surface coating of the magnetic particles as these particles mix within the sample fluid contained in the sample volume 6 of the cartridge 1. The magnetic particles can be very small, typically within the range of 0.5 micrometers to 10 micrometers. These magnetic particles mix freely and remain in suspension within the sample fluid, binding with and capturing target molecules onto their surface coatings.

In some embodiments, the dispense insert or dispensing chamber is configured to have a sliding seal with the inside surface of the cartridge where a solid section of the insert 322 blocks fluid flowing past the outside of the central cylinder, such that all of the fluid in the sample chamber is forced to flow through the central cylindrical bore 320. Flow lines in FIG. 29 show the typical fluid path. In this embodiment, the dispensing chamber component incorporates one or more permanent magnets 331 captured within the molded plastic of the component and located close to the inside surface of the cylindrical bore 320. A typical arrangement is to use a ring magnet 331 that surrounds the inside of the bore 320, where this magnet 331 is introduced into the molding process at the time the insert 22 is injection molded and is captured within the plastic structure of the part 22. In some embodiments, as the sample fluid flows through the dispense cylinder, in proximity to the internal magnets 231, the magnetic particles are pulled against the side wall of the dispense cylinder by the magnetic field and retained within the cylindrical dispense tube 320 along with any captured DNA or RNA material.

Once the dispense component has been pressed into a seal at the base of the sample chamber, and the piston components engage with and seal the top of the chamber, the perforation component breaks through the thin material at the base of the sample chamber 1. During the dispense process, the magnetic beads magnetically held against the inside walls of the cylinder are wiped down the bore 320 by the O-ring scaled plunger, and are thus mixed back into the sample fluid trapped within the dispense cylinder and all of this fluid and magnetic beads are dispensed into the coupled test tube by the progressive travel of the piston into the reaction chamber. This concentrates the DNA or RNA material within the sample fluid, and delivers it into the reaction chambers 107, 108. This has the advantage of concentrating and purifying the DNA or RNA nucleic acid material extracted from the sample resulting in a more sensitive and more reliable diagnostic test. The reagents within the test tube 107, 108, once eluted by the added sample fluid, can react with the molecules selectively bound to the magnetic particles. The test tube reagents can contain salts, or chemicals or a pH suitable for release of the captured material from the surface of the magnetic particles within the reaction chamber(s) 107, 108 to assist with reaction and detection of these components.

Manually Operated, Visually Read, Non-Instrumented Cartridge Operation

In some applications, the cartridge is used manually without an instrument. For example, in some embodiments, the cartridge is held in one hand, and the first cap removed with the other hand, the sample added and the second (dispensing) cap fitted and screwed shut. In some such embodiments, where the reaction chamber(s) are visually transparent, the dispensing of fluid into the reaction chamber(s) can be visually observed, and a color or turbidity change observed over time to provide a diagnostic test readout or display. This approach uses the advantages of operating with a fully scaled cartridge once the sample is added and internally dispensing a measured volume of diluted, prepared sample fluid into the test tube without the use of external fluid transfer steps.

Optionally, a simple stand may be provided to support the cartridge for the purpose of removing the first cap, adding the sample, and fitting and closing the dispensing cap and its associated mechanism.

Optionally, a heater block may be provided to provide temperature control of the sample and test tube chambers of the cartridge assembly, but the cartridge is manually withdrawn to observe the test result visible in one or more coupled reaction chamber(s).

Testing Instruments

In some embodiments provided herein, the cartridge can be operated within a testing apparatus or "instrument" to conduct a test (e.g., diagnostic test). The sample testing systems disclosed herein can include a testing apparatus/instrument. Details of the cartridge and the testing instrument in accordance with some embodiments of the compositions, systems, and methods provided herein are described below. By pre-loading sample preparation reagents and testing reagents into the cartridge, the sample testing system can be configured to run a specific predetermined set of one or more tests (e.g., diagnostic tests), and provide at least one indication of the test outcome(s) to a user. Different versions of the cartridge with the same physical configuration but different loaded reagents can be produced to cover a wide range of test types and diagnostic applications. In some embodiments, the instrument can automatically determine the type of diagnostic test to be performed from an identifier of the cartridge (visual or otherwise), perform the determined diagnostic test(s) and, at the completion of the diagnostic test(s), provide the diagnostic test result(s) to the user by displaying it/them on the user interface display, and/or providing it/them in the form of one or more electronic records or other form of electronic data via any of a number of communications interfaces of the instrument.

Figure 32A:
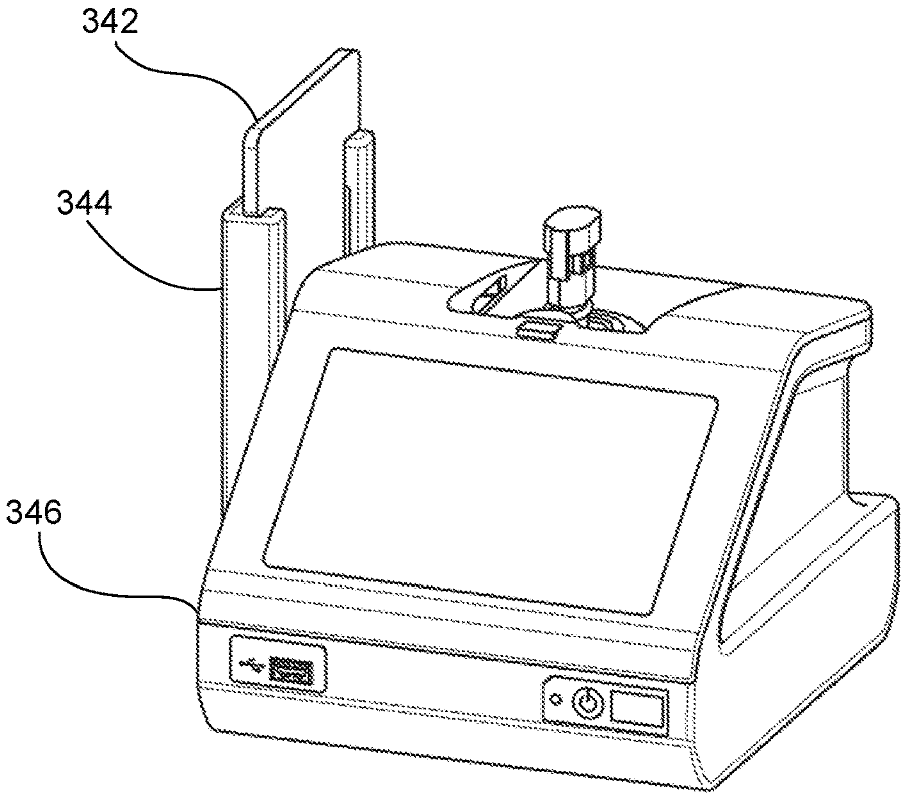
FIGS. 32A-32B depict non-limiting exemplary schematic illustrations of a testing apparatus wherein a snap-fit dispense cap assembly and a dual reaction chamber cartridge (in an initial position before a snap fit is formed therebetween) is placed in the receiving port, from a perspective view (FIG. 32A) and side view (FIG. 32B).
Figure 32B:
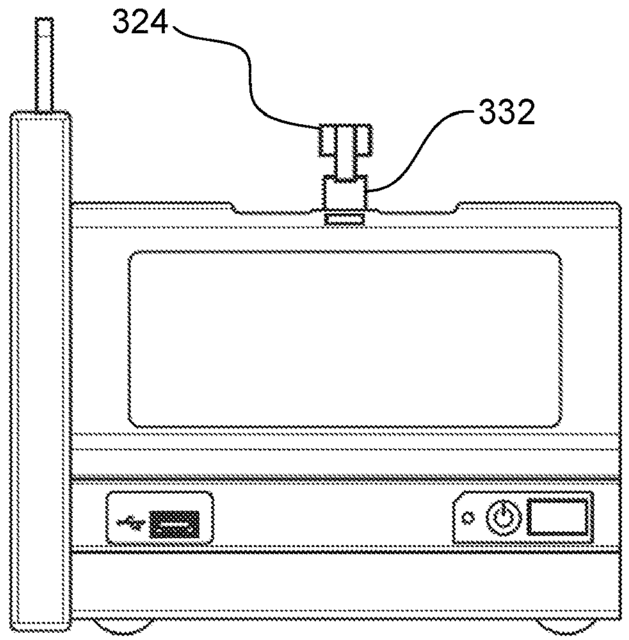
Figure 33A:
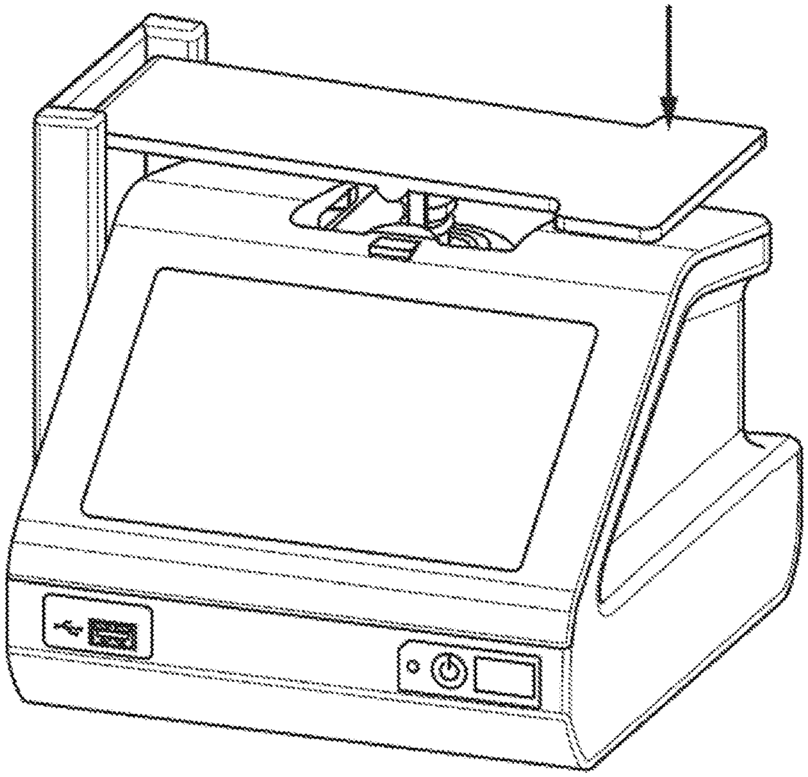
FIGS. 33A-33B depict non-limiting exemplary schematic illustrations of the testing apparatus depicted in FIGS. 32A-32B after the hinged lid is pressed on the top of snap-fit dispense cap to form the snap fit, from a perspective view (FIG. 33A) and from a side view (FIG. 33B). Arrow indicates where a user can push on the hinged lid to engage the snap fit.
Figure 33B:
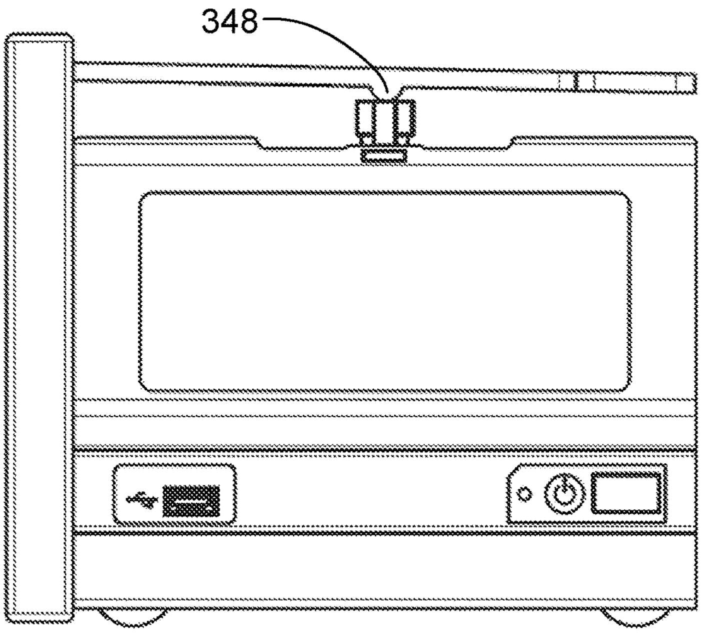

There are provided, in some embodiments, testing apparatuses. A testing apparatus can comprise a receiving port configured to receive a sample testing system provided herein. The testing apparatus can be configured to perform a test on the biological or environmental sample therein. In some embodiments, the testing apparatus further comprises a lever means configured to apply a downward force to the sample testing system placed in the receiving port. The single action can be a downward force applied to the closure relative to the cartridge body via the lever means. The downward force can form a snap fit between the closure and the cartridge body. There are provided, in some embodiments, instruments (e.g., testing apparatus) with a lever means (e.g., hinged lid). A hinged lid on the instrument can allow a user to push on the closure (e.g., dispense cap) with less force due to mechanical advantage. In some embodiments, the lid is stored vertically in a sleeve. In some embodiments, during operation, a user lifts up the hinged lid and pivots it into a horizontal position. FIGS. 32A-32B depict non-limiting exemplary schematic illustrations of a testing apparatus wherein a snap-fit dispense cap assembly and a dual reaction chamber cartridge (in an initial position before a snap fit is formed therebetween) is placed in the receiving port, while FIGS. 33A-33B depict non-limiting exemplary schematic illustrations of the testing apparatus depicted in FIGS. 32A-32B after the hinged lid is pressed on the top of snap-fit dispense cap to form the snap fit. The testing apparatus 346 can comprise a hinged lid 342. The testing apparatus 346 can comprise a sleeve 344 for storing the hinged lid 342 when not in use. The hinged lid 342 can comprise an elevated or raised portion (e.g., ridge 348) configured to contact the surface of the closure. The testing apparatus can comprise a sleeve for storing the lever means. The hinged lid can be substantially parallel to the cartridge body when stored within the sleeve. In some embodiments, at least a portion of the hinged lid can be configured to slide up and out of the sleeve when lifted by a user to expose a hinge of the hinged lid. In some embodiments, upon the hinge being exposed, the hinged lid can be capable of being pivoted into a horizontal position substantially perpendicular to the cartridge body.

The testing apparatus can comprise one or more mating slots configured to align and engage with one or more alignment features of a cartridge body. The one or more mating slots can be situated in the receiving port. The one or more alignment features can prevent rotation of the cartridge body when it is in place in the testing apparatus. The one or more alignment features can enable a user to remove the second closure and/or perform the single action in a single-handed operation.

To assist with closure removal, warm-up, sample addition, sample preparation, sample dispensing, cartridge closure and test result measurement, the cartridge can supported by, aligned with, heated by and/or measured by the sample testing apparatus/instrument. In some embodiments, the instrument includes separate heater regions for independent temperature control of sample preparation and reaction chambers within the cartridge. In some embodiments of a test sequence, the cartridge with contained sample preparation fluid is inserted into the instrument, and the instrument detects the presence of the cartridge and begins warming the sample preparation fluid. When the sample preparation fluid has reached the desired temperature, the instrument can then prompt the user to add the biological or environmental sample to be analyzed. The heating of the sample preparation fluid can be useful to assist with rapid and efficient sample preparation.

Subsequently, or when prompted by the instrument, the user can then apply a closure to the cartridge body, and the action of operating the closure can not only seal the sample and sample preparation fluid within the cartridge, but also actuate a dispensing mechanism within the cartridge body to deliver a sub-sample of predetermined volume into one or more reaction chambers within the cartridge.

In some embodiments, the instrument then controls the temperature of the one or more reaction chambers and the sample fluid and testing reagents contained within them. This temperature control can be to maintain a fixed temperature, or to follow a predetermined time varying temperature profile, for example, or in the case of a PCR reaction, subjected to thermal cycling with heating and cooling between different fixed temperatures. In any case, a cycle series or a time series of optical measurements of the contents of the reaction chamber(s) can be acquired by the instrument. The instrument can process these measurements to determine a test result which can then be displayed or otherwise provided as an output to a user.

Provided herein are compositions, systems, and methods comprising and/or employing a testing instrument or apparatus which includes one or more of the following: (i) an instrument housing with an access port to accept a plastic cartridge assembly; (ii) a sensor or switch to detect the insertion or presence of the cartridge inserted into the apparatus; (iii) controller electronics and associated internal electronics, microprocessor and memory to run a software program and save data for future recall and use; (iv) electrical interface connectors for connection of USB, serial or Ethernet connected peripherals interfaces and external memory devices; (v) embedded software to provide functions to sequence processing of the instrument, the cartridge and acquire diagnostic test measurements for interpretation determination of test outcome; (vi) a temperature controlled sample chamber heater block to provide heating and temperature control of the upper sample chamber section of the cartridge assembly; (vii) a temperature controlled heater block to provide heating and temperature control of the upper contact specific reaction chamber(s) (e.g., amplification test wells) in an inserted cartridge where this block can apply controlled temperatures including temperature cycling to fluids within the cartridge wells; and/or (viii) sensors to detect and provide measurement of optical absorption, fluorescence or bioluminescence characteristics of the reagents and added sample fluid reactions within the reaction chamber(s) during the course of the test running and at the completion of the test.

The instrument apparatus can incorporate one or more optical sensors where these sensors can be scanned along a row of test wells to allow a multitude of measurements to be recorded for each test well using one or more different sensors. In some embodiments, the instrument controller may be located remotely from the physical body of the apparatus such as on a remote server, and manage and control the operation of the apparatus over a communication network such as the internet. In some embodiments, one or more of the sensors is a coaxial fluorescence sensor where optically filtered emissions from a light emitting diode, or laser illumination of a selective wavelength range is emitted from the sensor lens. In some embodiments, this illumination causes optical excitation of the sample in the test well and the same lens also captures florescence emission from the sample at a different shifted wavelength. In some embodiments, this sample fluorescence emission is measured and forms a measurement used in determining the diagnostic test result. In some embodiments, one or more of the sensors can detect fluorescence within the sample contained within each test well using a separated excitation illumination source to optically excite the test sample and a separated sensor to measure the resulting fluorescence emission. In some embodiments, one or more of the sensors uses reflectance or transmission of specific optical illumination wavelength ranges to measure optical reflectance or absorption within the test sample contained within each test well. In some embodiments, one or more of the sensors measures light emission from the test sample, where this emission is caused by luminescence or bio-luminescence within the test sample. In some embodiments, the sensors are scanned at constant speed past all of the wells, and a multitude of measurements acquired. Subsequent processing of this data set of measurements can determine the measurement values to assign to each test well. This analysis can consider such characteristics as the relative position or the acquisition time of each measurement and local peaks with an interpolated curve encompassing the acquired measurements.

In some embodiments, the instrument apparatus incorporates one or more ultraviolet light sources, where this ultraviolet illumination can be turned on or off by the instrument controller. In some embodiments, the instrument apparatus incorporates one or more reference targets within the field of view of the fluorescence or optical absorption sensors. In some embodiments, the test apparatus includes at least one sensing component configured to determine a degree of rotation and/or thread progression of the closure, and the test apparatus is configured to prompt a user to complete the closure operation if the at least one sensing component has determined that the closure operation is incomplete; and to automatically progress to a next stage of diagnostic testing if the closure operation has been determined as being complete.

In some embodiments, at least one of the at least one reaction chambers is transparent, and the test apparatus is configured to determine a test result in the at least one reaction chamber by detecting or measuring a change in emission and/or absorption at one or more wavelengths within the at least one reaction chamber, wherein the test apparatus is optionally configured to illuminate the at least one reaction chamber to enhance or produce the detecting or measuring. In some embodiments, the test apparatus and the sample testing system (e.g., diagnostic test assembly) include respective alignment and support features configured for mutual engagement to ensure that the sample testing system is received in a predetermined alignment with respect to the test apparatus and to maintain the alignment when the closure is applied to the cartridge body after receipt of the biological or environmental sample and the sample dispensing mechanism therein.

The test apparatus can include one or more components configured to apply a changing and/or moving magnetic field to the sample testing system to cause corresponding movements of magnetic particles within at least one of the cartridge body and the at least one reaction chamber, and thereby cause mixing of the sample and sample preparation fluid therein.

In some embodiments, the test apparatus and the sample testing system are configured to allow the test apparatus to independently control the temperatures of the cartridge body and the at least one reaction chamber.

In some embodiments, the test apparatus includes one or more image sensors configured to generate image data representing one or more images of at least a portion of the sample testing system, wherein the images represent at least one of: (i) fluid distribution within at least one of the at least one reaction chamber and the cartridge body, and the test apparatus is configured to process the image data to monitor dispensing of the sample fluid, and to proceed to a next stage of diagnostic testing if the monitoring has determined that the dispensing is complete; and (ii) a fluid volume contained within the at least one reaction chamber, and the test apparatus is configured to process the image data to allow compensation for the volume tolerances in the dispensed fluid to allow for improved test result determination. In some embodiments, the test apparatus includes one or more optical sensors mounted to a translation stage under control of a controller of the test apparatus so that the optical sensors can measure optical absorption or emission or fluorescence from one or more selected reaction chambers of the sample testing system.

In some embodiments, the test apparatus includes at least one ultra violet (UV) emission source to denature samples contained within the sample testing system following a diagnostic test to inhibit contamination in the event of sample fluid escaping from the sample testing system.

One or more image sensors can incorporated within the instrument can capture digital images of the cartridge and the progression of the dispensing mechanism components and the state and progress of the fluids contained within the cartridge. The image data acquired by the image sensor and in subsequent image analysis can be used by the controller to determine the levels of the dispensed sample fluid in each of the reaction chamber(s) 107, 108 and to use this level to determine that the sample fluid dispensing has completed correctly. The level of the fluid dispensed into each of the one or more reaction chamber(s) 107, 108 within the cartridge can be used to compensate the test result for tolerances in the dispensing operation. The level of the fluid with each test tube can be converted by the controller to a volume by using a mathematical model of the tube 107, 108 or by using a look up table. The volume of dispensed fluid can influence the concentration of the test regents within the test chamber fluid once they have dissolved into the dispensed fluid. By measuring the volume of the dispensed sample fluid, the concentration of reagents within each test tube 107, 108 can be calculated. From a series of previously conducted experiments or from a model of the test reactions, the effect of test reagent concentration on the test result and the interpretation of the time series measurements of the test to interpret the result can be known and adjusted or compensated for within the apparatus. The fluid sample preparation reagent stored in the cartridge can be colored with a dye. This dye can be used by the image sensor to visually image colored or contrasting fluid flow into the cartridge reaction chamber(s) 107, 108 to confirm the dispensing action and confirm the dispense volume. Image analysis of an image of the fluid dispensed into one or more of the coupled reaction chamber(s) 107, 108 can be used to measure the volume within the tube 107, 108, and this measurement can be used to compensate the test result calculation for the amplification volume. This compensation can be of particular significance for a quantitative test result where the concentration of reagents in the test tube 107, 108 can influence the measurements and reaction response.

Although some embodiments employ optical measurements of the reaction chamber to determine a test result, it is recognized that sensors with alternative measurement methods can operate in the same test apparatus/instrument and with the diagnostic test cartridges described herein. These sensors can use magnetic, electrical, atomic or physical properties of the test fluids to acquire measurements suitable to determine a test result.

Cartridge Body and Reaction Chamber Mixing

Some embodiments of the compositions and methods provided herein contemplate mixing of the contents of either the cartridge body or the reaction chamber(s), which can, in some embodiments, improve test reliability or accuracy. To achieve mixing, magnetic inserts such as small steel or ferrite balls can be included in the cartridge body and/or the reaction chamber(s) 107, 108 during reagent loading of the cartridge (e.g., during its initial manufacture). Some embodiments contemplate applying an external magnetic field to the cartridge body (e.g., provided by a testing apparatus moving a permanent magnet or plurality of magnets into proximity) to induce mixing within the sample fluid and/or reaction chambers. Mixing within the cartridge body can be used to mix introduced sample material with the sample preparation fluid to dilute and prepare the sample material for amplification. This preparation mixing can also improve cell lysis and the extraction and preparation of the target DNA or RNA nucleic acid material within the sample.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. As used in this specification and the appended claims, the singular forms "a," "an," and "the" include plural references unless the context clearly dictates otherwise. Any reference to "or" herein is intended to encompass "and/or" unless otherwise stated.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A sample testing system, comprising:

a cartridge body to receive a biological or environmental sample into a sample preparation fluid contained in the cartridge body for preparation of a sample fluid therefrom;

at least one reaction chamber coupled to the cartridge body;

at least one seal to prevent fluid movement between the cartridge body and the at least one reaction chamber, the at least one seal situated between the cartridge body and the at least one reaction chamber, the at least one seal punctured during operation of the sample testing system by a piercing tip to thereby enable fluid movement between the cartridge body and the at least one reaction chamber; and a sample dispensing mechanism for insertion into the cartridge body, wherein the sample dispensing mechanism is operable to disrupt the at least one seal to allow sample fluid to enter the at least one reaction chamber from the cartridge body, and to dispense a predetermined subvolume of the sample fluid from the cartridge body into the at least one reaction chamber for testing therein while preventing further fluid movement between the cartridge body and the at least one reaction chamber, wherein the sample dispensing mechanism comprises a dispense rod comprising at least one piercing tip that disrupts the at least one seal by forming at least one opening therein, and wherein the at least one piercing tip comprises a geometry configured to generate a large opening in the at least one seal, and wherein the at least one piercing tip disrupting the at least one seal generates one or more flaps, wherein the one or more flaps comprise portion(s) of the at least one seal disrupted by the at least one piercing tip.

2. The sample testing system of claim 1, comprising a closure to seal the cartridge body after receipt of the biological or environmental sample and the sample dispensing mechanism therein, wherein at least one of the closure and the cartridge body is configured to prevent or at least inhibit removal of the closure from the cartridge body so that the fluids remain sealed within the sample testing system.

3. The sample testing system of claim 2, wherein the sample dispensing mechanism is attached to the closure so that an act of applying the closure to the cartridge body also effects the insertion of the sample dispensing mechanism into the cartridge body.

4. The sample testing system of claim 3, wherein a single action by a user causes the sample dispensing mechanism to disrupt the at least one seal and to dispense the sample fluid from the cartridge body into the at least one reaction chamber.

5. The sample testing system of claim 4, wherein the single action by the user is a sustained screwing action applied to the closure relative to the cartridge body, and wherein the screwing action causes operation of the sample dispensing mechanism and seals the cartridge body, and wherein the closure comprises a screw thread.

6. The sample testing system of claim 5, wherein the cartridge body comprises one or more alignment features configured to align and engage with one or more mating slots of a testing apparatus, wherein the one or more alignment features prevent rotation of the cartridge body when it is in place in the testing apparatus, and wherein the one or more alignment features enable a user to perform the single action in a single-handed operation.

7. The sample testing system of claim 1, wherein the at least one piercing tip comprises a ball point tip, an arrow head tip, or a frustoconical tip.

8. The sample testing system of claim 1, wherein the distal portion of the at least one piercing tip comprises a flat surface, and wherein the flat surface is at an angle of less than about 20°, about 15°, about 10°, about 5°, or about 1°, relative to the surface of the at least one seal.

9. The sample testing system of claim 1, wherein the at least one piercing tip is fluted.

10. The sample testing system of claim 1, wherein the at least one piercing tip comprises one or more flow channels, and wherein the one or more flow channels are positioned at (i) a proximal end of the at least one piercing tip, (ii) a distal end of the at least one piercing tip, or (iii) across a length of the at least one piercing tip.

11. The sample testing system of claim 10, wherein at least a portion of the predetermined sub-volume of the sample fluid flows through the at least one opening via the one or more flow channels, and wherein the fluid flow is at a higher flow rate as compared to a sample testing system wherein the at least one piercing tip does not comprise one or more flow channels.

12. The sample testing system of claim 1, wherein the at least one piercing tip disrupting the at least one seal comprises the at least one piercing tip penetrating the at least one seal and moving into at least a portion of the at least one reaction chamber.

13. The sample testing system of claim 1, wherein the large opening comprises a puncture of at least about 50%, about 55%, about 60%, about 65%, about 70%, about 75%, about 80%, about 85%, about 90%, about 95%, about 98%, or about 99%, of the surface area of the at least one seal.

14. The sample testing system of claim 1, where at least about 50%, about 55%, about 60%, about 65%, about 70%, about 75%, about 80%, about 85%, about 90%, about 95%, about 98%, or about 99%, of the surface area of the at least one seal comes into contact with the at least one piercing tip.

15. The sample testing system of claim 1, wherein at least about 70%, about 75%, about 80%, about 85%, about 90%, about 95%, about 98%, or about 99%, of the predetermined sub-volume of the sample fluid enters the at least one reaction chamber.

16. The sample testing system of claim 1, wherein the predetermined sub-volume of the sample fluid comprises at least about 10 μL, about 15 μL, about 20 μL, about 25 μL, about 30 μL, about 35 μL, about 40 μL, about 45 μL, about 50 μL, about 60 μL, about 70 μL, about 80 μL, about 90 μL, about 100 μL, about 110 μL, about 120 μL, about 128 μL, about 130 μL, about 140 μL, about 150 μL, about 160 μL, about 170 μL, about 180 μL, about 190 μL, or about 200 μL, of the sample fluid.

17. The sample testing system of claim 1, wherein the at least one reaction chamber is two reaction chambers, wherein the at least one piercing tip is two piercing tips.

18. The sample testing system of claim 17, wherein the two reaction chambers comprise different reagents selected to perform respective different tests and/or to detect respective different target entities.

19. The sample testing system of claim 1, wherein the cartridge body comprises sample preparation reagents, and wherein at least one of the reaction chambers comprises one or more reagents for a reverse transcription reaction and/or an amplification reaction.

20. A sample testing system, comprising:

a cartridge body to receive a biological or environmental sample into a sample preparation fluid contained in the cartridge body for preparation of a sample fluid therefrom;

at least one reaction chamber coupled to the cartridge body;

at least one seal to prevent fluid movement between the cartridge body and the at least one reaction chamber, the at least one seal is situated between the cartridge body and the at least one reaction chamber, the at least one seal that, during operation of the sample testing system, is punctured by a piercing tip to thereby enable fluid movement between the cartridge body and the at least one reaction chamber; and a sample dispensing mechanism for insertion into the cartridge body, wherein the sample dispensing mechanism is operable to disrupt the at least one seal to allow sample fluid to enter the at least one reaction chamber from the cartridge body, and to dispense a predetermined sub-volume of the sample fluid from the cartridge body into the at least one reaction chamber for testing therein while preventing further fluid movement between the cartridge body and the at least one reaction chamber, wherein the sample dispensing mechanism comprises a dispense rod comprising at least one piercing tip that disrupts the at least one seal by forming at least one opening therein, and wherein the at least one piercing tip comprises a geometry configured to generate a large opening in the at least one seal, wherein the at least one opening grows larger in size as the at least one piercing tip moves into at least a portion of the at least one reaction chamber.

21. The sample testing system of claim 20, wherein the at least one piercing tip disrupting the at least one seal generates one or more flaps, wherein the one or more flaps comprise portion(s) of the at least one seal disrupted by the at least one piercing tip.

22. The sample testing system of claim 21, wherein the flaps do not adhere to the at least one piercing tip and/or do not disrupt fluid flow through the opening.

23. The sample testing system of claim 21, wherein the piercing tip comprises a geometry configured to reduce wicking of the sample fluid to the at least one piercing tip and/or the one or more flaps.

24. The sample testing system of claim 20, wherein the sample dispensing mechanism comprises an overmolded layer disposed on the surface of at least a portion of the dispense rod.

25. The sample testing system of claim 20, further comprising a closure to seal the cartridge body after receipt of the biological or environmental sample and the sample dispensing mechanism therein, wherein at least one of the closure and the cartridge body is configured to prevent or at least inhibit removal of the closure from the cartridge body so that the fluids remain sealed within the sample testing system.

26. The sample testing system of claim 20, wherein the at least one piercing tip comprises one or more flow channels, and wherein the one or more flow channels are positioned at (i) a proximal end of the at least one piercing tip, (ii) a distal end of the at least one piercing tip, or (iii) across a length of the at least one piercing tip.

27. A sample testing system, comprising:

a cartridge body to receive a biological or environmental sample into a sample preparation fluid contained in the cartridge body for preparation of a sample fluid therefrom;

at least one reaction chamber coupled to the cartridge body;

at least one seal to prevent fluid movement between the cartridge body and the at least one reaction chamber, the at least one seal is situated between the cartridge body and the at least one reaction chamber, the at least one seal punctured during operation of the sample testing system by a piercing tip to thereby enable fluid movement between the cartridge body and the at least one reaction chamber; and a sample dispensing mechanism for insertion into the cartridge body, wherein the sample dispensing mechanism is operable to disrupt the at least one seal to allow sample fluid to enter the at least one reaction chamber from the cartridge body, and to dispense a predetermined subvolume of the sample fluid from the cartridge body into the at least one reaction chamber for testing therein while preventing further fluid movement between the cartridge body and the at least one reaction chamber, wherein the sample dispensing mechanism comprises a dispense rod comprising at least one piercing tip that disrupts the at least one seal by forming at least one opening therein, and wherein the at least one piercing tip comprises a geometry configured to generate a large opening in the at least one seal, and wherein the sample dispensing mechanism comprises an overmolded layer disposed on the surface of at least a portion of the dispense rod.

28. The sample testing system of claim 27, wherein the overmolded layer forms a cylindrical seal.

29. The sample testing system of claim 27, wherein the overmolded layer comprises a thermoplastic elastomer (TPE) of a different durometer than at least a portion of the dispense rod, and wherein the overmolded layer exhibits a Shore D durometer or a Shore A durometer of about 20-30.

30. The sample testing system of claim 27, wherein the at least one piercing tip disrupting the at least one seal generates one or more flaps, wherein the one or more flaps comprise portion(s) of the at least one seal disrupted by the at least one piercing tip.

31. The sample testing system of claim 27, further comprising a closure to seal the cartridge body after receipt of the biological or environmental sample and the sample dispensing mechanism therein, wherein at least one of the closure and the cartridge body is configured to prevent or at least inhibit removal of the closure from the cartridge body so that the fluids remain sealed within the sample testing system.

32. The sample testing system of claim 27, wherein the at least one opening grows larger in size as the at least one piercing tip moves into at least a portion of the at least one reaction chamber.

* * * * *